(12) United States Patent
Cooper et al.

(10) Patent No.: US 12,214,314 B2
(45) Date of Patent: Feb. 4, 2025

(54) POROUS ORGANIC CAGES FOR QUANTUM SIEVING

(71) Applicant: The University of Liverpool, Liverpool (GB)

(72) Inventors: Andrew I. Cooper, Liverpool (GB); Ming Liu, Liverpool (GB); Marc A. Little, Liverpool (GB); Linjiang Chen, Liverpool (GB)

(73) Assignee: The University of Liverpool, Liverpool (GB)

( * ) Notice: Subject to any disclaimer, the term of this patent is extended or adjusted under 35 U.S.C. 154(b) by 637 days.

(21) Appl. No.: 17/508,369

(22) Filed: Oct. 22, 2021

(65) Prior Publication Data
US 2022/0266197 A1    Aug. 25, 2022

Related U.S. Application Data

(60) Provisional application No. 63/105,591, filed on Oct. 26, 2020, provisional application No. 63/105,102, filed on Oct. 23, 2020.

(51) Int. Cl.
*B01D 53/02* (2006.01)
*B01D 59/26* (2006.01)

(52) U.S. Cl.
CPC .................. *B01D 59/26* (2013.01)

(58) Field of Classification Search
CPC .......... B01D 2253/20; B01D 2253/311; B01D 2256/16; B01D 2257/108; B01D 53/02; B01D 59/26; B01J 20/22; B01J 20/264; Y02E 30/10
See application file for complete search history.

(56) References Cited

U.S. PATENT DOCUMENTS

| | | | |
|---|---|---|---|
| 2003/0063748 A1* | 4/2003 | Shields | H01S 5/10 398/101 |
| 2015/0101407 A1* | 4/2015 | Liszicasz | G01V 7/04 73/382 G |
| 2016/0367948 A1* | 12/2016 | Song | B01D 53/228 |

FOREIGN PATENT DOCUMENTS

| | | | |
|---|---|---|---|
| CN | 111303438 A | | 6/2020 |
| JP | 2013031833 A | * | 2/2013 |
| JP | 2019042644 A | * | 3/2019 |

OTHER PUBLICATIONS

Translation of JP2019042644 (Year: 2019).*
Translation of JP2013031833 (Year: 2013).*
Liu, et al., "Isotopic Separation: Barely Porous Organic Cages of Hydrogen Isotope Separation," Science, 366, 613-620, 2019 (Nov. 1, 2019), DOI: 10.1126/science.aax7427.
Oh, et al., "Quantum Sieving for Separation of Hydrogen Isotopes Using MDFs," European Journal of Inorganic Chemistry, 2016, 27:4278-4289, DOI: 10.1002/ejic.201600253.

* cited by examiner

*Primary Examiner* — Christopher P Jones
(74) *Attorney, Agent, or Firm* — ArentFox Schiff LLP; Shawn P. Foley

(57) ABSTRACT

The present invention relates to methods of preferentially sorbing, from a target mixture, one or more target substance(s) over one or more non-target substance(s). In particular, porous organic cages (POCs) may be deployed in the quantum sieving of mixtures of hydrogen isotopes to selectively sorb heavy hydrogen isotopes (e.g. diatomic deuterium) over lighter isotopes (diatomic protium).

45 Claims, 21 Drawing Sheets
(21 of 21 Drawing Sheet(s) Filed in Color)

6ET-RCC3

Cocryst1

POROUS ORGANIC CAGES FOR QUANTUM SIEVING

RELATED APPLICATIONS

This application claims priority to and the benefit of U.S. Provisional Patent Application No. 63/105,102, filed on Oct. 23, 2020 entitled "POROUS ORGANIC CAGES FOR QUANTUM SIEVING" and also U.S. Provisional Patent Application No. 63/105,591, filed on Oct. 26, 2020 entitled "POROUS ORGANIC CAGES FOR QUANTUM SIEVING." The entire contents of the above-referenced patent applications are incorporated herein by reference.

FIELD OF INVENTION

The present invention relates to methods of preferentially sorbing, from a target mixture, one or more target substance(s) over one or more non-target substance(s). In particular, porous organic cages (POCs) may be deployed in the quantum sieving of mixtures of hydrogen isotopes to selectively sorb heavy hydrogen isotopes (e.g. diatomic deuterium) over lighter isotopes (diatomic protium).

BACKGROUND

Deuterium (D) and tritium (T) are isotopes of hydrogen (H) that could power nuclear fusion reactors to create clean energy in the future. Deuterium is also a valuable chemical today: for example, it is used as a neutron moderator, as a nonradioactive isotopic tracer, and in neutron scattering experiments. These applications need high-purity deuterium, which is expensive because of its low natural abundance (0.0156 mol %). Hence, deuterium enrichment from hydrogen-containing feedstocks is an important industrial process. Whilst tritium is typically produced from lithium (in nuclear reactors by neutron activation of lithium-6). $D_2$ is generally produced by electrolysis of heavy water and extracted using the Girdler-sulfide process or by cryogenic distillation at 24 K. Both processes are costly and energy intensive because of the multiple enrichment steps required. An attractive alternative to purify deuterium from $H_2/D_2$ gas mixtures is to adsorb $D_2$ selectively on a microporous bed. Kinetic quantum sieving (KQS) using nanoporous solids was first proposed by Beenakker et al. The KQS effect becomes pronounced when the difference in size between a hydrogen molecule and the confining space is comparable to the thermal de Broglie wavelength of molecular hydrogen. Quantum sieving has been exploited for the separation of gaseous isotope mixtures like $D_2/H_2$, but it is challenging to identify suitable porous solids. This is because KQS requires ultra-fine pore apertures (around 3 Å), and this typically leads to materials with low pore volumes and, hence, low $D_2$ adsorption capacities, making such processes difficult to scale. An analogous selectivity/capacity trade-off—or, for membranes, a selectivity/permeance trade-off—is observed for a wide range of other gas separations that do not involve KQS.

Various porous materials have been studied for hydrogen isotope separation including carbons, zeolites, metal-organic-frameworks (MOFs), covalent organic frameworks (COFs), and 2D crystals. MOFs and COFs have received much attention because of their crystalline nature and synthetically tuneable pore size and functionality. However, even with MOFs or COFs, it is challenging to tune pore sizes at the exceptionally fine level required for KQS. For example, in MOFs, a common strategy for tuning the pore apertures is through systematic expansion or reduction of the number of the phenylene rings in the organic linker, with a discrete increment/decrement of approximately 2.8 Å; that is, much coarser than the size control needed for KQS.

It is therefore an object of the present invention to address at least one of the problems inherent in the prior art.

Another object of the present invention is to provide alternative solutions to those presented in the prior art, including, for example, to provide alternative approaches that facilitate advancements in nuclear fusion or other applications in which heavy hydrogen isotopes play a key role.

Another object of the present invention is to provide materials, and/or synthetic methodologies, that enable provision of precisely the right pore size to achieve highly selective sorption of a particular target substance (e.g. deuterium) over a non-target substance (e.g. hydrogen).

Another object of the present invention is to provide materials that are capable of being fine-tuned, preferably towards the end of any synthetic route, to provide an ideal pore size for a target substance (preferably a target gas) in question.

Another object of the present invention is to provide materials that are simple to manufacture.

Another object of the present invention is to provide materials that are simple to process and/or handle, for instance, through being sufficiently soluble to enable facile plant handling (including bulk transfers).

Another object of the present invention is to provide materials that can be produced efficiently and in high yield.

Another object of the present invention is to provide high-purity target substances, such as high-purity deuterium.

Another object of the present invention is to provide a means of recycling exhaust materials from nuclear fusion reactions.

Another object of the present invention is to provide materials that are not only selective for a target substance, but selective without overly compromising the over sorption capacity or target substance uptake.

Another object of the present invention is to address two or more of the aforesaid objects, preferably three or more.

SUMMARY OF THE INVENTION

One or more objects of the present invention are addressed by the solutions outlined below, which define certain aspects of the present invention. It will be appreciated that particular embodiments of such aspects, described elsewhere herein, may equally be redefined as aspects of the invention.

Methods of Preferentially Sorbing

According to an aspect of the present invention there is provided a method of preferentially sorbing one or more target substance(s) over one or more non-target substance(s) from a target mixture comprising, consisting essentially of, or consisting of the target substance(s) and the non-target substance(s), the method comprising contacting the target mixture with a sorption composition comprising, consisting essentially of, or consisting of a sorption compound.

According to an aspect of the present invention there is provided a method of preferentially sorbing one or more target substance(s) over one or more non-target substance(s) from a target mixture comprising, consisting essentially of, or consisting of the target substance(s) and the non-target substance(s), the method comprising contacting the target mixture with a sorption composition comprising, consisting essentially of, or consisting of a sorption compound and a co-crystallization compound.

According to an aspect of the present invention there is provided a method of preferentially sorbing one or more target substance(s) over one or more non-target substance(s) from a target mixture comprising, consisting essentially of, or consisting of the target substance(s) and the non-target substance(s), the method comprising contacting the target mixture with a sorption device comprising a sorption composition comprising, consisting essentially of, or consisting of a sorption compound.

According to an aspect of the present invention there is provided a method of preferentially sorbing one or more target substance(s) over one or more non-target substance(s) from a target mixture comprising, consisting essentially of, or consisting of the target substance(s) and the non-target substance(s), the method comprising contacting the target mixture with a sorption device comprising a sorption composition comprising, consisting essentially of, or consisting of a sorption compound and a co-crystallization compound.

The aforesaid methods and any related methods hereinafter described may be used in a method of manufacturing, method of extracting, method of purifying, method of separating, or method of removing, either the target substance(s) and/or the non-target substance(s). As such, the following further aspects of the invention arise.

Methods of Manufacturing, Extracting, Purifying, Separating and Removing

According to an aspect of the present invention there is provided a method of manufacturing, method of extracting, or method of purifying one or more target substance(s), comprising performing a method of preferentially sorbing as defined herein. Such methods may comprise the step of removing the non-target substance(s), for instance by separating the sorption composition from the non-target substance(s) following sorption of the target substance(s) therein. Such methods may comprise the step of recovering, extracting, or isolating the target substance(s) from the sorption composition, for instance by desorbing the target substance(s) from the sorption composition, most preferably following removing of the non-target substance(s).

According to an aspect of the present invention there is provided a method of manufacturing, method of extracting, or method of purifying one or more non-target substance(s), comprising performing a method of preferentially sorbing as defined herein. Such methods may comprise separating the sorption composition, with target substance(s) sorbed therein, from the non-target substance(s), for instance by removing the sorption composition from contact with the non-target substance(s). The methods may comprise repeating the method of preferentially sorbing, and optionally any additional method steps (e.g. separating the sorption composition from the non-target substances) one or more times. In this manner, suitably the "target substance(s)" are actually selectively removed from the target mixture comprising, consisting essentially of, or consisting of the target substance(s) and the non-target substance(s).

According to an aspect of the present invention there is provided a method of removing one or more target substance(s) from a target mixture comprising, consisting essentially of, or consisting of the target substance(s) and one or more non-target substance(s), the method comprising performing a method of preferentially sorbing as defined herein. Such a method may be performed repeatedly to maximise removal of the target substance(s). Such a method is particularly useful, for instance, where it is desirable to remove radioactive tritium from radioactively contaminated water, where suitably said water would be subjected to electrolysis to produce gases hydrogen isotopes which are then subject to the relevant methods. As such, another aspect of the invention provides a method of removing tritium from radioactively-contaminated water, comprising performing the aforementioned method of removing upon electrolysed water.

According to an aspect of the present invention there is provided a method of separating one or more target substance(s) from one or more non-target substance(s), the method comprising performing a method of preferentially sorbing as defined herein. Such methods may suitably comprise the step of separating the treated target mixture from the sorption composition, with target substance(s) sorbed therein. Such methods may comprise the step of recovering, extracting, or isolating the target substance(s) from the sorption composition, for instance by desorbing the target substance(s) from the sorption composition, most preferably following removing of the non-target substance(s). Such methods may comprise the step of recovering, extracting, or isolating the non-target substance(s).

According to an aspect of the present invention there is provided a method of quantum sieving, the method comprising selectively sieving one or more target substance(s) over one or more non-target substances(s), from a target mixture comprising, consisting essentially of, or consisting of the target substance(s) and the non-target substance(s), the method comprising contacting (or passing) the target mixture with (or through) a sorption composition comprising, consisting essentially of, or consisting of a sorption compound and optionally a co-crystallization compound.

Methods Specific to Hydrogen Isotopes

According to an aspect of the present invention there is provided a method of preferentially sorbing one or more target substance(s) over one or more non-target substance(s) from a target mixture comprising, consisting essentially of, or consisting of the target substance(s) and the non-target substance(s), the method comprising contacting the target mixture with a sorption composition (or with a sorption device comprising the sorption composition), wherein the sorption composition comprises, consists essentially of, or consists of a sorption compound and optionally a co-crystallization compound;

wherein:
  the target mixture comprises, consists essentially of, or consists of two or more selected form the group consisting of $H_2$, $D_2$, $T_2$, HD, HT, and DT;
  the target substance(s) is/are selected from the group consisting of $H_2$, $D_2$, $T_2$, HD, HT, and DT; and
  the non-target substances(s) is/are selected from the group consisting of $H_2$, $D_2$, $T_2$, HD, HT, and DT, on the proviso that the non-target substance(s) exclude the target substance(s).

According to an aspect of the present invention there is provided a method of kinetic quantum sieving (KQS), comprising performing a method of preferentially sorbing as defined herein, most preferably upon a mixture comprising two or more hydrogen isotopes.

The target mixture may be or comprise outputs from nuclear fusion reactions. As such, the method may be a method of recycling the exhaust of nuclear fusion, since deuterium and/or tritium-containing molecules extract via the aforesaid methods may then be reused as inputs into a nuclear fusion process.

Methods Applied to Nuclear Fusion

According to an aspect of the present invention, there is provided a method of performing nuclear fusion, the method comprising providing at least one nuclear fusion input material by performing one of the methods of the invention (suitably by isolating the one or more target substance(s) or one or more non-target substance(s) obtained therefrom, suitably the one or more target substance(s), suitably deuterium and optionally also tritium) and optionally providing one or more further nuclear fusion input materials (e.g. tritium, optionally obtainable via an alternative method to those of the invention); and performing nuclear fusion with the at least one nuclear fusion input material optionally along with one or more further nuclear fusion input materials. Optionally, especially when performing nuclear fusion with recycled exhaust materials, the at least one nuclear fusion input material may be provided by performing one of the methods of the invention upon nuclear fusion exhaust materials, for instance, suitably comprising two or more hydrogen species selected from the group consisting of $H_2$, $D_2$, $T_2$, HD, HT, and DT. The exhaust materials may additionally comprise helium.

Compounds

According to an aspect of the present invention there is provided a sorption compound. The sorption compound is suitably a porous organic cage.

According to an aspect of the present invention there is provided a method of manufacturing a sorption compound.

According to an aspect of the present invention there is provided a co-crystallization compound. The co-crystallization compound is suitably a porous organic cage.

Cocrystals

According to an aspect of the present invention there is provided a co-crystal. The co-crystal suitably comprises or consists of both the sorption compound and co-crystallization compound. Preferably the sorption compound is a separate and distinct compound or molecule to the co-crystallization compound. It is, however, envisaged that the co-crystal may comprise a covalently-linked sorption-cocrystal compound comprising the sorption compound (or a derivative thereof) covalently linked to the co-crystallisation compound (or a derivative thereof).

Suitably, both the sorption compound and co-crystallization compound are porous, wherein the co-crystallization compound has larger pores than the sorption compound.

Suitably, the sorption compound and co-crystallization compound co-crystallize.

According to an aspect of the present invention there is provided a method of manufacturing a cocrystal. The method suitably comprises co-crystallising the sorption compound and co-crystallization compound.

Compositions

According to an aspect of the present invention there is provided a sorption composition comprising the sorption compound. The sorption composition may, in some embodiments, consist of or consist essentially of the sorption compound.

According to an aspect of the present invention there is provided a sorption composition comprising a sorption compound and a co-crystallization compound. The sorption composition may, in some embodiments, consist of or consist essentially of the sorption compound and the co-crystallization compound.

According to an aspect of the present invention there is provided a co-crystal composition. The co-crystal composition suitably comprises or consists of a co-crystal as defined herein. The sorption composition may be a co-crystal composition.

Sorption Devices

According to an aspect of the present invention there is provided a sorption device comprising a sorption composition (or co-crystal composition) as defined herein. The sorption device may be a filtration or scrubbing device. The sorption device may be a cartridge comprising a sorption composition or co-crystal composition. The sorption device may be incorporated within a larger apparatus. The sorption device may be a cartridge or column comprising the sorption composition (suitably in a compacted form). The sorption device may be a membrane or film comprising or consisting of the sorption composition.

According to an aspect of the present invention there is provided a kinetic quantum sieve (KQS) comprising a sorption composition as defined herein.

Methods of Fine-Tuning Sorption Compound for Target Gases

According to an aspect of the present invention there is provided a method of preferentially sorbing one or more target substance(s) over one or more non-target substance(s) from a target mixture comprising, consisting essentially of, or consisting of the target substance(s) and the non-target substance(s), the method comprising:

preparing a pre-functionalized sorption compound, wherein the sorption compound is a porous organic cage comprising an internal cavity with one or more functionalizable groups;

chemically modifying (post-functionalizing) the internal cavity of the sorption compound, optionally by: protecting some but not all functionalizable groups within the internal cavity with protecting groups, functionalizing one or more unprotected functionalizable groups, deprotecting the functionalizable groups protected with protecting groups, and optionally thereafter further functionalizing one or more unprotected functionalizable groups; and contacting the target mixture with a sorption composition (or device comprising the sorption composition), wherein the sorption composition comprises, consists essentially of, or consists of a sorption compound and optionally a co-crystallization compound.

Other Aspects and Features

According to an aspect of the present invention there is provided a sorption compound, co-crystallization compound, sorption composition, co-crystal, co-crystal composition, or sorption device, for use in kinetic quantum sieving.

Any features, including optional, suitable, and preferred features, described in relation to any particular aspect of the invention may also be features, including optional, suitable and preferred features, of any other aspect of the present invention unless incompatible therewith.

BRIEF DESCRIPTION OF THE DRAWINGS

The patent or application file contains at least one drawing executed in color. Copies of this patent or patent application publication with color drawing(s) will be provided by the Office upon request and payment of the necessary fee. For a better understanding of the invention, and to show how embodiments of the same are put into effect, reference is now made, by way of example, to the following diagrammatic drawings, in which:

(FIG. 1A) Scheme showing the protect-functionalize-deprotect strategy for internal cage cavity modification. (FIG. 1B) Scheme showing full synthesis route for the modified cages, corresponding to the scheme in A. FT, AT, ET, and PT represent products where the diamine group/s were tied with formaldehyde, acetone, ethanal (acetaldehyde), and propionaldehyde; x and y represent different possible tying groups (x=E, F and y=A, E, P). (FIG. 1C) Representative single crystal structures of the modified cages showing accessible cavities (colored), along with calculated pore limiting envelopes for each system. (FIG. 1D) Bar graph summarizing gas adsorption properties for a range of gases (histogram; left axis) and cage cavity volumes (right axis) of a single modified cage, as calculated by VOIDOO based on their crystal structures, probe radius=2.0 Å (30).

(FIG. 2A) Pore limiting envelope for 6ET-RCC3. The image (inset) shows the single crystal structures of 6ET-RCC3 with its accessible cage cavity (colored). (FIG. 2B) Hydrogen adsorption (closed) and desorption (open) isotherms of 6ET-RCC3 at different temperatures. (FIG. 2C) Thermal desorption spectra (TDS) of 6ET-RCC3 obtained after exposure to a 10 mbar 1:1 $D_2/H_2$ isotope mixture at different exposure temperatures for a fixed exposure time ($t_{exp}$) of 30 min. The desorption spectra after evacuation at exposure temperature were measured for a heating rate of 0.1 K/s. (FIG. 2D) $D_2/H_2$ selectivities and gas uptakes as function of exposure time at 30 K for CC3, 6FT-RCC3, and 6ET-RCC3.

FIGS. 3A-G show formation of a cocrystal enhances the $D_2/H_2$ separation performance. (FIG. 3A-1): Scheme showing the cocrystal, Cocryst1, formed by chiral recognition between two cages to integrate capacity and selectivity in a single material; (FIG. 3A-2): simplified representation of the crystal structure of Cocryst1, with pore channels shown in yellow; (FIG. 3A-3): single crystal structure of Cocryst1. $H_2$ (FIG. 3B-1) and $D_2$ (FIG. 3B-2) adsorption (closed) and desorption (open) isotherms of Cocryst1 at different temperatures. (FIG. 3C): $D_2/H_2$ isotherm ratio as function of pressure for different temperatures. (FIG. 3D-1, FIG. 3D-2, and FIG. 3D-3): TDS for Cocryst1, obtained after exposure to a 10 mbar 1:1 $H_2/D_2$ isotope mixture for different exposure temperatures ($T_{exp}$) and a fixed exposure time ($t_{exp}$) of 30 min. (FIG. 3E): $D_2/H_2$ selectivity as a function of $t_{exp}$ at 30 K (red), 40 K (blue) and 50 K (green). (FIG. 3F-1, FIG. 3F-2, and FIG. 3F-3): TDS for Cocryst1, obtained after exposure to a 10 mbar 1:1 $H_2/D_2$ isotope mixture for different exposure times at 30 K. (FIG. 3G): the corresponding amount of adsorbed $H_2$ (black), $D_2$ (red) and selectivity (blue) as functions of $t_{exp}$ at 30 K.

FIGS. 5D-F show predicted competitive adsorption (D-F) of an equimolar $H_2/D_2$ mixture. FIGS. 5G-I show how PIMD simulations predict $D_2/H_2$ selectivity and gas diffusion for a single, isolated 6ET-RCC3 cage (see Computational Methods below for simulation details). (FIG. 5G): Transition state for the translocation of a quantum $H_2$ molecule; a single snapshot is shown, with an overlay of all 32 replicas in the PIMD simulation, illustrating the nuclear quantum fluctuations. Additional translucent, red dots depict the fluctuations of the translocating $H_2$ molecule, taken from 100 transition-state configurations. (FIG. 5H): Relative population of $D_2$ over $H_2$ inside the cage versus in the gas phase, as a function of temperature, compared with the observed experimental $D_2/H_2$ selectivities. (FIG. 5I): Free energy profiles for a single molecule of quantum $H_2$ (black) or quantum $D_2$ (red) diffusing through a window of an isolated 6ET-RCC3 molecule at 50 K. Definitions of errors in FIG. 5H and FIG. 5I are given in the Computation Methods section subtitled "Path integral molecular dynamics simulations and free energy calculations".

DETAILED DESCRIPTION OF THE INVENTION

Definitions

Figure 1A:
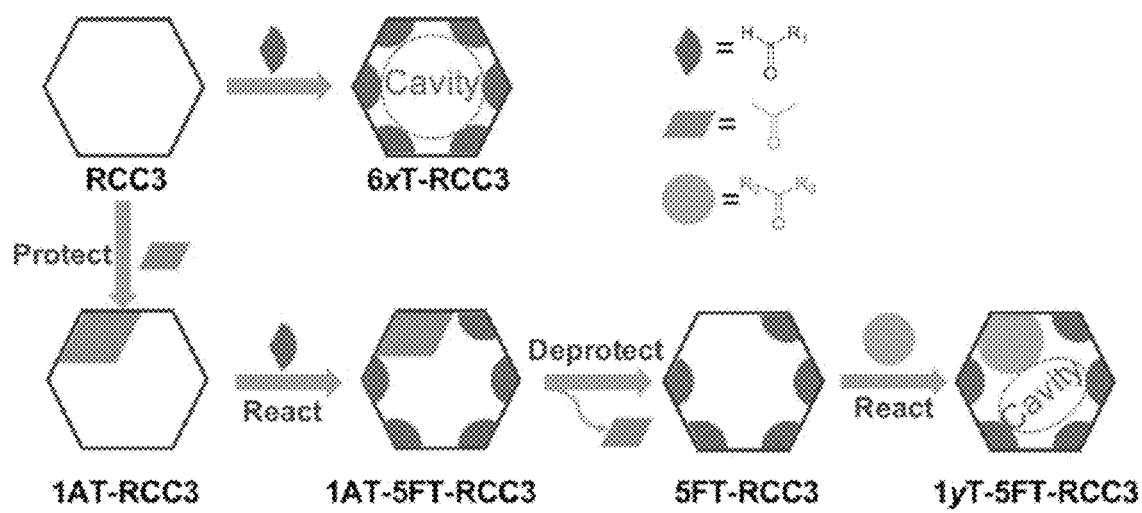
FIGS. 1A-D show kinetic quantum sieving using ultra-small-pore organic cages.

Unless otherwise stated, the following terms used in the specification and claims have the following meanings set out below.

Unless otherwise stated, the following terms used in the specification and claims have the following meanings set out below.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

For the avoidance of doubt, it is hereby stated that the information disclosed earlier in this specification under the heading "Background" is relevant to the invention and is to be read as part of the disclosure of the invention.

Unless stated otherwise, any reference herein to an "average" value is intended to relate to the mean value.

Where a composition is said to comprise a plurality of stipulated ingredients (optionally in stipulated amounts of concentrations), said composition may optionally include additional ingredients other than those stipulated. However, in certain embodiments, a composition said to comprise a plurality of stipulated ingredients may in fact consist essentially of or consist of all the stipulated ingredients.

Herein, where a composition is said to "consists essentially of" particular component(s), said composition suitably comprises at least 70 wt % of said component(s), suitably at least 90 wt % thereof, suitably at least 95 wt % u thereof, most suitably at least 99 wt % thereof. Suitably, a composition said to "consist essentially of" particular component (s) consists of said component(s) save for one or more trace impurities.

Where the quantity or concentration of a particular component of a given composition is specified as a weight percentage (wt % or % w/w), said weight percentage refers to the percentage of said component by weight relative to the total weight of the composition as a whole. It will be understood by those skilled in the art that the sum of weight percentages of all components of a composition will total 100 wt %. However, where not all components are listed (e.g. where compositions are said to "comprise" one or more particular components), the weight percentage balance may optionally be made up to 100 wt % by unspecified ingredients (e.g. a diluent, such as water, or other non-essentially but suitable additives). Most suitably, the sum of wt % of stipulated ingredients does not exceed 100 wt % and any combinations of wt % that would do so would by definition be excluded.

The term "substantially free", when used in relation to a given component of a composition (e.g. "a composition substantially free of compound X"), refers to a composition to which essentially none of said component has been added. When a composition is "substantially free" of a given component, said composition suitably comprises no more than 0.001 wt % of said component, suitably no more than 0.0001 wt % of said component, suitably no more than 0.00001 wt %, suitably no more than 0.000001 wt %, suitably no more than 0.0000001 wt % thereof, most suitably no more than 0.0001 parts per billion (by weight).

The term "entirely free", when used in relation to a given component of a composition (e.g. "a composition entirely free of compound X"), refers to a composition containing none of said component.

Suitably, unless stated otherwise, where reference is made to a parameter (e.g. pH, pKa, size, etc.) or state of a material (e.g. liquid, gas, etc.) which may depend on pressure and/or temperature, suitably in the absence of further clarification such a reference refers to said parameter at standard ambient temperature and pressure (SATP). SATP is a temperature of 298.15 K (25° C., 77° F.) and an absolute pressure of 100 kPa (14.504 psi, 0.987 atm).

Herein, unless stated otherwise, all chemical nomenclature may be defined in accordance with IUPAC definitions.

Herein, the term "hydrocarbon" is well understood in the art, and refers to compounds containing carbon and hydrogen only. The term "hydrocarbyl" general refers any aliphatic, acyclic, or cyclic (including aryl) hydrocarbon group, suitably with no heteroatoms. Such compounds include, inter alia, alkanes, alkenes, alkynes, arenes, and cyclic versions thereof. The term "hydrocarbon" anthracene, naphthalene, benzene, and/or derivatives thereof (e.g. toluene).

Herein, the term "carbocyclyl", "carbocycle" or "carbocyclic" refers to a radical of a non-aromatic cyclic hydrocarbon group, generally having from 3 to 10 ring carbon atoms (i.e. (3-IOC)carbocyclyl) and zero heteroatoms in the non-aromatic ring system. Suitably, carbocyclyl groups include (3-nC)cycloalkyl and (3-nC)cycloalkenyl. Exemplary embodiments include: cyclobutyl, cyclobutenyl, cyclopentyl, cyclopentenyl, cyclohexyl, cyclohexenyl, cyclohexadienyl, cycloheptyl, cycloheptenyl, cycloheptadienyl, cycloheptatrienyl, cyclooctyl, cyclooctenyl, bicyclo [2.2.1]heptanyl, bicyclo[2.2.2]octanyl, and the like.

Herein, the term "macrocyclyl", "macrocycle" or "macrocyclic" refers to macrocyclic rings, which are well known in the art. Such macrocyclic rings are suitably cyclic macromolecules or a macromolecular cyclic portions of a molecule. Suitably a macrocyclic ring has nine or more atoms within the ring. Suitably a macrocyclic ring has three or more internal electron-pair donating atoms. A macrocyclic ring is suitably a cyclic molecule able to co-ordinate to a central metal species (e.g. Mg2+). Examples include porphyrins.

Herein, the term "carbohydrate" is well understood in the art, and refers to compounds containing carbon, hydrogen, and oxygen only. Such compounds include esters, ketones, aldehydes, sugars, etc.

In this specification the term "alkyl" includes both straight and branched chain alkyl groups. References to individual alkyl groups such as "propyl" are specific for the straight chain version only and references to individual branched chain alkyl groups such as "isopropyl" are specific for the branched chain version only. For example, "(1-6C)alkyl" includes (1-4C)alkyl, (1-3C)alkyl, propyl, isopropyl and t-butyl. A similar convention applies to other radicals, for example "phenyl(1-6C)alkyl" includes phenyl(1-4C)alkyl, benzyl, 1-phenylethyl and 2-phenylethyl.

The term "(m-nC)" or "(m-nC) group" used alone or as a prefix, refers to any group having m to n carbon atoms.

An "alkylene," "alkenylene," or "alkynylene" group is an alkyl, alkenyl, or alkynyl group that is positioned between and serves to connect two other chemical groups. Thus, "(1-6C)alkylene" means a linear saturated divalent hydrocarbon radical of one to six carbon atoms or a branched saturated divalent hydrocarbon radical of three to six carbon atoms, for example, methylene, ethylene, propylene, 2-methylpropylene, pentylene, and the like.

"(2-6C)alkenylene" means a linear divalent hydrocarbon radical of two to six carbon atoms or a branched divalent hydrocarbon radical of three to six carbon atoms, containing at least one double bond, for example, as in ethenylene, 2,4-pentadienylene, and the like.

"(2-6C)alkynylene" means a linear divalent hydrocarbon radical of two to six carbon atoms or a branched divalent hydrocarbon radical of three to six carbon atoms, containing at least one triple bond, for example, as in ethynylene, propynylene, and butynylene and the like.

"(3-8C)cycloalkyl" means a hydrocarbon ring containing from 3 to 8 carbon atoms, for example, cyclopropyl, cyclobutyl, cyclopentyl, cyclohexyl, cycloheptyl or bicyclo [2.2.1]heptyl.

"(3-8C)cycloalkenyl" means a hydrocarbon ring containing at least one double bond, for example, cyclobutenyl, cyclopentenyl, cyclohexenyl or cycloheptenyl, such as 3-cyclohexen-1-yl, or cyclooctenyl.

"(3-8C)cycloalkyl-(1-6C)alkylene" means a (3-8C)cycloalkyl group covalently attached to a (1-6C)alkylene group, both of which are defined herein.

The term "halo" refers to fluoro, chloro, bromo and iodo.

The term "heterocyclyl", "heterocyclic" or "heterocycle" means a non-aromatic saturated or partially saturated monocyclic, fused, bridged, or spiro bicyclic heterocyclic ring system(s). The term heterocyclyl includes both monovalent species and divalent species. Monocyclic heterocyclic rings contain from about 3 to 12 (suitably from 3 to 7) ring atoms, with from 1 to 5 (suitably 1, 2 or 3) heteroatoms selected from nitrogen, oxygen or sulfur in the ring. Bicyclic heterocycles contain from 7 to 17 member atoms, suitably 7 to 12 member atoms, in the ring. Bicyclic heterocycles contain from about 7 to about 17 ring atoms, suitably from 7 to 12 ring atoms. Bicyclic heterocyclic(s) rings may be fused, spiro, or bridged ring systems. Examples of heterocyclic groups include cyclic ethers such as oxiranyl, oxetanyl, tetrahydrofuranyl, dioxanyl, and substituted cyclic ethers. Heterocycles containing nitrogen include, for example, azetidinyl, pyrrolidinyl, piperidinyl, piperazinyl, tetrahydrotriazinyl, tetrahydropyrazolyl, and the like. Typical sulfur containing heterocycles include tetrahydrothienyl, dihydro-1,3-dithiol, tetrahydro-2H-thiopyran, and hexahydrothiepine. Other heterocycles include dihydro-oxathiolyl, tetrahydro-oxazolyl, tetrahydro-oxadiazolyl, tetrahydrodioxazolyl, tetrahydro-oxathiazolyl, hexahydrotriazinyl, tetrahydro-oxazinyl, morpholinyl, thiomorpholinyl, tetrahydropyrimidinyl, dioxolinyl, octahydrobenzofuranyl, octahydrobenzimidazolyl, and octahydrobenzothiazolyl. For heterocycles containing sulfur, the oxidized sulfur heterocycles containing SO or SO2 groups are also included. Examples include the sulfoxide and sulfone forms of tetrahydrothienyl and thiomorpholinyl such as tetrahydrothiene 1,1-dioxide and thiomorpholinyl 1,1-dioxide. A suitable value for a heterocyclyl group which bears 1 or 2 oxo (=O) or thioxo (=S) substituents is, for example, 2-oxopyrrolidinyl, 2-thioxopyrrolidinyl, 2-oxoimidazolidinyl, 2-thioxoimidazolidinyl, 2-oxopiperidinyl, 2,5-dioxopyrrolidinyl, 2,5-dioxoimidazolidinyl or 2,6-dioxopiperidinyl. Particular heterocyclyl groups are saturated monocyclic 3 to 7 membered heterocyclyls containing 1, 2 or 3 heteroatoms selected from nitrogen, oxygen or sulfur, for example azetidinyl, tetrahydrofuranyl, tetrahydropyranyl, pyrrolidinyl, morpholinyl, tetrahydrothienyl, tetrahydrothienyl 1,1-dioxide, thiomorpholinyl, thiomorpholinyl 1,1-dioxide, piperidinyl, homopiperidinyl, piperazinyl or homopiperazinyl. As the skilled person would appreciate, any heterocycle may be linked to another group via any suitable atom, such as via a carbon or nitrogen atom. However, reference herein to piperidino or morpholino refers to a piperidin-1-yl or morpholin-4-yl ring that is linked via the ring nitrogen.

By "bridged ring systems" is meant ring systems in which two rings share more than two atoms, see for example Advanced Organic Chemistry, by Jerry March, 4th Edition, Wiley Interscience, pages 131-133, 1992. Examples of bridged heterocyclyl ring systems include, aza-bicyclo [2.2.1]heptane, 2-oxa-5-azabicyclo[2.2.1]heptane, aza-bicyclo[2.2.2]octane, aza-bicyclo[3.2.1]octane and quinuclidine.

"Heterocyclyl(1-6C)alkyl" means a heterocyclyl group covalently attached to a (1-6C)alkylene group, both of which are defined herein.

The term "heteroaryl" or "heteroaromatic" means an aromatic mono-, bi-, or polycyclic ring incorporating one or more (for example 1-4, particularly 1, 2 or 3) heteroatoms selected from nitrogen, oxygen or sulfur. The term heteroaryl includes both monovalent species and divalent species. Examples of heteroaryl groups are monocyclic and bicyclic groups containing from five to twelve ring members, and more usually from five to ten ring members. The heteroaryl group can be, for example, a 5- or 6-membered monocyclic ring or a 9- or 10-membered bicyclic ring, for example a bicyclic structure formed from fused five and six membered rings or two fused six membered rings. Each ring may contain up to about four heteroatoms typically selected from nitrogen, sulfur and oxygen. Typically the heteroaryl ring will contain up to 3 heteroatoms, more usually up to 2, for example a single heteroatom. In one embodiment, the heteroaryl ring contains at least one ring nitrogen atom. The nitrogen atoms in the heteroaryl rings can be basic, as in the case of an imidazole or pyridine, or essentially non-basic as in the case of an indole or pyrrole nitrogen. In general the number of basic nitrogen atoms present in the heteroaryl group, including any amino group substituents of the ring, will be less than five.

Examples of heteroaryl include furyl, pyrrolyl, thienyl, oxazolyl, isoxazolyl, imidazolyl, pyrazolyl, thiazolyl, isothiazolyl, oxadiazolyl, thiadiazolyl, triazolyl, tetrazolyl, pyridyl, pyridazinyl, pyrimidinyl, pyrazinyl, 1,3,5-triazenyl, benzofuranyl, indolyl, isoindolyl, benzothienyl, benzoxazolyl, benzimidazolyl, benzothiazolyl, benzothiazolyl, indazolyl, purinyl, benzofurazanyl, quinolyl, isoquinolyl, quinazolinyl, quinoxalinyl, cinnolinyl, pteridinyl, naphthyridinyl, carbazolyl, phenazinyl, benzisoquinolinyl, pyridopyrazinyl, thieno[2,3-b]furanyl, 2H-furo[3,2-b]-pyranyl, 5H-pyrido[2,3-d]-o-oxazinyl, 1H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl. "Heteroaryl" also covers partially aromatic bi- or polycyclic ring systems wherein at least one ring is an aromatic ring and one or more of the other ring(s) is a non-aromatic, saturated or partially saturated ring, provided at least one ring contains one or more heteroatoms selected from nitrogen, oxygen or sulfur. Examples of partially aromatic heteroaryl groups include for example, tetrahydroisoquinolinyl, tetrahydroquinolinyl, 2-oxo-1,2,3,4-tetrahydroquinolinyl, dihydrobenzthienyl, dihydrobenzfuranyl, 2,3-dihydro-benzo[1,4]dioxinyl, benzo[1,3]dioxolyl, 2,2-dioxo-1,3-dihydro-2-benzothienyl, 4,5,6,7-tetrahydrobenzofuranyl, indolinyl, 1,2,3,4-tetrahydro-1,8-naphthyridinyl, 1,2,3,4-tetrahydropyrido[2,3-b]pyrazinyl and 3,4-dihydro-2H-pyrido[3,2-b][1,4]oxazinyl Examples of five membered heteroaryl groups include but are not limited to pyrrolyl, furanyl, thienyl, imidazolyl, furazanyl, oxazolyl, oxadiazolyl, oxatriazolyl, isoxazolyl, thiazolyl, isothiazolyl, pyrazolyl, triazolyl and tetrazolyl groups.

Examples of six membered heteroaryl groups include but are not limited to pyridyl, pyrazinyl, pyridazinyl, pyrimidinyl and triazinyl.

A bicyclic heteroaryl group may be, for example, a group selected from:

a) a benzene ring fused to a 5- or 6-membered ring containing 1, 2 or 3 ring heteroatoms;
b) a pyridine ring fused to a 5- or 6-membered ring containing 1, 2 or 3 ring heteroatoms;
c) a pyrimidine ring fused to a 5- or 6-membered ring containing 1 or 2 ring heteroatoms;
d) a pyrrole ring fused to a 5- or 6-membered ring containing 1, 2 or 3 ring heteroatoms;
e) a pyrazole ring fused to a 5- or 6-membered ring containing 1 or 2 ring heteroatoms;
f) a pyrazine ring fused to a 5- or 6-membered ring containing 1 or 2 ring heteroatoms;
g) an imidazole ring fused to a 5- or 6-membered ring containing 1 or 2 ring heteroatoms;
h) an oxazole ring fused to a 5- or 6-membered ring containing 1 or 2 ring heteroatoms;
i) an isoxazole ring fused to a 5- or 6-membered ring containing 1 or 2 ring heteroatoms;
j) a thiazole ring fused to a 5- or 6-membered ring containing 1 or 2 ring heteroatoms;
k) an isothiazole ring fused to a 5- or 6-membered ring containing 1 or 2 ring heteroatoms;
l) a thiophene ring fused to a 5- or 6-membered ring containing 1, 2 or 3 ring heteroatoms;
m) a furan ring fused to a 5- or 6-membered ring containing 1, 2 or 3 ring heteroatoms;
n) a cyclohexyl ring fused to a 5- or 6-membered heteroaromatic ring containing 1, 2 or 3 ring heteroatoms; and
o) a cyclopentyl ring fused to a 5- or 6-membered heteroaromatic ring containing 1, 2 or 3 ring heteroatoms.

Particular examples of bicyclic heteroaryl groups containing a six membered ring fused to a five membered ring include but are not limited to benzfuranyl, benzthiophenyl, benzimidazolyl, benzoxazolyl, benzisoxazolyl, benzthiazolyl, benzisothiazolyl, isobenzofuranyl, indolyl, isoindolyl, indolizinyl, indolinyl, isoindolinyl, purinyl (e.g., adeninyl, guaninyl), indazolyl, benzodioxolyl and pyrazolopyridinyl groups.

Particular examples of bicyclic heteroaryl groups containing two fused six membered rings include but are not limited to quinolinyl, isoquinolinyl, chromanyl, thiochromanyl, chromenyl, isochromenyl, chromanyl, isochromanyl, benzodioxanyl, quinolizinyl, benzoxazinyl, benzodiazinyl, pyridopyridinyl, quinoxalinyl, quinazolinyl, cinnolinyl, phthalazinyl, naphthyridinyl and pteridinyl groups.

"Heteroaryl(1-6C)alkyl" means a heteroaryl group covalently attached to a (1-6C)alkylene group, both of which are defined herein. Examples of heteroaralkyl groups include pyridin-3-ylmethyl, 3-(benzofuran-2-yl)propyl, and the like.

The term "aryl" means a cyclic or polycyclic aromatic ring having from 5 to 12 carbon atoms. The term aryl includes both monovalent species and divalent species. Examples of aryl groups include, but are not limited to, phenyl, biphenyl, naphthyl and the like. In particular embodiment, an aryl is phenyl.

The term "aryl(1-6C)alkyl" means an aryl group covalently attached to a (1-6C)alkylene group, both of which are defined herein. Examples of aryl-(1-6C)alkyl groups include benzyl, phenylethyl, and the like This specification also makes use of several composite terms to describe groups comprising more than one functionality. Such terms will be understood by a person skilled in the art. For example heterocyclyl(m-nC)alkyl comprises (m-nC)alkyl substituted by heterocyclyl.

Wherever groups with large carbon chains are disclosed (e.g. (1-12C)alkyl, (1-8C)alkenyl, etc.), such groups may optionally be shortened, for instance containing a between 1 and 5 carbons (e.g. (1-5C)alkyl or (1-5C)alkenyl), or contain between 1 and 3 carbons (e.g. (1-3C)alkyl or (1-3C)alkenyl instead of (1-12C)alkyl or (1-8C)alkenyl).

The term "optionally substituted" refers to either groups, structures, or molecules that are substituted and those that are not substituted.

Where optional substituents are chosen from "one or more" groups it is to be understood that this definition includes all substituents being chosen from one of the specified groups or the substituents being chosen from two or more of the specified groups.

The phrase "compound of the invention" means those compounds which are disclosed herein, both generically and specifically.

Compounds that have the same molecular formula but differ in the nature or sequence of bonding of their atoms or the arrangement of their atoms in space are termed "isomers". Isomers that differ in the arrangement of their atoms in space are termed "stereoisomers". Stereoisomers that are not mirror images of one another are termed "diastereomers" and those that are non-superimposable mirror images of each other are termed "enantiomers". When a compound has an asymmetric center, for example, it is bonded to four different groups, a pair of enantiomers is possible. An enantiomer can be characterized by the absolute configuration of its asymmetric center and is described by the R- and S-sequencing rules of Cahn and Prelog, or by the manner in which the molecule rotates the plane of polarized light and designated as dextrorotatory or levorotatory (i.e., as (+) or (−)-isomers respectively). A chiral compound can exist as either individual enantiomer or as a mixture thereof. A mixture containing equal proportions of the enantiomers is called a "racemic mixture".

The compounds of this invention may possess one or more asymmetric centers; such compounds can therefore be produced as individual (R)- or (S)-stereoisomers or as mixtures thereof. Unless indicated otherwise, the description or naming of a particular compound in the specification and claims is intended to include both individual enantiomers and mixtures, racemic or otherwise, thereof. The methods for the determination of stereochemistry and the separation of stereoisomers are well-known in the art (see discussion in Chapter 4 of "Advanced Organic Chemistry", 4th edition J. March, John Wiley and Sons, New York, 2001), for example by synthesis from optically active starting materials or by resolution of a racemic form. Some of the compounds of the invention may have geometric isomeric centres (E- and Z-isomers). It is to be understood that the present invention encompasses all optical, diastereoisomers and geometric isomers and mixtures thereof that possess telomerase inhibitory activity.

The present invention also encompasses compounds of the invention as defined herein which comprise one or more isotopic substitutions. For example, H may be in any isotopic form, including 1H, 2H(D), and 3H (T); C may be in any isotopic form, including 12C, 13C, and 14C; and O may be in any isotopic form, including 16O and 18O; and the like.

It is also to be understood that certain compounds of the formula I may exhibit polymorphism, and that the invention encompasses all such forms.

Compounds may exist in a number of different tautomeric forms and references to compounds include all such forms. For the avoidance of doubt, where a compound can exist in one of several tautomeric forms, and only one is specifically described or shown, all others are nevertheless embraced by the definition of the compound. Examples of tautomeric forms include keto-, enol-, and enolate-forms, as in, for example, the following tautomeric pairs: keto/enol (illustrated below), imine/enamine, amide/imino alcohol, amidine/amidine, nitroso/oxime, thioketone/enethiol, and nitro/aci-nitro.

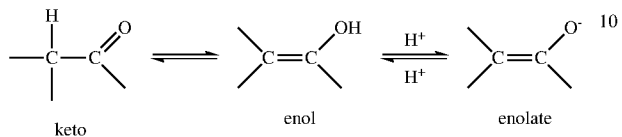

Herein, unqualified references to "hydrogen" refers to protium, unless the context suggests otherwise. Herein, unqualified references to "heavy hydrogen" refers to deuterium and/or tritium, though most preferably to deuterium.

Herein, where the context dictates (e.g. in methods of the invention), unqualified references to hydrogen, protium, deuterium, and tritium, suitably refer to molecular (or diatomic) forms thereof. The same applies to other elemental gases.

Herein, the term heteroisotopic diatomics may include HD (protium-deuterium), HT (protium-tritium), and/or DT (deuterium-tritium), whilst homoisotopic diatomics may include protium ($H_2$, otherwise known as dihydrogen, diatomic hydrogen, or elemental hydrogen), deuterium ($D_2$, otherwise known as dideuterium or diatomic deuterium), and/or tritium ($T_2$, otherwise known as titritium, or diatomic tritium). In some embodiments, where the context allows, as is especially the case in the context of nuclear fusion, unqualified references to heavy hydrogen molecules, such as deuterium and tritium, may include heteroisotopic diatomics containing a single deuterium or tritium atom.

The "de Broglie wavelength" is a well-known term of art pertaining to the wave properties of matter, and is typically defined by the equation:

$$\lambda = h/mv$$

where $\lambda$ is the de Broglie wavelength wavelength, h is Planck's constant, m is the mass of a particle, and v is the velocity at which the particle is moving. Thus, the de Broglie wavelength is inversely proportional to the momentum of a particle. However, in the context of the invention, references herein to a "de Broglie wavelength" generally refer to thermal de Broglie wavelengths ($\lambda_T$ or $\lambda_{th}$), which approximately equate to the average de Broglie wavelength of gas particles in an ideal gas at the specified temperature. As such, the thermal de Broglie wavelength ($\lambda_{th}$) may be calculated thus:

$$\lambda_{th} = \frac{h}{\sqrt{2\pi m k_B T}}$$

where h is Planck's constant, m is the mass of the relevant gas particle, $k_B$ is the Boltzmann constant, and T is temperature in Kelvin. In terms of units: wavelengths are in metres (m), mass is in kilograms (kg), temperature is in Kelvin (K), Planck's constant is $6.62607004 \times 10^{-34}$ J·s (Joules seconds or $m^2$ kg/s), the Boltzmann constant is $1.380649 \times 10^{-23}$ J·K$^{-1}$ (Joules per Kelvin or $m^2$ kg $s^2$ K$^{-1}$). The following thermal de Broglie wavelengths can thus be calculated:

Diatomic protium ($H_2$) has a mass of $3.35 \times 10^{-27}$ kg, so it's de Broglie wavelength is:
$\lambda_{th}$ (at 300K)=$7.1 \times 10^{-11}$, which is 0.071 nm, 0.7 Å.
$\lambda_{th}$ (at 30K)=$2.24 \times 10^{-10}$, which is 0.224 nm, 2.24 Å.
$\lambda_{th}$ (at 77K)=$1.4 \times 10^{-10}$, which is 0.14 nm, 1.4 Å.

Diatomic deuterium ($D_2$) has a mass of $6.7 \times 10^{-27}$ kg, so it's de Broglie wavelength is:
$\lambda_{th}$ (at 300K)=$5.02 \times 10^{-11}$, which is 0.05 nm, 0.5 Å.
$\lambda_{th}$ (at 30K)=$1.59 \times 10^{-10}$, which is 0.16 nm, 1.6 Å.
$\lambda_{th}$ (at 77K)=$9.90 \times 10^{-11}$, which is 0.099 nm, 0.99 Å.

Diatomic tritium ($T_2$) has a mass of $10 \times 10^{-27}$ kg, so it's de Broglie wavelength is:
$\lambda_{th}$ (at 300K)=$4.11 \times 10^{-11}$, which is 0.04 nm, 0.4 Å.
$\lambda_{th}$ (at 30K)=$1.3 \times 10^{-10}$, which is 0.13 nm, 1.3 Å.

Quantum-scale features, including cavities of POCs, may interact with substances having comparable thermal de Broglie wavelengths. For this reason, kinetic quantum sieves require ultrafine pore apertures (~3 Å).

Herein, the term "particle size" suitably refers respectively to the length of the longest dimension of a given particle. Particle sizes may be measured using methods well known in the art, including a laser particle size analyser and/or electron microscopes (e.g. transmission electron microscope, TEM, or scanning electron microscope. SEM).

Herein, the term "pore size", "cavity size", or "window size" (e.g. a pore/cavity window) suitably refers respectively to the length of the shortest dimension of a given pore, cavity, or window. Pore, cavity, and window sizes may be measured using methods well known in the art, including a laser particle size analyser and/or electron microscopes (e.g. transmission electron microscope, TEM, or scanning electron microscope, SEM), or otherwise calculated form crystal structures. However, pore, cavity, and window sizes may be determined by single-crystal analysis and/or molecular dynamics, for instance to provide a pore-limiting envelope (PLE). As such, pore size (or cavity size) may be a pore-limiting envelope (PLE) or pore-limiting diameter (PLD). Herein, whilst the term "cavity size" or any sizes given in relation to a cavity, may optionally refer to the size of a cavity's "window" or "windows", which may be smaller than the cavity (or pore) size itself, most suitably the term "cavity size" pertains to the cavity or pore itself rather than its windows. The size given in respect of a cavity may be restated as a "pore size".

Herein, where a "PLE" is given as a specific value, this suitably means a PLE centred at that specific value, since the PLE itself is a distribution. Alternatively, this PLE value may instead be the same PLD value (where PLD is more straightforward to calculate geometrically without the need for molecular dynamics simulation).

Whilst distributions (especially the width thereof) in cavity/pore sizes may change with temperature (i.e. higher temperatures generally provide wider distributions), especially where such pores are "breathable"/flexible, in general static (i.e. statically-calculated) pore size, average pore size, or the central value of a pore-limiting envelope does not significantly change with temperature (e.g. between SATP and 30 K). Cavity or pore sizes stipulated herein without any temperature qualification may thus refer to said cavity/pore size at either SATP or a relevant "contacting temperature".

The "size" of a substance, be it a single atom (atomic size) or molecule (molecular size), can be deduced by methods well known in the art. Typically, the size refers to the longest single dimension or the diameter of a sphere (or hypothetical sphere) to which the atom or molecule correspond. For a single atom, the Van der Waals radius may be used to calculate a corresponding atomic size (i.e. a Van der Waals diameter, which is two times its Van der Waals radius). For a molecule, such as diatomic hydrogen or any of its isotopic permutations, a size or length may be calculated by reference to bond length and relevant Van der Waals radii of respective atoms forming the molecules. Alternatively, a molecule's size may be determined via Van der Waals volume. Unless otherwise stated, such sizes are calculated at SATP.

Solubilities of solutes may be defined as follows, wherein parts of solvent and parts of solute are parts by weight:

| Descriptive Level | Parts of solvent per 1 part of solute (material) |
|---|---|
| Very Soluble | Less than 1 |
| Freely Soluble | From 1 to 10 |
| Soluble | From 10 to 30 |
| Sparingly Soluble | From 30 to 100 |
| Slightly Soluble | From 100 to 1000 |
| Very Slightly Soluble | From 1000 to 10,000 |
| Practically Insoluble, or Insoluble | More than 10,000 |

General Points and Advantages Regarding the Invention

The present invention arose through the surprising discovery that porous organic cages could be modified, through internal post-functionalization (i.e. modifying their cavities without modifying their exterior), and yet still crystallize in an isostructural manner. This opened up possibilities to fine tune internal cavity sizes (and thus pore sizes, or pore window sizes), by judicious post-functionalization (i.e. functionalizing the cavity after the essential framework of the molecule has been essentially built) optionally via protection-deprotection strategies, without undermining crystal structures that have been established to provide a potentially valuable interconnected pore network. The inventors thereafter discovered that porous organic cages, which are so convenient in so many respects, could be fine-tuned to afford sufficiently small pore sizes to potentially enable kinetic quantum sieving of gaseous targets. The inventors then showed that porous organic cages could be tuned to selectively separate deuterium from hydrogen and thereby provide a route to high-purity deuterium. Such achievements render plausible the selective extraction of other hydrogen isotopes, including tritium or mixed diatomics, such as protium-deuterium (HD), protium-tritium (HT), and deuterium-tritium (DT), including from mixtures such as nuclear fusion exhausts, which may additionally include helium and/or other by-products.

The present invention therefore solves problems inherent with the prior art.

The present invention provides valuable alternative materials which inter alia increase the future viability, practically and commercially, of nuclear fusion.

The present invention provides for precise pores sizes, owing to facile fine-tunability, that enables highly selective sorption of desired target substances, such as deuterium.

The materials used in the present invention are extremely easy to manufacture, efficiently (and generally without the need for any intermediate purification) and in high yield, and, due to being soluble, allow for facile processing and handling in a liquid state.

The inventors' experimentation with co-crystals revealed that two different porous organic cages could be co-crystallized to afford crystals that were isostructural to at least one of (if not both of) the input porous organic cages. This unlocked further possibilities for judicious modifications of properties without the usual concerns associated with undermining a crystal structural that had been established as valuable (e.g. for its interconnected porous network). The inventors therefore conceived of co-crystallizing the aforementioned small-pore cages with large-pore cages. In so doing, the inventors found that not only could sorption volumes be increased (for a given temperature and pressure), target selectivity could also be increased. Without wishing to be bound by theory, this surprising result may stem from a complementary interplay between classical diffusion, quantum tunnelling, and wave diffraction.

The invention therefore additionally provides materials that exhibit high selectivities and high sorption capacities.

Whilst the present invention can be deployed to selectively separate various targets from mixtures, it is particularly well suited to extracting deuterium from mixtures containing deuterium and hydrogen. However, using the same inventive principles, porous organic cages can be fine-tuned to target tritium. In this manner, the invention can be deployed to treat tritiated water or other tritium by-products emanating from nuclear power plants, including from accidents such as the Fukushima reactor. Tritiated (and thus radioactively-contaminated) water treatments may involve performing electrolysis upon the contaminated water to first produce a gaseous mixture comprising $T_2$ and/or H-T (most likely in admixture with $H_2$) prior to separation of tritiated gas molecules via methods of the present invention.

Methods Involving Sorption of Target Substances

The present invention provides a variety of methods involving the sorption of one or more target substance(s). Such methods invariably use a sorption composition (or sorption device comprising said sorption composition) to preferentially sorb the target substance(s) from a target mixture containing the target substance(s) along with one or more non-target substance(s). The sorption composition suitably sorbs the target substance(s) selectively (or preferentially) over the non-target substance(s). The nature of the sorption composition (or sorption device) used in these methods is defined herein, and such definitions of sorption compositions are applicable to any or all embodiments of these methods.

Method of Preferentially Sorbing

The present invention provides a method of preferentially sorbing one or more target substance(s). Said method is preferably a method of preferentially (or selectively) sorbing one or more target substance(s) over one or more non-target substance(s). The method suitably comprises contacting a target mixture with a sorption composition as defined herein. The method may equally comprise contacting the target mixture with a sorption device, wherein the sorption device comprises the sorption composition. The target mixture suitably comprises, consists essentially of, or consisting of the target substance(s) and the non-target substance(s). The sorption composition suitably comprises, consists essentially of, or consists of a sorption compound. Preferably, the sorption composition comprises, consists essentially of, or consists of both a sorption compound and a co-crystallization compound.

According to an aspect of the present invention there is provided a method of preferentially sorbing one or more target substance(s) over one or more non-target substance(s) from a target mixture comprising, consisting essentially of, or consisting of the target substance(s) and the non-target substance(s), the method comprising contacting the target mixture with a sorption composition (or with a sorption device comprising the sorption composition), wherein the sorption composition comprises, consists essentially of, or consists of a sorption compound and optionally a co-crystallization compound.

The method suitably provides a sorbed composition (i.e. a sorption composition with target substance(s) sorbed therein), comprising the one or more target substance(s) (and optionally one or more non-target substance(s)) and a treated target mixture comprising the one or more non-target substance(s) (and optionally one or more target substance(s)). The sorbed composition is suitably richer in target substance(s) (relative to non-target substance(s)) than the treated target mixture. The treated target mixture is suitably richer in non-target substance(s) (relative to target substance(s)) than the sorbed composition. The sorbed composition may be suitably released from the sorption composition by desorption to provide a desorbed composition, preferably after the treated target mixture has been removed from contact with the sorption composition. The desorbed composition is suitably (substantially) the same as the sorbed composition, except that it is no longer sorbed within the sorption composition. The desorbed composition may itself become a target mixture for a further round of the method, thereby providing an opportunity to further purify target substance(s).

The target substance(s), non-target substance(s), and target mixture(s) described below (and elsewhere herein) are applicable to any aspects and embodiments of a method of preferentially sorbing or indeed other methods incorporating the method of preferentially sorbing. The same applies to method conditions and characteristics, such as contacting conditions, sorbing characteristics, and apparatuses.

Target Substance(s), Non-Target Substance(s), and Target Mixtures Thereof

The target mixture is suitably a gaseous mixture at SATP. The target mixture is suitably a gaseous mixture at the relevant contacting temperature (see below). Suitably the target substance(s) have a melting point less than 200 K, suitably less than 100 K, more preferably less than 75 K, more preferably less than 40 K, more preferably less than 20 K, most preferably less than 15 K.

Preferably, the target substance(s) is/are a substance(s) intended for sorption whereas the non-target substance(s) is/are a substance(s) designated for separation from the target substance(s), though some non-target substance(s) may be co-sorbed along with the target substance(s), albeit preferably in lower relative quantities. As such, whilst the target mixture may consist of the target substance(s) and non-target substance(s), the target mixture may comprise the target substance(s) and non-target substance(s) and optionally additional substance(s). Such additional substance(s) may include one or more carrier gases, potentially deliberately included to facilitate overall processing. Alternatively, the additional substance(s) may be present for some other reason. In such cases, the additional substance(s) are preferably less sorbable (in the context of the method of preferentially sorbing) than even the non-target substance(s).

In an embodiment, the target substance(s) and non-target substance(s) are chemically different—for instance, suitably the target substance(s) and non-target substance(s) may be chemically different in terms of their elemental composition. The target substance(s) and non-target substance(s) may be physically different—for instance, the target substance(s) and non-target substance(s) may have a different size (e.g. in terms of the largest dimension or effective molecular radii, for example, wherein the larger-sized species are larger than the small-sized species by at least 2% of the smaller-sized species at SATP, suitably by at least 5%, suitably by at least 10%). For example, the target substance and non-target substance (target/non-target pair) may be respectively selected from group consisting of $H_2/N_2$, $H_2/CO$, $CH_4/N_2$, and Xe/Kr (in the case of Xe/Kr, either may be the target whilst the other is a non-target).

In preferred embodiment, the target substance(s) and non-target substance(s) are the same except for isotopic differences—for instance, suitably the target substance(s) and non-target substance(s) may be chemically the same in terms of their elemental composition. The target substance(s) and non-target substance(s) may be (substantially) the same size (e.g. in terms of largest dimension or effective molecular radii, for example, wherein any larger-sized species are larger than the small-sized species by at most 2% of the smaller-sized species at SATP, suitably by at most 1%, suitably by at most 0.5%). In such scenarios, any additional substance(s) within the target mixture are suitably different to the target substance(s) beyond mere isotopic differences—for instance, the additional substance(s) may be chemically different in terms their elemental composition and/or the additional substance(s) may be physically different in terms of size.

Preferably, the target substance(s) are heavier (in terms of atomic or molecular weight, whichever is applicable) than the non-target substance(s). In preferred embodiments, the target substance(s) comprise isotopically differentiated forms of the non-target substance(s). Suitably, in such embodiments, the isotopic forms of the target substance(s) are heavier isotopes than those of the non-target substance(s).

Suitably, the de Broglie wavelength of the target substance(s) at SATP is between 0.1 to 3.5 Å. Suitably, the de Broglie wavelength of the target substance(s) at SATP is between 0.2 to 2.0 Å. Suitably, the de Broglie wavelength of the target substance(s) at SATP is between 0.3 to 1.0 Å. Preferably, the de Broglie wavelength of the target substance(s) at SATP is between 0.3 to 0.8 Å.

Suitably, the de Broglie wavelength of the target substance(s) at the relevant contacting temperature is between 0.2 to 4.0 Å. Suitably, the de Broglie wavelength of the target substance(s) at the relevant contacting temperature is between 0.3 to 3.5 Å. Suitably, the de Broglie wavelength of the target substance(s) at the relevant contacting temperature is between 0.5 to 2.5 Å. Suitably, the de Broglie wavelength of the target substance(s) at the relevant contacting temperature is between 1 to 3.0 Å. Suitably, the de Broglie wavelength of the target substance(s) at the relevant contacting temperature is between 1 to 2.0 Å. Suitably, the de Broglie wavelength of the target substance(s) at the relevant contacting temperature is between 1.2 to 1.9 Å. Preferably, the de Broglie wavelength of the target substance(s) at the relevant contacting temperature is between 1.4 to 1.7 Å.

Suitably, the de Broglie wavelength of the non-target substance(s) at the relevant contacting temperature is between 1 to 5.0 Å. Suitably, the de Broglie wavelength of the non-target substance(s) at the relevant contacting temperature is between 2 to 4.0 Å.

Preferably, at SATP, the difference between the de Broglie wavelength of the target substance(s) and that of the non-target substance(s) is at least 0.1 Å. Preferably, at the relevant contact temperature, the difference between the de Broglie wavelength of the target substance(s) and that of the non-target substance(s) is at least 0.2 Å, more suitably at least 0.4 Å different.

Preferably, the target substance(s) have a shorter (or lower) de Broglie wavelength than the non-target substance(s). Preferably, at SATP, the target substance(s) have a de Broglie wavelength that is at least 0.1 Å smaller than the non-target substance(s).

Preferably, at the relevant contact temperature, the target substance(s) have a de Broglie wavelength that is at least 0.2 Å smaller than the non-target substance(s), more suitably at least 0.4 Å smaller.

Preferably, at SATP, the difference between the de Broglie wavelength of the target substance(s) and that of any additional substance(s) is at least 0.1 Å, more suitably at least 0.2 Å. Preferably, at the relevant contact temperature, the difference between the de Broglie wavelength of the target substance(s) and that of any additional substance(s) is at least 0.2 Å, more suitably at least 0.4 Å different, more suitably at least 0.6 Å different.

Preferably, the target substance(s) have a shorter (or lower) de Broglie wavelength than any additional substance(s). Suitably, the non-target substance(s) have a shorter (or lower) de Broglie wavelength than any additional substance(s), though in some embodiments they may be similar, e.g. within +/−0.5 Å.

Suitably, the de Broglie wavelength of the target substance(s) at SATP is within +/−5 Å of the cavity size of the sorption compound. Suitably, the de Broglie wavelength of the target substance(s) at SATP is within +/−4 Å of the cavity size of the sorption compound. Suitably, the de Broglie wavelength of the target substance(s) at SATP is within +/−3.5 Å of the cavity size of the sorption compound. More preferably, the de Broglie wavelength of the target substance(s) at SATP is within +/−2 Å of the cavity size of the sorption compound. Suitably, the de Broglie wavelength of the target substance(s) at SATP is within +/−1 Å of the cavity size of the sorption compound. Suitably, the de Broglie wavelength of the target substance(s) at SATP is within +/−0.5 Å of the cavity size of the sorption compound.

Suitably, the de Broglie wavelength of the target substance(s) at the relevant contact temperature is within +/−5 Å of the cavity size of the sorption compound. Suitably, the de Broglie wavelength of the target substance(s) at the relevant contact temperature is within +/−4 Å of the cavity size of the sorption compound. Suitably, the de Broglie wavelength of the target substance(s) at the relevant contact temperature is within +/−3.5 Å of the cavity size of the sorption compound. More preferably, the de Broglie wavelength of the target substance(s) at the relevant contact temperature is within +/−2 Å of the cavity size of the sorption compound. Suitably, the de Broglie wavelength of the target substance(s) at the relevant contact temperature is within +/−1 Å of the cavity size of the sorption compound. Suitably, the de Broglie wavelength of the target substance(s) at the relevant contact temperature is within +/−0.5 Å of the cavity size of the sorption compound. Suitably, the de Broglie wavelength of the target substance(s) at the relevant contact temperature is within +/−0.4 Å of the cavity size of the sorption compound.

Suitably, the de Broglie wavelength of the target substance(s) at the relevant contact temperature is smaller than the cavity size of the sorption compound. Suitably, the de Broglie wavelength of the target substance(s) at the relevant contact temperature is smaller than the cavity size of the sorption compound by at most 5 Å, suitably by at most 4 Å, suitably by at most 3.5 Å, preferably by at most 2 Å, suitably by at most 1 Å, suitably by at most 0.5 Å, suitably by at most 0.4 Å.

Suitably, the de Broglie wavelength of the non-target substance(s) at the relevant contact temperature is larger than the cavity size of the sorption compound. Suitably, the de Broglie wavelength of the non-target substance(s) at the relevant contact temperature is greater than the cavity size of the sorption compound by at most 5 Å, suitably by at most 4 Å, suitably by at most 3.5 Å, preferably by at most 2 Å, suitably by at most 1 Å, suitably by at most 0.5 Å, suitably by at most 0.4 Å.

Suitably, the non-target substance(s) have a shorter (or lower) de Broglie wavelength, at the relevant contact temperature, than any additional substance(s), though in some embodiments they may be similar, e.g. within +/−0.5 Å.

Suitably, the size (e.g. molecular size) of the target substance(s) is smaller than the cavity size of the sorption compound. Suitably, the size (e.g. molecular size) of the non-target substance(s) is smaller than the cavity size of the sorption compound. Suitably the size (e.g. molecular size) of the target substance(s) and non-target substance(s) are approximately the same, suitably substantially the same, suitably within +/−0.5 Å, more suitably with +/−0.3 Å, more suitably with +/−0.2 Å, more suitably with +/−0.1 Å, more suitably with +/−0.05 Å, more suitably with +/−0.01 Å.

Suitably, the size of any additional substance(s) is larger than the cavity size of the sorption compound. Suitably, the size of any additional substance(s) is larger than the non-target substance(s). However, the size of any additional substance(s) (e.g. carrier gases or substances different to the target and non-target substance(s)) may be within +/−0.5 Å of the non-target substance(s).

Preferably both the target substance(s) and non-target substance(s) comprise or consist of isotopically differentiated substances, where the isotopes of the target substance(s) are heavier than those of the non-target substance(s). Most preferably, both the target substance(s) and non-target substance(s) comprise or consist of isotopically differentiated hydrogen molecules, where the isotopes of the target substance(s) are heavier than those of the non-target substance(s).

Quantum sieving of isotopes tends to be more selective the larger the differences between respective de Broglie wavelengths of the target and non-target substance(s). Since thermal de Broglie wavelengths are inversely proportional to the square root of a substance's mass, differentials in de Broglie wavelengths are maximised between protium and tritium isotopes, though they are still very pronounced between protium and deuterium isotopes.

Preferably, the methods of preferentially sorbing described herein are for separating target substance(s) from non-target substance(s), more preferably for separating isotopes of hydrogen (e.g. separating different isotopic forms of molecular hydrogen, whether homoisotopic or heteroisotopic), most preferably for separating one or more heavier hydrogen isotopes (e.g. separating one or more heavier isotopic forms of molecular hydrogen) from one or more lighter hydrogen isotopes (e.g. from one or more lighter isotopic forms of molecular hydrogen). The three most common and stable isotopes of hydrogen, in order of increasing heaviness, are protium ($^1$H or H), deuterium ($^2$H or D), and tritium ($^3$H or T). Preferably, therefore, the target substance(s) comprise or consist of form(s) of molecular hydrogen comprising or consisting of either or both deuterium atoms ($^2$H or D) and/or tritium atoms ($^3$H or T)—this may include $D_2$, HD, $T_2$, HT, and/or DT. Preferably the non-target substance(s) is or comprises molecular protium ($^1H_2$ or $H_2$). In some embodiments, however, it may be desirable to separate tritium from either or both protium and/or deuterium, in which case the target substance is preferably tritium whereas the non-target substance(s) are either or both protium and/or deuterium.

In some embodiments, the target mixture may comprise, consist essentially of, or consist of heteroisotopic diatomics (or mixed diatomics) and/or homoisotopic diatomics (plain diatomics). For instance heteroisotopic diatomics may include HD (protium-deuterium), HT (protium-tritium), and/or DT (deuterium-tritium), whilst homoisotopic diatomics may include protium ($H_2$, otherwise known as dihydrogen, diatomic hydrogen, or elemental hydrogen), deuterium ($D_2$, otherwise known as dideuterium or diatomic deuterium), and/or tritium ($T_2$, otherwise known as tritium, or diatomic tritium).

In a preferred embodiment, the target substance(s) is/are selected from the group consisting of $D_2$, $T_2$, HD, HT, and DT. In a particularly preferred embodiment, the target substance is $D_2$. In another embodiment, the target substance is $T_2$. In some embodiments, the target substance(s) may include heteroisotopic hydrogen molecules.

In a preferred embodiment, the non-target substance(s) is/are selected from the group consisting of $H_2$, $D_2$, $T_2$, HD, HT, and DT, on the proviso that the non-target substance(s) exclude the target substance(s). Preferably, the non-target substance(s) is or comprises $H_2$.

In preferred embodiments, the target mixture comprises, consists essentially of, or consists of two or more selected form the group consisting of $H_2$, $D_2$, $T_2$, HD, HT, and DT. In some embodiments, the target mixture comprises, consists essentially of, or consists of three or more selected form the group consisting of $H_2$, $D_2$, $T_2$, HD, HT, and DT. In a particularly preferred embodiment, the target mixture comprises or consists of $H_2$ and $D_2$.

In the context of nuclear fusion, exhaust (output) gases may include a mixture of two or more of $H_2$, $D_2$, $T_2$, HD, HT, and DT (some of which may be target substance(s), others of which may be non-target substance(s)) and possibly additional substance(s), for instance, helium (He). Such an exhaust mixture may constitute a target mixture in the context of the invention. In such a scenario, target substance(s) may comprise any one or more of $D_2$, $T_2$, HD, HT, and DT, whilst non-target substance(s) may include one or more of $H_2$, $D_2$, $T_2$, HD, HT, and DT other than those of the target substance(s), and optionally the additional substance(s) may comprise helium.

In a particularly preferred embodiment, the target mixture comprises, consists essentially of, or consists of $H_2$ and $D_2$; the target substance(s) is or comprises $D_2$; and the non-target substances(s) is or comprises $H_2$.

In a particular embodiment, the target mixture comprises, consists essentially of, or consists of $H_2$ and $T_2$; the target substance(s) is or comprises $T_2$; and the non-target substances(s) is or comprises $H_2$.

Contacting Conditions—Temperature, Pressure, Exposure Time, and Other Conditions As with the sorption materials (e.g. sorption compound and/or co-crystallization compound) deployed in the context of the invention, the conditions used in methods of the invention may be chosen to optimise selectivity and/or optimise sorption volume/capacity (i.e. sorb the largest possible volume of target substance(s)). Most suitably, however, the conditions may be chosen for an optimum balance between both selectivity and sorption capacity. This is especially the case where multiple sorption rounds are envisaged (i.e. where sorbed substance(s) are fed back into the sorption process to further purify or further select target substance(s)).

The method suitably comprises contacting the target mixture with a sorption composition (or with a sorption device comprising the sorption composition) at a particular contacting temperature. The contacting temperature is suitably the temperature of the target mixture during (or immediately prior to) contacting. The contacting temperature may be the same or substantially the same as the temperature of the sorption composition or sorption device. During contacting, the temperature of the sorption composition or sorption device may suitably be within 100 K of the temperature of the target mixture, more suitably within 50 K thereof, more suitably within 20 K thereof, most suitably within 5K thereof. The temperature of the sorption composition or sorption device may be controlled separately from the temperature of the target mixture, for instance, to facilitate processing (e.g. freezing following the contacting step in order to keep the sorbed contents sorbed within the composition whilst the target mixture is separated therefrom—this may avoid premature desorption).

The contacting temperature affects the de Broglie wavelength (i.e. thermal de Broglie wavelength) of relevant target substance(s), non-target substance(s), and optional additional substance(s). Moreover, decreasing contacting temperature magnifies the difference between de Broglie wavelengths of target substance(s) and non-target substance(s). As such, quantum sieving is generally more selective at lower temperatures. As such, the contacting temperature is suitably set for preferential sorption of the target substance(s), suitably based on a correspondence between cavity size of the sorption compound and the de Broglie wavelength, at the relevant contacting temperature, of the target substance(s).

Contact temperature, especially the temperature of the sorption composition (or sorption device), can affect the distribution of cavity sizes of the sorption compound (and indeed co-crystallisation compound), since increasing temperatures increase vibrational freedom, and allows the cavities to exhibit transiently larger sizes, which may impact (i.e. decrease) selectivity and may also impact on overall sorption capacity (which again may compromise selectivity). Furthermore, higher temperatures may more rapidly bring about an equilibrium (i.e. thermodynamic) sorption scenario which may result in lower selectivity—in other words, kinetic control may provide higher selectivities.

Preferably the target mixture is a gaseous mixture at SATP. Preferably, the target mixture remains a gaseous mixture at the contacting temperature. Preferably, the contacting temperature is greater than the melting point the target substance(s). Preferably, the contacting temperature is greater than the melting point the non-target substance(s).

The contacting temperature is suitably at least 15 K, suitably at least 20 K, suitably at least 25 K. The contacting temperature is suitably at most 300 K, suitably at most 200 K, suitably at most 100 K. In a particular embodiment, the contacting temperature is between 15 and 100 K, suitably between 20 and 80 K. In a particular embodiment, the contacting temperature is between 20 and 60 K. In a particular embodiment, the contacting temperature is between 25 and 40 K, suitably between 25 and 35 K.

The method suitably comprises contacting the target mixture with a sorption composition (or with a sorption device comprising the sorption composition) at a particular contacting pressure. The contacting pressure may be optimised for a particular contacting temperature. Whilst increasing pressure may increase total sorption (i.e. of all substance(s)), there may be an optimum pressure for selectivity. In such embodiment, the contacting temperature may suitably be between 0.1 and 500 mbar, more suitably between 1 and 100 mbar, most suitably between 5 and 50 mbar (especially for the lowest temperatures). However, in some circumstances (e.g. for embodiments of the invention involving co-crystals), increasing pressure may increase selectivity. As such, desirably, the contacting pressure may be at least 10 mbar, suitably at least 100 mbar, more suitably at least 500 mbar, more suitably at least 900 mbar. The contacting temperature may be at most 10,000 mbar, suitably at most 5,000 mbar, suitably at most 2,000 mbar, suitably at most 1,100 mbar.

The method may comprise contacting the target mixture with a sorption composition (or with a sorption device comprising the sorption composition) at a varied contacting pressure. For instance, the method may comprise pressure swing adsorption. In such embodiments, the contacting pressure may swing from a relatively high pressure to a relatively low pressure. At the relatively high pressure preferential sorption of target substance(s) is promoted, whereas desorption of the target substance(s) (potentially admixed with a proportion of non-target substance(s)) is promoted at the relatively low pressure. Between the two pressure swings, the target mixture may be removed (and possibly channeled or stored in readiness for a further round of the method of the invention, downstream in a separate vessel or apparatus) in readiness for the target substance(s) to be desorbed and potentially subjected to a further round of the method of the invention (optionally in the same or a different vessel or apparatus, optionally downstream) to further purify the target substance(s). Alternatively the varied contacting pressure (which may follow a pre-programmed envelope over a predetermined period of time) may facilitate sorption and desorption in a manner that furnishes greater selectivity and/or greater overall sorption volumes—for instance, it may allow a degree of "shuffling" that overall favours sorption of the target substance(s). It is also envisaged that temperature swing adsorption may be implemented either with or without pressure swing adsorption, suitably achieving the same end.

The method suitably comprises contacting the target mixture with a sorption composition (or with a sorption device comprising the sorption composition) for a particular contact time (or exposure time). Whilst higher contact times invariably facilitate greater overall sorption volumes, this can (depending on other conditions and the sorption materials in question—e.g. if pressure and/or temperature swing adsorption processes are deployed then a prolonged process may yield higher selectivities) reduce sorption selectivities. Longer contact times favour thermodynamic control whilst shorter contact times favour kinetic control. As such, contact time may be chosen to optimise either or both sorption volume and/or selectivity, though most preferably contact time is chosen for an optimum balance between the two. The contact time is suitably greater than or equal to 1 min, suitably greater than or equal to 5 min. The contact time is suitably less than or equal to 1.200 min, suitably less than or equal to 800 min, suitably less than or equal to 600 min, suitably less than or equal to 120 min. The present inventors in fact discovered that sorption compositions of the invention tend to retain selectivities over prolonged contact times, in contrast to compositions of the prior art. This allows for longer contact times that, in turn, facilitate greater overall sorption volumes.

The method may comprise contacting the target mixture with a sorption composition (or with a sorption device comprising the sorption composition) by pumping (or passing) the target mixture through the sorption composition (or sorption device), suitably in continuous (potentially cyclical) fashion. In embodiments, the sorption device is or comprises a column or cartridge comprising the sorption composition, optionally mixed with another solid material that facilitate gas flow—as such, the sorption composition (optionally mixed with another solid) may suitably behave as a stationary phase. Following contacting, the stationary phase may exhibit a sorption gradient in terms of target vs non-target substance(s) sorbed. In an embodiment, the sorption composition or sorption device may serve a chromatography function—as such, a chromatography apparatus (e.g. gas chromatography apparatus) may comprise the sorption composition or sorption device.

In some embodiments, the sorption composition (or sorption device) is a membrane or film.

Sorbing Characteristics

Sorption of the target substance(s) is suitably via physisorption.

The method suitably provides for a sorption volume (or sorption uptake) of target substance(s) and/or non-target substance(s) of at least 1 mmol/g (i.e. 1 mmol of target/non-target substance(s) per gram of sorption composition, or per gram of sorption compound and/or co-crystallized compound combined) at 1 bar at the relevant contacting temperature, more suitably at least 2 mmol/g, more suitably at least 4 mmol/g, more suitably at least 6 mmol/g.

The method suitably provides a sorption selectivity (i.e. ratio, such as molar ratio, volume ratio, or weight ratio, of sorbed target substance(s) to sorbed non-target substance(s), preferably a molar ratio) of target substance(s) to non-target substance(s) of at least 1.5, suitably at least 2, more suitably at least 3, more suitably at least 6, and most suitably at least 7. The method may be tuned to provide such selectivities, optionally at the expense of or in favour of overall sorption volume (i.e. uptake). Selectivity is suitably determined via TDS after exposing the sorption composition to a target mixture (most suitably a 1:1 mixture of target substance/non-target substance, e.g. $D_2/H_2$).

Apparatus

An apparatus suitable for performing the methods of the present invention may suitably comprise a sealed vessel, an inlet (suitably for the target mixture), an outlet (suitably for a treated target mixture—i.e. the target mixture less any sorbed substance(s)), a fluid pathway through the sealed vessel fluidly connecting (optionally in a controllably interrupted or discontinuous manner, e.g. via one or more intervening valves) the inlet to the outlet, and a sorption composition (or sorption device comprising the sorption composition) located within the vessel along the fluid pathway. The sorption composition (or sorption device) is suitably located at a sorption station (a place where sorption may occur). The sorption composition is suitably contained within a sorption device, such as a cartridge or column, installed (optionally releasably) along the fluid pathway, suitably such that a target mixture is constrained to pass therethrough. Suitably the apparatus comprises a target mixture temperature control mechanism for controlling the temperature of the target mixture, especially during contacting with the sorption composition. Suitably the apparatus comprises a sorption composition temperature control mechanism for controlling the temperature of the sorption composition, especially during contacting with the sorption composition but potentially also afterwards (e.g. to temporarily cool the sorption composition whilst the treated target mixture is removed from contact therewith, prior to desorption which released target substance(s) sorbed therein). Suitably the target mixture temperature control mechanism is operable independently from the sorption composition temperature control mechanism. Suitably the apparatus comprises a target mixture pressure control mechanism for controlling the pressure of the target mixture, especially during contacting. The pressure control mechanism may be operable to provide pressure swings to facilitate pressure swing adsorption.

The apparatus may comprise two or more sorption stations comprising a sorption composition (or sorption device). Second and subsequent sorption stations may be configured to receive increasingly purified desorbed target substance(s)(which may also contain some non-target substance(s)) as an input target mixture, wherein each treated (output) target mixture is separated from the process.

Method of Manufacturing, Method of Extracting, or Method of Purifying One or More Target Substance(s)

Suitably, the methods of preferentially sorbing, as defined herein, are used to manufacture, extract, or purify the target substance(s), notwithstanding that non-target substance(s) may also be purified (or enriched) via the same process. A method of manufacturing, extracting, or purifying the target substance(s) may, in practice, constitute a method of enriching a mixture in the target substance(s). By the same token, the same methods may provide a method of enriching a mixture in the non-target substance(s)—i.e. in treated target mixtures. The same methods may also provide a method of separating target substance(s) from non-target substance(s).

According to an aspect of the present invention there is provided a method of manufacturing, method of extracting, or method of purifying (or method of enriching a mixture in) one or more target substance(s), comprising:
  a. performing a method of preferentially sorbing as defined herein to provide a sorbed composition comprising the one or more target substance(s) (and optionally one or more non-target substance(s)) and a treated target mixture comprising the one or more non-target substance(s) (and optionally one or more target substance(s));
  b. separating or removing the treated target mixture from contact with the sorption composition;
  c. desorbing the sorbed composition from the sorption composition to provide a desorbed composition.

The method may further comprise repeating steps a-c by feeding the desorbed composition into the method of preferentially sorbing as a target mixture. In this manner, the target substance(s) may be repeatedly enriched or purified.

The method may further comprise isolating the desorbed composition or isolating the target substance(s).

Pre-Sorption Steps

Prior to performing the method of preferentially sorbing, the method may suitably comprise pre-filtering the target mixture, suitably via a membrane or other such filtration device. Such pre-filtration suitably removes a portion of any additional substance(s), for instance, additional substance(s) having a larger size than the target substance(s) and/or the non-target substance(s).

Separating or Removing the Treated Target Mixture

Separating or removing the treated target mixture from contact with the sorption composition suitably comprises pumping the treated target mixture away from the sorption composition, suitably via an outlet.

Suitably, the sorption composition and any sorbed composition sorbed therein, may be further cooled prior to and/or during separating or removing the treated target mixture. Suitably the sorption composition is cooled independently of the treated target mixture. Cooling the sorption composition suitably keeps (or increases retention of) the sorbed composition sorbed therein whilst the treated target mixture is removed (e.g. under vacuum).

Desorbing

Desorbing the sorbed composition from the sorption composition suitably comprises either or both elevating temperature and/or reducing pressure.

The temperature of the sorption composition may raised via a temperature control mechanism associated with the sorption composition (e.g. a heating/cooling element associated with the sorption composition or sorption device) and/or a temperature control mechanism associated with the target mixture—however the latter may be less effective at low pressures. As such, desorbing suitably involves direct application of heat, or direct elevation of temperature (as compared with contacting temperature), of the sorption composition or sorption device, suitably via a separate heating/cooling mechanism to that which may otherwise be applied to a target mixture.

Desorption may suitably involve elevating the temperature by at least 10K, suitably by at least 30K, suitably by at least 40K.

Reducing pressure may simply involve generation of a vacuum. Desorption may suitably involve reducing pressure (suitably the pressure in any vessel or void space around or in contact with the sorption composition or sorption device) by at least 1 mbar, suitably by at least 10 mbar, suitably by at least 50 mbar, suitably by at least 200 mbar, suitably by at least 500 mbar.

Suitably desorption is triggered after separation/removal of a treated target mixture.

Repeating

Repeating steps a-c may suitably involve using the desorbed composition as a target mixture in a subsequent round of the method. The desorbed composition may be contacted with the same sorption composition (or sorption device) as that used in the preceding round or a different sorption composition (or sorption device), suitably in a different part of the apparatus (e.g. a second or subsequent sorption station—see above). Suitably the sorbed composition and desorbed composition is further enriched in the target substance(s) as compared to the same in the previous round of the method. As such, successive repetitions of method steps a-c suitably further enrich the sorbed composition or desorbed composition in the target substance(s) and/or further increase the purity of target substance(s) to be ultimately isolated.

Method of Manufacturing, Method of Extracting, or Method of Purifying One or More Non-Target Substance(s)

Notwithstanding that the methods of preferentially sorbing, as defined herein, may be used to manufacture, extract, or purify the target substance(s), the same may be used to manufacture, extract, purify, or enrich non-target substance(s) in a target mixture. In such scenarios, essentially the preferential sorbing removes target substance(s) from a target mixture, thereby leaving the treated target mixture enrich in non-target substance(s).

According to an aspect of the present invention there is provided a method of manufacturing, method of extracting, or method of purifying (or method of enriching a mixture in) one or more non-target substance(s), comprising:
a. performing a method of preferentially sorbing as defined herein to provide a sorbed composition comprising the one or more target substance(s) (and optionally one or more non-target substance(s)) and a treated target mixture comprising the one or more non-target substance(s) (and optionally one or more target substance(s)); and
b. separating the treated target mixture from contact with the sorption composition.

The method may further comprise repeating steps a-b by feeding the treated target mixture into the method of preferentially sorbing as a target mixture. In this manner, the non-target substance(s) may be repeatedly enriched or purified within the treated target mixture. Furthermore, in this manner, the "target substance(s)" are suitably selectively removed from the target mixture.

The method may further comprise isolating the treated target mixture or isolating the non-target substance(s).

Pre-Sorption Steps

Prior to performing the method of preferentially sorbing, the method may suitably comprise pre-filtering the target mixture, suitably via a membrane or other such filtration device. Such pre-filtration suitably removes a portion of any additional substance(s), for instance, additional substance(s) having a larger size than the target substance(s) and/or the non-target substance(s).

Separating or Removing the Treated Target Mixture

Separating or removing the treated target mixture from contact with the sorption composition suitably comprises pumping the treated target mixture away from the sorption composition, suitably via an outlet.

Suitably, the sorption composition and any sorbed composition sorbed therein, may be further cooled prior to and/or during separating or removing the treated target mixture. Suitably the sorption composition is cooled independently of the treated target mixture. Cooling the sorption composition suitably keeps (or increases retention of) the sorbed composition sorbed therein whilst the treated target mixture is removed (e.g. under vacuum).

Repeating

Repeating steps a-b may suitably involve using the treated target mixture as a target mixture in a subsequent round of the method. The treated target mixture may be contacted with the same sorption composition (or sorption device) as that used in the preceding round or a different sorption composition (or sorption device), suitably in a different part of the apparatus (e.g. a second or subsequent sorption station—see above). If the same sorption composition (or sorption device) is to be used, suitably any sorbed composition is desorbed therefrom to produce a desorbed composition that is then removed from contact with the sorption composition (or sorption device) prior to any further contact thereof with the treated target mixture. Suitably the treated target mixture is thus further enriched in the non-target substance(s) as compared to the same in the previous round of the method. As such, successive repetitions of method steps a-b suitably further enrich the treated target mixture in the non-target substance(s) and/or further increase the purity of non-target substance(s) to be ultimately isolated.

Method of Removing Target Substance(s)

According to an aspect of the present invention there is provided a method of removing one or more target substance(s) from a target mixture comprising, consisting essentially of, or consisting of the target substance(s) and one or more non-target substance(s), the method comprising performing a method of preferentially sorbing as defined herein. This method may be a method of manufacturing, method of extracting, or method of purifying (or method of enriching a mixture in) one or more non-target substance(s). Such a method may be performed repeatedly to maximise removal of the target substance(s). Such a method is particularly useful, for instance, where it is desirable to remove radioactive tritium from radioactively contaminated water, where suitably said water would be subjected to electrolysis to produce gases hydrogen isotopes which are then subject to the relevant methods. As such, another aspect of the invention provides a method of removing tritium from radioactively-contaminated water, comprising performing the aforementioned method of removing upon electrolysed water.

Compositions and Compounds

According to an aspect of the present invention there is provided a sorption composition comprising the sorption compound. The sorption composition may, in some embodiments, consist of or consist essentially of the sorption compound.

Preferably, the sorption composition further comprises a co-crystallization compound. The sorption composition may, in some embodiments, consist of or consist essentially of the sorption compound and the co-crystallization compound.

The co-crystallization compound may be a compound of the same class as the sorption compound, on the proviso that the co-crystallization is a different compound to the sorption compound.

Preferably, the sorption composition comprises a co-crystal (or co-crystals), suitably wherein the co-crystal(s) comprises the sorption compound co-crystallized with the co-crystallization compound. The sorption composition may, in some embodiments, consist of or consist essentially of the co-crystal(s).

According to an aspect of the present invention there is provided a co-crystal composition. The co-crystal composition suitably comprises or consists of a co-crystal as defined herein. The sorption composition may be a co-crystal composition or vice versa.

Except for the sorption compound and/or co-crystallization compound, the sorption composition is suitably free of any other sorbent materials. Indeed, the sorption composition is suitably free of any other sorbent materials capable of sorbing the non-target substance(s) or additional substance(s).

Except for the sorption compound and/or co-crystallization compound, the sorption composition is suitably free of any other sorbent materials capable of sorbing the target substance(s), especially at the relevant contact temperature. However, in some embodiments, the sorption composition may comprise an additional sorbent material capable of sorbing the target substance(s). The additional sorbent material may be capable of sorbing the target substance(s) at the relevant contact temperature, suitably thereby providing alternative sorbent pores optionally exhibiting a different selectivity to the sorption compound (or co-crystal). Such an additional sorbent material may optionally be co-crystallized with the sorption compound and/or co-crystallization compound. The additional sorbent material may be more capable (e.g. in terms of relative sorption capacity/volumes) than the sorption compound, the co-crystallization compound, and/or the co-crystal(s), of sorbing the target substance(s) at temperatures higher than the relevant contact temperature and/or pressures lower than the relevant contact pressure, suitably thereby increasing transient retention of the target substance(s) within the sorption composition whilst the treated target mixture is separated therefrom.

The sorption composition may comprise additional non-sorbent materials.

The sorption composition may be a free-flowing, suitably crystalline, solid. However the sorption composition may be formulated as granules. The sorption composition may be compacted. The sorption composition may be formulated as a membrane or film.

Sorption Compound

The sorption compound is suitably a porous compound, suitably in that the sorption compound comprises pores. A porous compound suitably has porous molecules that pack in the solid state to produce pores—the sorption compound suitably exhibits solid-stage porosity. Pores are suitably permeable to liquids and/or gases, most suitably to gases.

The sorption compound suitably comprises a multidimensional (at least 2-dimensional, preferably 3-dimensional) interconnected (suitably via interconnecting voids) porous network. Such pores may be extrinsic pores, suitably arising from haphazard or inefficient packing (perhaps owing to an 'awkward' molecular structure) or from predisposed intermolecular interactions (e.g. electrostatic, dipolar, hydrogen bonding) which energetically favour low-density crystallization configurations. Extrinsic pores are pores between neighbouring molecules as opposed to pores within the individual molecules themselves. Alternatively, such pores may be intrinsic pores, suitably arising from cavities within the porous molecules themselves—such intrinsic voids are independent of overall crystal structure, or at least less dependent thereon than extrinsic pores or voids. Intrinsic pores tend to arise in porous cages—molecules with permanent voids confined within their inherent molecular structure. "Windows" define access points to pores, and any sizes given herein in respect of pore size or cavity size may optionally refer to the size of the window(s). The porous compound may comprise or consist of either or both intrinsic and/or extrinsic pores (or voids).

The sorption compound suitably comprises at least one internal cavity. The internal cavity is preferably chemically modifiable or otherwise formed by chemically modifying the same internal cavity of a precursor compound, for instance by functionalizing a modifiable group located within the internal cavity.

The sorption compound is suitably a porous compound other than a metal-organic framework (MOF), a porous coordination polymer (PCP), a covalent organic framework (COF), or a porous organic polymer (POP). The sorption compound is suitably other than a hydrogen-bonded organic framework (HOF). The sorption compound is suitably a porous compound other than those characterised as an extended solid in which molecular building blocks are linked together by strong covalent bonds and/or co-ordinative (e.g. dative) bonds.

The sorption compound is preferably a porous organic cage (POC). Any suitable POC may be used.

The sorption compound is suitably soluble. The sorption compound is suitably soluble, freely soluble, or very soluble in an organic solvent. The sorption compound is suitably soluble, freely soluble, or very soluble in a polar organic solvent. The sorption compound is suitably soluble, freely soluble, or very soluble in a polar aprotic organic solvent. The sorption compound is suitably soluble, freely soluble, or very soluble in a polar protic organic solvent. The sorption compound is suitably soluble, freely soluble, or very soluble in methanol, chloroform, dichloromethane, tetrahydrofuran (THF), dimethylformamide (DMF) and/or N-Methyl-2-pyrrolidone (NMP). The sorption compound (and, where relevant, co-crystallization compound) may be tuned for solubility in a preferred solvent (including water), for instance, through judicious functionalization of peripheral (i.e. solvent-interfacing) groups—e.g. for increase water solubility, the periphery of a porous organic cage may be functionalized with polar, protic, ionisable, or ionised/ionic groups.

The sorption compound is suitably soluble, freely soluble, or very soluble in a solvent having a dielectric constant (as SATP) between 4.5 and 35. The sorption compound is suitably soluble, freely soluble, or very soluble in chloroform. The sorption compound is suitably soluble, freely soluble, or very soluble in methanol.

Porous Organic Cage

A POC is a covalently bonded cage. The POC has at least one, potentially a single, internal cavity (e.g. at least one cavity, potentially a single cavity, per cage molecule). A POC can suitably crystallize into a crystalline POC.

Cage molecules are suitably distinguished from extrinsically porous molecules by virtue of their internal (intrinsic) cavities. Suitably, however, a POC excludes cavitands (e.g. cucurbiturils) and cryptophanes. POCs are suitably cages as distinct from macrocycles. POCs are suitably free of metal atoms or metal ions.

Porous organic cages (POCs) are discrete molecules, with an internal cavity, which generally crystallize to form a porous solid, the porous structure of which is suitably determined by the internal cavities and the crystal packing of the molecules. Fine tuning of pore structure thus desirably involves modifications to the interior of the molecules without significantly affecting overall crystal packing. As such, modifications to the interior of the molecules suitably do not significantly impact on overall cage shape and/or cage size.

Porous organic cages are suitably shape-persistent—for instance, they are suitably not prone to collapse (e.g. pore collapse).

As per the review article mentioned below in the Examples section (Hasell, T., Cooper, A. Porous organic cages: soluble, modular and molecular pores. Nat Rev Mater 1, 16053 (2016). https://doi.org/10.1038/natrevmats.2016.53), the POC is suitably selected from the group consisting of: imine cages, diamine cages (preferably structurally-stabilised diamine cages, such as functionalized diamine cages), triptycene cages, carbon-carbon cages, boronic ester cages, porphyrin box cages, alkyne metathesis cages, catenated cages, cage MOFs, modular cage co-crystals, porous organic alloys, quadruply catenated cages, porous liquids, and any combination thereof. Suitably, the POC is selected from the group consisting of: [4+6] imine cages, [8+12] imine cages, diamine cages (preferably structurally-stabilised diamine cages, such as functionalized diamine cages), triptycene cages, carbon-carbon cages, [8+12] boronic ester cages, porphyrin box cages, [4+6] alkyne metathesis cages, catenated cages, cage MOFs, modular cage co-crystals, porous organic alloys, quadruply catenated cages, porous liquids, and any combination thereof.

The internal cavity of the POC is preferably chemically modifiable (e.g. to modify the chemical structure or functional groups present within the cavity) and/or formed by chemically modifying the same internal cavity of a precursor compound, for instance by functionalizing a modifiable group located within the internal cavity. As such, the POC may be defined by reference to its precursor compound and any functionalization thereof. The precursor compound is suitably the same as the sorption compound except for functionalization of the internal cavity—i.e. the sorption compound is differentiated from its precursor compound by functionalization of the internal cavity.

The internal cavity of the POC is suitably a functionalized internal cavity, suitably comprising one or more functionalized groups (i.e. one or more groups derived from one or more corresponding pre-functionalized groups) or sets (e.g. pairs) of functionalized groups, suitably comprising two or more functionalized groups or sets (e.g. pairs) of functionalized groups. The functionalized internal cavity may be homo-functionalized (e.g. with all functionalized groups having been functionalized in the same way, suitably with the same functional group) or hetero-functionalized (e.g. with the functionalized groups having been functionalized in a different way, suitably with a different functional group).

The internal cavity of the POC is suitably a functionalized internal cavity, suitably derived from a pre-functionalized internal cavity (which may itself be partially functionalized), suitably via functionalization of the pre-functionalized internal cavity. It will be understood by those skilled in the art that a pre-functionalized internal cavity may be functionalized in a variety of ways to furnish a desirable functionalized internal cavity.

The pre-functionalized internal cavity suitably comprises one or more functionalizable groups (e.g. functionalizable groups comprising a reactive group, for instance a reactive group comprising a reactive heteroatom, e.g. amine groups, hydroxy groups; or comprising a reactive carbon atom, e.g. carboxylate, ketone, aldehyde, imine) or one or more sets (e.g. pairs) of functionalizable groups (e.g. pairs of diamines). The pre-functionalized internal cavity suitably comprises two or more functionalizable groups (e.g. functionalizable groups comprising a reactive heteroatom, e.g. amine groups, hydroxy groups; or comprising a reactive carbon atom, e.g. carboxylate, ketone, aldehyde, imine) or two or more sets (e.g. pairs) of functionalizable groups (e.g. pairs of diamines). One or more (not necessarily all) of said functionalizable groups are suitably functionalized in the functionalized internal cavity of the resultant POC. Such functionalizable groups, especially where they comprise a reactive heteroatom (e.g. an amine group or diamine group), are suitably functionalized via alkylation, acylation, acetalization, hemiacetalization, aminalization, and/or hemiaminalization. Such functionalizable groups, especially where they comprise a reactive carbon atom (e.g. a carboxylate group, ketone, aldehyde, imine), are suitably functionalized via esterification, amidation, acetalization, hemiacetalization, aminalization, and/or hemiaminalization.

In a homo-functionalized internal cavity, all of the functionalized groups are functionalized in the same manner, though not all functionalizable groups need necessarily be functionalized. For instance, a homo-functionalized internal cavity may comprise a polydiamine arrangement in which some (at least two), but not all, diamine pairs are identically functionalized by cyclo-aminalization (i.e. to form cyclic aminals) with the same aldehyde or ketone.

In a hetero-functionalized internal cavity, some of the functionalized groups are functionalized in a different manner to other functionalized groups, though not all functionalizable groups need necessarily be functionalized. For instance, a hetero-functionalized internal cavity may comprise a polydiamine arrangement in which some (at least two), but not all, diamine pairs are functionalized by cyclo-aminalization (i.e. to form cyclic aminals), but at least one diamine pair is functionalized with a different aldehyde or ketone to another diamine pair.

In some embodiments, all of the functionalizable groups of an internal cavity are functionalized. However, in other embodiments, some but not all of the functionalizable groups of an internal cavity are functionalized—for instance, the internal cavity may be partially functionalized (e.g. a partially-functionalized internal cavity).

Functionalizing the precursor compound to ultimately form the sorption compound may involve direction functionalization of one, some, or all of the functionalizable groups. However, in some embodiments, functionalizing may involve transiently functionalizing (protecting) one or more of the functionalizable groups to form transiently functionalized groups, functionalizing one or more other functionizable groups to form permanently functionalized groups, defunctionalizing (or deprotecting) the transiently functionalized groups to form defunctionalized groups, and optionally functionalizing the defunctionalized groups to form other permanently functionalized groups (which are optionally functionalized in the same or a different way, preferably a different way, to the other permanently functionalized groups).

Functionalization suitably involves functionalization of the functionalizable groups with one or more functionalizing substance(s) (or compound(s)). In homo-functionalized embodiments, such functionalization suitably involves only a single functionalizing substance. In hetero-functionalized embodiments (or indeed embodiments that involve transient functionalization/protection), such functionalization may suitably involve two or more functionalizing substances. Where two or more functionalizing substances are to be used, they may be independently selected from any functionalizing substance defined herein (e.g. see below—two or more different molecular ties or molecular tie compounds may be incorporated).

Functionalization of a precursor compound to form a sorption compound may suitably comprise one or more of the steps of:

i) Functionalizing one or more functionalizable groups (or one or more sets or pairs of functionalizable groups) with a first functionalizing substance to provide one or more first-functionalized groups;

ii) Functionalizing one or more other functionalizable groups (or one or more other sets or pairs of functionalizable groups) with a second functionalizing substance to provide one or more second-functionalized groups;

iii) Defunctionalizing (or deprotecting) one or more of the first-functionalized groups to provide one or more first-defunctionalized groups, suitably corresponding to regenerated functionalizable group(s);

iv) Refunctionalizing one or more of the first-defunctionalized group(s) with a third functionalizing substance, which is optionally the same as or different to either the first or second functionalizing substance, to provide one or more third-functionalized groups;

v) Defunctionalizing (or deprotecting) one or more of the second-functionalized groups to provide one or more second-defunctionalized groups, suitably corresponding to regenerated functionalizable group(s);

vi) Refunctionalizing one or more of the second-defunctionalized group(s) with a functionalizing substance, which is optionally the same as or different to any of the first, second, or third functionalizing substances, to provide one or more fourth-functionalized groups.

Preferably, functionalization of a precursor compound comprises at least step i), and in some embodiments only step i) (of steps i)-vi)) to thereby provide a homo-functionalized sorption compound formed from a single functionalizing substance.

In an embodiment, functionalization of a precursor compound comprises at least steps i) and ii), and in some embodiments only steps i) and ii) (of steps i)-vi)) to thereby provide a hetero-functionalized sorption compound formed from two different functionalizing substances.

In an embodiment, functionalization of a precursor compound comprises at least steps i), ii), and iii), and in some embodiments only steps i), ii) and iii) (of steps i)-vi)) to thereby provide a homo-functionalized sorption compound formed from a single functionalizing substance (albeit suitably less functionalized and possibly with a smaller cavity size than a corresponding method which only involve step i) with the same functionalizing substance).

In an embodiment, functionalization of a precursor compound comprises at least steps i), ii), iii), and iv), and in some embodiments only steps i), ii), iii), and iv) (of steps i)-vi)) to thereby provide a hetero-functionalized sorption compound formed from two different functionalizing substances (second and third functionalizing substances). In such embodiments, step i) serves as a protecting step, installing the first functionalizing substance as a protecting group which is later removed in step iii).

In some embodiments, further fine tuning may take place where the second functionalization was also a protecting step, and such embodiments may comprise all of steps i)-v) or all of steps i)-vi).

Steps of the aforesaid method may be repeated to further fine tune.

The functionalizable groups of the internal cavity are suitably judiciously functionalized to provide the desired cavity size. As such, functionalizing the internal cavity suitably constitutes fine-tuning of the internal cavity and/or cavity size (and/or cavity-window size).

The precursor (or parent) compound to the sorption compound, in terms of its pre-functionalized internal cavity, suitably defines a maximum cavity size for any functionalized derivatives thereof. As such, suitably the functionalizable groups of the internal cavity of the precursor compound may be functionalized to make the internal cavity smaller in size. As such, functionalization suitably involves adding to the functionalizable group(s). Suitably functionalization involves reacting the functionalizable group(s) (otherwise known herein as "reactive moieties" or "reactive units") with a functionalizing substance/compound (otherwise known herein as "reactable moieties" or "reactable units"). By way of example, a functionalizable groups may be or be a part of a reactive unit comprising a reactive moiety, such as a diamine moiety, and the functionalizing substance may be a reactable unit, such as an aldehyde (e.g. formaldehyde) with a reactable moiety (e.g. carbonyl group), and the functionalizable group may be react with the functionalizing substance to produce a formaldehyde-tied aminal. A suitable precursor compound may be provided to enable fine tuning, via functionalization, to furnish a desired cavity size. As such, the internal cavity size of the precursor compound may be sufficiently large to accommodate a desired size reduction. Meanwhile, the precursor compound may be functionalized with appropriately-sized functionalizing substance(s) to furnish an internal cavity with the desired size.

The precursor compound suitably comprises one or more reactive units, each of which units may comprise one or more (preferably two or more, most preferably two) distinct reactive moieties (e.g. amine moieties). The precursor compound suitably comprises a plurality of the reactive units, suitably such that the precursor compound comprises at least six reactive moieties (e.g. amine groups, or half the number of diamine groups), suitably at least ten, suitably at most forty, suitably at most twenty, most suitably twelve reactive moieties. The reactive units themselves are suitably covalently linked, suitably via an interlinking linker unit.

The reactive units may be linked together so as to form:
an open chain, albeit optionally a chain containing one or more ring systems (e.g. carbocyclic, aryl, heterocyclic, heteroaryl) optionally as member(s) of the reactive units, the linker(s), or as optional substituents thereof;
a macrocycle, again optionally containing one or more ring systems as per above; and/or
a cage, again optionally containing one or more ring systems as per above.

The functionalizing substance is suitably a molecular tie compound. As aforementioned, where more than one functionalizing substance is used, suitably more than one molecule tie compound is used.

The molecular tie compound suitably comprises one or more moieties (e.g. carbonyl moieties). The molecular tie compound suitably comprises a single reactable moiety (e.g. carbonyl), though the single reactable moiety may suitably be capable of reacting with two reactive moieties of the precursor compound to produce a molecular tie (or bridge) between said two reactive moieties.

Suitably, the reaction between the precursor compound and molecular tie compound comprises:
reacting the precursor compound (or a synthetic equivalent thereof) comprising one or more reactive units, with a molecular tie compound (or a synthetic equivalent thereof) comprising one or more reactable units, to form a sorption compound (or precursor thereto—e.g. if subsequent deprotection or other transformation steps are required to furnish a final product) comprising one or more tied units;
wherein:
the one or more reactive units of the precursor compound comprise one or more (preferably two or more, most preferably two) distinct reactive moieties (e.g. amine);
the one or more reactable units of the molecular tie compound comprise one or more reactable moieties (e.g. carbonyl, protected carbonyl, dihalo); and
the one or more tied units of the sorption compound comprise one or more moieties characterised by the product of a reaction between the reactive unit(s) of the precursor compound and the molecular tie compound.

The aforesaid reaction between the precursor compound and molecular tie compound may be applied in the above-mentioned context of functionalization of a precursor compound to form a sorption compound involving any, some, or all of steps i)-vi) outlined above, wherein functionalizing, defunctionalizing, and/or refunctionalizing may optionally involve multiple different molecular tie compounds and multiple different tied units in the ultimate sorption compound. As such, the aforesaid reaction may optionally be repeated with different reactable units (e.g. with a different molecular tie compound) to furnish a hetero-functionalized sorption compound.

Suitably the corresponding reactive and reactable moieties are predisposed to react together (to form a covalent linkage there between) under appropriate conditions. Suitably one of either the reactive or reactable moieties is electrophilic whilst the other of either the reactive or reactable moieties is nucleophilic. Suitably a single reactable moiety reacts with at least two (preferably two) reactive moieties. A single tied unit is suitably formed by a single molecular tie molecule (or a single reactable moiety of a single molecular tie molecule) reacting with at least two (preferably only two) reactive moieties of a precursor compound.

The sorption compound (suitably a stabilised compound) therefore suitably comprises one or more tied units, where each tied unit suitably corresponds directly with a post-reacted form of a given reactive unit of the precursor compound. As such, the tied units are suitably covalently linked (as per the corresponding precursor compound), suitably via an interlinking linker unit (suitably the same linker as defined in relation to the precursor compound). The sorption compound suitably comprises a plurality of the tied units (which may be the same in the case of a homo-functionalized sorption compound, or different in the case of a hetero-functionalized sorption compound), suitably such that the sorption compound comprises at least three tied units, suitably at least five, suitably at most twenty, suitably at most ten, most suitably six tied units. Moreover, the tied units are suitably linked together in the same manner as the reactive units of the original precursor compound, i.e. to form:

- an open chain, albeit optionally a chain containing one or more ring systems (e.g. carbocyclic, aryl, heterocyclic, heteroaryl) optionally as member(s) of the tied units, the linker(s), or as optional substituents thereof;
- a macrocycle, again optionally containing one or more ring systems as per above; and/or
- a cage, again optionally containing one or more ring systems as per above.

The number and chemical structure of the reactive units of the precursor compound and/or the tied units of the sorption compound may be readily varied by those skilled in the art by making appropriate synthetic modifications. Such parameters may be desirably varied in order to change pore size, pore selectivity (in terms of selectivity for particular guest compounds), and/or other properties. Likewise, the chemical structure (especially the size or molecular weight) of the molecular tie compound may also be readily varied, again to affect the pore size, pore selectivity, and/or other properties of the ultimate sorption compound. Thus the precursor compound (and where relevant its porous precursor) and molecular tie compound are suitably judiciously chosen to provide, after the aforementioned reaction, a sorption compound that is more stable than the precursor compound and which has at least a sufficient degree of porosity for the desired application (e.g. pores of a sufficient shape and size so that the sorption compound may serve as a host for a selected guest compound).

Suitably the moieties of the precursor compound other than the "reactive moieties" are (substantially) inert, suitably inert towards any reactable moieties of the molecular tie compound, suitably inert to both electrophiles and nucleophiles, especially under the prevailing reaction conditions.

Suitably the moieties of the molecular tie compound other than the "reactable moieties" are (substantially) inert, suitably inert towards any reactive moieties of the precursor compound, suitably inert to both electrophiles and nucleophiles, especially under the prevailing reaction conditions.

Suitably any linker(s), or substituents thereof, of the precursor compound are (substantially) inert, suitably inert towards any reactive moieties of the precursor compound or any reactable moieties of the molecular tie compound, suitably inert to both electrophiles and nucleophiles, especially under the prevailing reaction conditions.

In a particular embodiment, the reaction comprises: reacting a precursor compound (or a synthetic equivalent thereof) comprising one or more reactive units defined by Formula A:

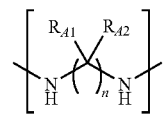

Formula A with a molecular tie compound (or a synthetic equivalent thereof) defined by Formula B:

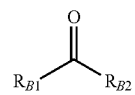

Formula B wherein:
n is an integer between 1 and 4;
each $R_{A1}$ and $R_{A2}$ group is independently hydrogen or an optionally substituted substituent group, wherein any pair of $R_{A1}$ and $R_{A2}$ groups are optionally joined together to form a carbocyclic, heterocyclic, aryl, or heteroaryl ring;
each $R_{B1}$ and $R_{B2}$ group is independently hydrogen or an optionally substituted substituent group, wherein any pair of $R_{B1}$ and $R_{B2}$ groups are optionally joined together to form a carbocyclic, heterocyclic, aryl, or heteroaryl ring;
to produce a sorption compound comprising one or more tied units defined by Formula C:

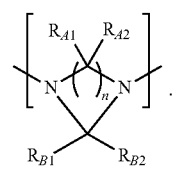

Formula C

In the context of the above, Formula C may be said to comprise a "molecular tie" which is definable as a diradical of Formula D:

Formula D

Formula C may also be represented by

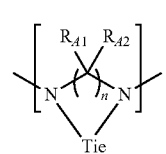

Formula C (alternative representation)

wherein Tie is a molecular tie as defined by Formula D.

The aforesaid reaction may be applied in the abovementioned context of functionalization of a precursor compound to form a sorption compound involving any, some, or all of steps i)-vi) outlined above, wherein functionalizing, defunctionalizing, and/or refunctionalizing may optionally involve multiple different molecular tie compounds (and multiple different tied units) independently selected from the aforesaid definitions. As such, the aforesaid reaction may optionally be repeated with different reactable units (e.g. with a different molecular tie compound, resulting in different tied units) to furnish a hetero-functionalized sorption compound. In such circumstances, either or both $R_{B1}$ and $R_{B2}$ of the different molecular tie compounds are different.

The units in Formulas A and C are represented in divalent form, as donated by the bonds intersected by square brackets (these bonds may be considered as radicals, or "connectable bonds"). These units may be considered repeat units where the relevant compounds comprise two or more of said units (which is generally the case). As explain in detail below, a precursor compound and its corresponding sorption compound may suitably respectively comprise a plurality of units of Formula A and Formula C linked together (suitably to form an open chain, macrocyclic, or caged compound/molecule) via their "connectable bonds", suitably via an intervening linker. Such a linker may link together two or more units of Formula A and/or C, and in some embodiments links three such units. As such, said linker is suitably polyvalent (e.g. divalent, trivalent).

The sorption compound suitably comprises one or more units of Formula C and zero, one, or more units of Formula A, suitably linked together, optionally via an intervening linker.

In accordance with the invention, the aforementioned units of Formula A, B, and C (and molecular ties of Formula D), and by extension their corresponding compounds (or synthetic equivalents thereof) and also any linkers therebetween, may, unless otherwise stated, have any structure defined herein wherein each of n, $R_{A1}$, $R_{A2}$, $R_{B1}$, $R_{B2}$ has any of the meanings defined hereinbefore or in the paragraphs that follow:

(1) n is an integer between 2 and 3;
(2) n is 2;
(3) each $R_{A1}$ and $R_{A2}$ is independently selected from hydrogen or any inert group (e.g. inert towards electrophiles, suitably towards carbonyls, suitably inert in relation to the molecular tie compound), including inert groups wherein an $R_{A1}$ and an $R_{A2}$ are linked so that together they form a carbocyclic, aryl, heterocyclic, or heteroaryl ring, suitably wherein each $R_{A1}/R_{A2}$ pair (i.e. attached to the same carbon atom) has a collective molecular weight less than 200, suitably less than 100, suitably less than 70;
(4) $R_{A1}$ and $R_{A2}$ are independently selected from the group consisting of hydrogen, (1-2C)alkyl, or $R_{A1}$ and $R_{A2}$ are linked such that together they form a carbocyclic ring;
(5) $R_{A1}$ and $R_{A2}$ are linked such that together they form a (3-8C)cycloalkyl ring;
(6) $R_{A1}$ and $R_{A2}$ are linked such that together they form a cyclohexane ring;
(7) each $R_{B1}$ and $R_{B2}$ is independently selected from hydrogen or any inert group (e.g. insert towards nucleophiles, suitably towards amines, suitably inert in relation to the precursor compound), including inert groups wherein an $R_{B1}$ and an $R_{B2}$ are linked so that together they form a carbocyclic, aryl, heterocyclic, or heteroaryl ring, suitably wherein each $R_{B1}/R_{B2}$ pair (i.e. attached to the same carbon atom) has a collective molecular weight less than 100, suitably less than 50, suitably less than 31, suitably less than 5;
(8) $R_{B1}$ and $R_{B2}$ are independently selected from the group consisting of hydrogen, (1-3C)alkyl, or $R_{B1}$ and $R_{B2}$ are optionally linked such that together they form a carbocyclic, heterocyclic, aryl, or heteroaryl ring;
(9) $R_{B1}$ and $R_{B2}$ are independently selected from the group consisting of hydrogen and (1-2C)alkyl;
(10) $R_{B1}$ and $R_{B2}$ are independently selected from the group consisting of hydrogen, methyl, and ethyl;
(11) $R_{B1}$ and $R_{B2}$ are independently selected from the group consisting of hydrogen and methyl;
(12) $R_{B1}$ and $R_{B2}$ are both hydrogen;
(13) $R_{B1}$ and $R_{B2}$ are both methyl;
(14) $R_{B1}$ is hydrogen and $R_{B2}$ is methyl;
(15) $R_{B1}$ is hydrogen and $R_{B2}$ is ethyl;
(16) the precursor compound and/or the sorption compound comprise at least three units of Formula A and/or Formula C respectively;
(17) the precursor compound and/or the sorption compound comprise at least five units of Formula A and/or Formula C respectively;
(18) the precursor compound and/or the sorption compound comprise at most twenty units of Formula A and/or Formula C respectively, more suitably at most ten units of Formula A and/or Formula C respectively;
(19) the precursor compound and/or the sorption compound comprise six units of Formula A and/or Formula C respectively;
(20) the units of Formula A and/or Formula C are covalently linked, directly or indirectly, together (suitably in series and/or parallel, i.e. straight chain or branched) to form an open chain, a macrocycle, and/or a cage structure;
(21) the units of Formula A and/or Formula C are covalently linked together, directly or indirectly, to form a macrocycle and/or a cage structure;
(22) the units of Formula A and/or Formula C are covalently linked together, directly or indirectly, to form a cage structure (e.g. an organic cage molecule);
(23) the units of Formula A and/or Formula C are covalently linked together via between 1 and 8 intervening atoms (suitably carbon atoms), suitably between 4 and 6 intervening atoms (suitably carbons), most suitably 5 intervening carbon atoms;
(24) the units of Formula A and/or Formula C are covalently linked together via an intervening linker of Formula -$L_1$-;
(25) -$L_1$- is a polyvalent group providing the aforementioned number of intervening atoms between neighbouring units of Formula A and/or Formula C;
(26) -$L_1$- is selected from the group consisting of a polyvalent hydrocarbon (straight chain or branched), a polyvalent carbocycle, a polyvalent heterocycle, a polyvalent arene, a polyvalent heteroarene, a polyvalent mono-/poly-hydrocarbyl-carbocycle, a polyvalent mono-/poly-hydrocarbyl-heterocycle, a polyvalent mono-/poly-hydrocarbyl-arene, and a polyvalent mono-/poly-hydrocarbyl-heteroarene (where mono-/poly- indicates that the relevant ring system respectively comprises one or a plurality of hydrocarbyl substituents);
(27) -$L_1$- is selected from the group consisting of a polyvalent (1-8C)alkane, a polyvalent (2-8C)alkene, a polyvalent (3-8C)cycloalkane, a polyvalent mono-/poly-[(1-8C)alkyl]-(3-8C)cycloalkane, a polyvalent (3-8C)cycloalkene, a polyvalent mono-/poly-[(1-8C)alkyl]-(3-8C)cycloalkene, a polyvalent heterocycle, a polyvalent mono-/poly-[(1-8C)alkyl]-heterocycle, a polyvalent arene, a polyvalent mono-/poly-[(1-8C)alkyl]-arene, a polyvalent heteroarene, and a polyvalent mono-/poly-[(1-8C)alkyl]-heteroarene;

(28) -L$_1$- is selected from the group consisting of a polyvalent (4-6C)alkane, a polyvalent (4-6C)alkene, a polyvalent (5-6C)cycloalkane, a polyvalent mono-/poly-[(1-2C)alkyl]-(5-6C)cycloalkane, a polyvalent (5-6C)cycloalkene, a polyvalent mono-/poly-[(1-2C)alkyl]-(5-6C)cycloalkene, a polyvalent heterocycle, a polyvalent mono-/poly-[(1-2C)alkyl]-heterocycle, a polyvalent arene, a polyvalent mono-/poly-[(1-2C)alkyl]-arene, a polyvalent heteroarene, and a polyvalent mono-/poly-[(1-2C)alkyl]-heteroarene;

(29) -L$_1$- is selected from the group consisting of a polyvalent poly-[(1-2C)alkyl]-(5-6C)cycloalkane, a polyvalent poly-[(1-2C)alkyl]-(5-6C)cycloalkene, a polyvalent poly-[(1-2C)alkyl]-heterocyclyl, a polyvalent poly-[(1-2C)alkyl]-arene, and a polyvalent poly-[(1-2C)alkyl]-heteroarene;

(30) -L$_1$- is a polyvalent poly-[(1-2C)alkyl]-arene;

(31) -L$_1$- is a trivalent tri-[(1-2C)alkyl]-arene;

(32) -L$_1$- is selected from the group consisting of benzene-trimethylene;

(33) -L$_1$- is selected from the group consisting of benzene-1,3,5-trimethylene;

(34) the molecular tie compound is selected from formaldehyde and/or acetone;

(35) the molecular tie compound is formaldehyde;

(36) Any one or more of the R$_{A1}$, R$_{A2}$, R$_{B1}$, R$_{A2}$, and -L$_1$- groups may be optionally substituted (suitably so long as the relevant collapsible and molecular tie molecules react together to produce a porous material whose physical structure is more stable than that of the precursor compound, and whose pores are sufficient usable to accommodate one or more guest compounds);

(37) any CH, CH$_2$ or CH$_3$ group within any of the aforementioned R$_{A1}$, R$_{A2}$, R$_{B1}$, R$_{B2}$ and -L$_1$- groups optionally bears on each said CH, CH$_2$ or CH$_3$ group one or more substituent groups selected from halogeno, hydroxy, mercapto, amino, cyano, carboxy, carbamoyl, ureido, (1-3C)alkyl, hydroxy(1-3C)alkyl, (1-3C)alkoxy, halo(1-3C)alkoxy, (1-3C)alkylthio, (1-3C)alkylamino, and di-[(1-3C)alkyl]amino;

(38) any CH, CH$_2$ or CH$_3$ group within any of the aforementioned R$_{A1}$, R$_{A2}$, R$_{B1}$, R$_{B2}$ and -L$_1$- groups optionally bears on each said CH, CH$_2$ or CH$_3$ group one or more substituent groups selected from halogeno, hydroxy, mercapto, amino, methyl, hydroxymethyl, methoxy, trifluoromethoxy, trichloromethoxy, methylthio, methylamino, and dimethylamino;

(39) all CH, CH$_2$ or CH$_3$ group within any of the aforementioned R$_{A1}$, R$_{A2}$, R$_{B1}$, R$_{B2}$ and -L$_1$- are unsubstituted.

In a particular embodiment R$_{A1}$, R$_{A2}$ and -L$_1$- are selected such that the precursor compound comprises a plurality of reactive units of Formula A$_1$, each reactive unit being indirectly linked (through their connectable bonds denoted by square brackets) to a neighbouring distinct reactive unit via an intervening linker unit of Formula A$_{1L}$ (through connectable bonds thereof denoted again by square brackets):

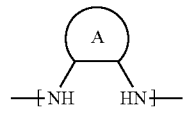

Formula A$_1$ wherein Ring A is a carbocyclic, aryl, heterocyclic, or heteroaryl ring;

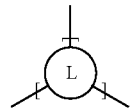

Formula A$_{1L}$ wherein Ring L is a polyvalent hydrocarbon (straight chain or branched), a polyvalent carbocycle, a polyvalent heterocycle, a polyvalent arene, a polyvalent heteroarene, a polyvalent mono-/poly-hydrocarbyl-carbocycle, a polyvalent mono-poly-hydrocarbyl-heterocycle, a polyvalent mono-/poly-hydrocarbyl-arene, or a polyvalent mono-/poly-hydrocarbyl-heteroarene (i should be implicit from this specification that the linker of Formula A$_{1L}$ bonds to a reactive unit of Formula A$_1$ at the indicated square brackets for both species, though it should also be implicit that in respect of the linker the relevant connectable bond or radical may stem from the core ring structure or, where applicable, from one of the hydrocarbyl substituents of the core ring);

wherein any of the groups of Formula A$_1$ or A$_{1L}$ are optionally substituted as defined herein. In this embodiment, the precursor compound suitably comprises units of Formula A$_1$ and A$_{1L}$ respectively in a molar ratio of 3:2 (e.g. 6 units of A$_1$ and 4 of A$_{1L}$). In adaptations of this embodiment, Ring A may be replaced with a (2-3C)alkylene group between the relevant amine moieties to produce an alkylenediamine. A corresponding sorption compound suitably has the same structure as the precursor compound except that at least one (suitably at least two, suitably six, suitably all) reactive unit(s) of Formula A$_1$ becomes a tied unit of Formula C$_1$:

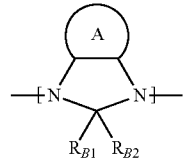

Formula C$_1$ wherein R$_{B1}$ and R$_{B2}$ have any definition given herein.

In a particular embodiment R$_{A1}$, R$_{A2}$ and -L$_1$- are selected such that the precursor compound comprises at least three reactive units of Formula A$_1$, each reactive unit being indirectly linked to a neighbouring distinct reactive unit via an intervening linker unit of Formula A$_{1L}$:

wherein:
Ring A is a (5-6C)cycloalkane; and
Ring L is a polyvalent poly-[(1-2C)alkyl]-(5-6C)cycloalkane, a polyvalent poly-[(1-2C)alkyl]-(5-6C)cycloalkene, a polyvalent poly-[(1-2C)alkyl]-heterocyclyl, a polyvalent poly-[(1-2C)alkyl]-arene, or a polyvalent poly-[(1-2C)alkyl]-heteroarene;

wherein any of the groups of Formula $A_1$ or $A_{1L}$ are optionally substituted as defined herein.

In a particular embodiment $R_{41}$, $R_{42}$-$L_1$-, Ring A, and Ring L are selected such that the precursor compound comprises a plurality of reactive units of Formula $A_2$, each reactive unit being indirectly linked to a neighbouring distinct reactive unit via an intervening linker unit of Formula $A_{2L}$:

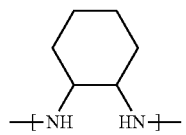

Formula $A_2$

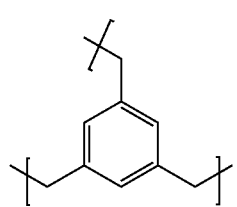

Formula $A_{2L}$ wherein any of the groups of Formula $A_2$ or $A_{2L}$ are optionally substituted as defined herein, though most suitably they are unsubstituted. In this embodiment, the precursor compound suitably comprises units of Formula $A_2$ and $A_{2L}$ respectively in a molar ratio of 3:2 (e.g. 6 units of $A_2$ and 4 pf $A_{2L}$). In adaptations of this embodiment, the cyclohexane ring may be replaced with a (2-3C)alkylene group between the relevant amine moieties to produce an alkylenediamine and optionally the benzene ring of the linker may be replaced with a heteroarene ring. A corresponding sorption compound suitably has the same structure as the aforementioned precursor compound except that at least one (suitably at least two, suitably six, suitably all) reactive unit(s) of Formula $A_2$ becomes a tied unit of Formula $C_2$:

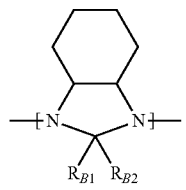

Formula $C_2$ wherein $R_{B1}$ and $R_{B2}$ have any definition given herein, though most suitably both are hydrogen or both are methyl. Suitably, where both $R_{B1}$ and $R_{B2}$ are hydrogen (i.e. derived from a formaldehyde molecular tie compound) two or more, preferably all reactive units of the precursor compound become tied units. Suitably, where both $R_{B1}$ and $R_{B2}$ are methyl (i.e. derived from an acetone molecular tie compound) only one reactive unit of the precursor compound becomes a tied unit.

Suitably, a sorption compound of the invention has a structure corresponding directly with (or based directly upon) any of the embodiments and/or definitions given herein in relation to the precursor compound, with two or more of the reactive moieties of the precursor compound having reacted with a molecular tie compound to form a corresponding molecular tie between said reactive moieties.

This is self-evident from above where the reactive units of Formula A correspond directly with the tied units of Formula C. Sorption compounds suitably also comprise the same linkers, which are suitably joined to reactive/tied units in the same manner, as per their corresponding precursor compounds. Suitably each reactive unit of the precursor compound comprises two reactive moieties. Suitably any, some, or all molecular ties between reactive moieties are between two reactive moieties within the same reactive unit. As such, suitably the sorption compound is its corresponding precursor compound with one or more reactive units having been transformed into tied units. The sorption compound may comprise both reactive units and tied units, so long as at least one tied unit exists. In preferred embodiments, the sorption compound comprises two or more tied units. In a particular embodiment, the sorption compound comprises two or more, suitably three or more, suitably five or more, suitably six tied units and is suitably (substantially) free of reactive units (i.e. all the reactive units are reacted to produce tied units).

The sorption compound suitably comprises one or more units of Formula C (or their sub-defined formulas) and zero, one, or more units of Formula A (or their sub-defined formulas), suitably linked together, optionally via an intervening linker.

Preferably, the sorption compound comprises c units of Formula C (or their sub-defined formulas) and a units of Formula A (or their sub-defined formulas), suitably linked together, optionally via an intervening linker. The sum of c and a is suitably at least 2, suitably at least 3, suitably at most 18, suitably at most 12, and is most preferably 6, wherein c is at least 1 and a 0, 1, or more (a is most preferably 0 or 1). As such, units of Formula A are unfunctionalized and thus free of any molecular ties (of Formula D). Preferably, the units of Formula C and, where applicable, Formula A are linked together, optionally linked via an intervening linker, in a manner that forms a cage with an internal cavity. The molecular tie(s) of Formula D, and suitably any relevant $R_{B1}$ and $R_{B2}$ groups, suitably reside within or interface with the cavity.

In a particular embodiment, the sorption compound comprising c units of Formula C (or their sub-defined formulas) and a units of Formula A (or their sub-defined formulas), comprises only a single type of molecular tie (of Formula D). In an embodiment, the sorption compound comprises only a single type of molecular tie (of Formula D), and a is either 0 or 1 (most preferably 0), whereas c is between 4 and 12 (c is most suitably 6). Examples of such embodiments include where the single molecular tie of Formula D (and thus the molecular tie compound used to form it) are selected from the group consisting of wherein:

$R_{B1}$ and $R_{B2}$ are both hydrogen (e.g. formaldehyde-tied);
$R_{B1}$ and $R_{B2}$ are both methyl (e.g. acetone-tied); and
$R_{B1}$ is hydrogen and $R_{B2}$ is methyl (e.g. acetaldehyde-tied).

In a particular embodiment, the sorption compound comprising c units of Formula C (or their sub-defined formulas) and a units of Formula A (or their sub-defined formulas), comprises two or more (most preferably just two) different types of molecular tie (of Formula D). In such embodiments, suitably a is either 0 or 1 (most preferably 0) and c is between 4 and 12 (c is most suitably 6). As such, one or more of the units of Formula C comprise one type of molecular tie (of Formula D) whilst one or more other units of Formula C comprise a different type of molecular tie (of Formula D). Examples of such embodiments with different molecular ties of Formula D (and thus the molecular tie compound used to form it) are selected from the group consisting of wherein:

i. a first molecular tie wherein $R_{B1}$ and $R_{B2}$ are both hydrogen (e.g. formaldehyde-tied), and a second molecular tie wherein $R_{B1}$ is hydrogen and $R_{B2}$ is methyl (e.g. acetaldehyde-tied), suitably wherein the molar ratio of the first molecular tie to the second molecular tie is between 1:6 and 12:1, most suitably between 2:1 and 6:1, most preferably 5:1;

ii. a first molecular tie wherein $R_{B1}$ and $R_{B2}$ are both hydrogen (e.g. formaldehyde-tied), and a second molecular tie wherein $R_{B1}$ and $R_{B2}$ are both methyl (e.g. acetone-tied), suitably wherein the molar ratio of the first molecular tie to the second molecular tie is between 1:6 and 12:1, most suitably between 2:1 and 6:1, most preferably 5:1; and iii. a first molecular tie wherein $R_{B1}$ and $R_{B2}$ are both hydrogen (e.g. formaldehyde-tied), and a second molecular tie wherein $R_{B1}$ is hydrogen and $R_{B2}$ is ethyl (e.g. propionaldehyde-tied), suitably wherein the molar ratio of the first molecular tie to the second molecular tie is between 1:6 and 12:1, most suitably between 2:1 and 6:1, most preferably 5:1.

In a particular embodiment, the sorption compound comprising c units of Formula C (or their sub-defined formulas) and a units of Formula A (or their sub-defined formulas), comprises two or more (most preferably just two) different types of molecular tie (of Formula D), wherein one type of molecular tie is larger (suitably having more carbon atoms) than another type of molecular tie.

In a particular embodiment, the precursor compound is defined by Formula A3 (referred to elsewhere herein, and within relevant citations as RCC3):

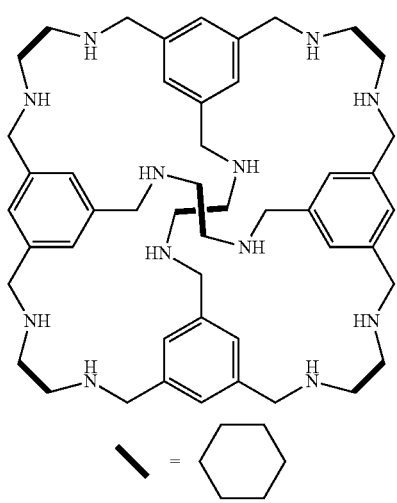

Formula A3

In respect of all the aforementioned embodiments, the relevant precursor compound(s) is optionally formed by reduction of a corresponding porous precursor compound (i.e. imine compound), for instance, where each amine moiety of a reactive unit translate to a nitrogen which forms a direct imine bond with the adjoining carbon atom of the linker to which it is attached. By way of example, the precursor compound of Formula A3 may be formed from the corresponding porous imine compound of Formula E3:

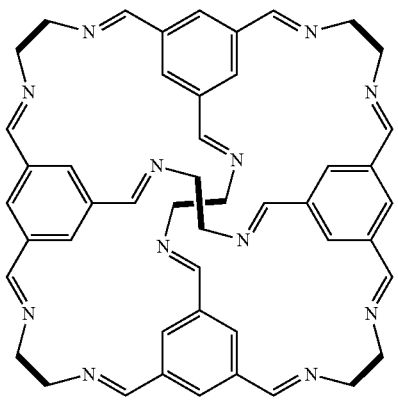

wherein the bold lines match those of the Formula A3.

As is apparent, the precursor compound of Formula A3 (RCC3) has 6 pairs of diamines, each capable of aminalization via the aforementioned molecular tie compounds, to form corresponding molecular ties bridging each diamine pair. As such, the sorption compound of Formula C may be sub-defined by the Formula C3;

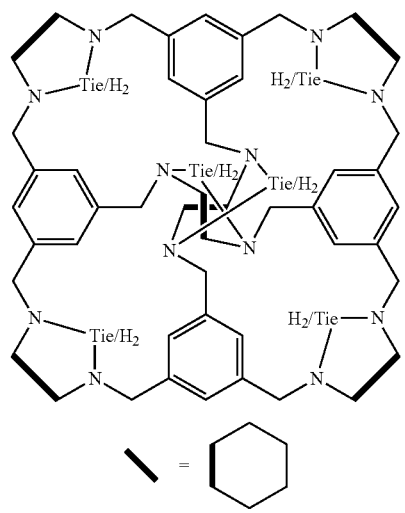

wherein Tie/$H_2$ indicates either a diamine group that is tied with Tie or a diamine group that is untied with a single hydrogen borne by each diamine nitrogen, wherein Tie is a molecular tie as defined by Formula D, and wherein the sorption compound comprises at least one Tie.

The sorption compound of Formula C3 comprises c units of Formula $C_2$ and a units of Formula $A_2$ all linked together via 4 intervening linkers of Formula $A_{2L}$, wherein the sum of c and a is 6, wherein c is an integer between 1 and 6, and a is an integer between 0 and 5. As previously explained, where two or more Tie groups are present, the Tie groups may be either the same or different. Herein, sorption compounds of Formula C3 are also referred to as xXT-yYT-zZT-RCC3, wherein XT, YT, and ZT represent different Tie groups and x, y, and z correspondingly represent the number of each of those respective Tie groups present in the molecule, wherein each of x, y, and z may be an integer between 0 and 6 on the proviso that the sum of x, y, and z is an integer between 1 and 6.

In a particular embodiment, the sorption compound of Formula C3 comprises only a single type of molecular tie (Tie group of Formula D). Examples of such embodiments include where the single molecular tie of Formula D (and thus the molecular tie compound used to form it) are selected from the group consisting of wherein:

$R_{B1}$ and $R_{B2}$ are both hydrogen (e.g. formaldehyde-tied), such as 6FT-RCC3 or 5FT-RCC3;

$R_{B1}$ and $R_{B2}$ are both methyl (e.g. acetone-tied), such as 1AT-RCC3;

and $R_{B1}$ is hydrogen and $R_{B2}$ is methyl (e.g. acetaldehyde-tied), such as 6ET-RCC3.

In a particular embodiment, the sorption compound of Formula C3 comprises two or more (most preferably just two) different types of molecular tie (Tie groups of Formula D). Examples of such embodiments with different molecular ties of Formula D (and thus the molecular tie compound used to form it) are selected from the group consisting of wherein:

i. a first molecular tie wherein $R_{B1}$ and $R_{B2}$ are both hydrogen (e.g. formaldehyde-tied), and a second molecular tie wherein $R_{B1}$ is hydrogen and $R_{B2}$ is methyl (e.g. acetaldehyde-tied), such as 1ET-5FT-RCC3;

ii. a first molecular tie wherein $R_{B1}$ and $R_{B2}$ are both hydrogen (e.g. formaldehyde-tied), and a second molecular tie wherein $R_{B1}$ and $R_{B2}$ are both methyl (e.g. acetone-tied), such as 1AT-5FT-RCC3; and iii. a first molecular tie wherein $R_{B1}$ and $R_{B2}$ are both hydrogen (e.g. formaldehyde-tied), and a second molecular tie wherein $R_{B1}$ is hydrogen and $R_{B2}$ is ethyl (e.g. propionaldehyde-tied), such as 1PT-5FT-RCC3.

In a particular embodiment, the sorption compound is selected from the group consisting of 6FT-RCC3, 5FT-RCC3, 6ET-RCC3, 1AT-RCC3, 1ET-5FT-RCC3, 1AT-5FT-RCC3, 1PT-5FT-RCC3.

In a particular embodiment, the sorption compound is selected from the group consisting of 5FT-RCC3, 6ET-RCC3, 1ET-5FT-RCC3, 1AT-5FT-RCC3, 1PT-5FT-RCC3.

In a particular embodiment, the sorption compound is as defined anywhere herein, on the proviso that the sorption compound is not 6FT-RCC3 or 1AT-RCC3.

In a particular embodiment, the sorption compound is 6ET-RCC3. 6ET-RCC3 corresponds with the sorption compound of Formula C3, wherein all Tie groups are the same, $R_{B1}$ of the Tie group is hydrogen and $R_{B2}$ of the Tie group is methyl (e.g. acetaldehyde-tied), c is 6 and a is 0.

Where the sorption compound is chiral, the sorption compound may be a racemic mixture or may be enantiomerically pure (or enantiomerically enriched) in a single enantiomer. Where applicable, the (predominant) enantiomer of the sorption compound is suitably of the opposite chirality to that of any corresponding co-crystallisation compound.

Crystal Structure and Isostructural Crystallization

The sorption compound suitably crystallises to provide sorption compound crystals or crystalline sorption compound. Crystalline sorption compound suitably comprises intrinsic voids (i.e. internal cavities). Crystalline sorption compound also suitably comprises extrinsic voids (suitably in between individual sorption compound molecules). The combination of intrinsic and extrinsic voids suitably affords an interconnected 3-dimensional (3D) porous network comprising continuous porous channels.

The sorption compound suitably has a diamondoid pore network.

Cavity Size

The sorption compound suitably has an internal cavity capable of hosting a guest which, in this case, is suitably a target substance. The internal cavity is suitably sized to accommodate the target substance (or one or more target substance(s)).

The cavity size suitably corresponds with the smallest dimension of the internal cavity—it may be considered the "pore size". The cavity size is suitably larger than the size (or largest dimension) of the target substance(s). The cavity size may be larger than the size (or largest dimension) of the non-target substance(s). The size of the target substance(s) may be determined as defined herein in relation to the "size" of a substance.

Sorption selectivity advantages associated with the present invention are manifest when the difference in size between a target compound (or non-target compound, especially where the atomic or molecular size between the target and non-target are the same or similar) and the cavity size are comparable to the thermal de Broglie wavelength of the target compound (and/or of the non-target compound). As such, where hydrogen is a non-target compound, advantages of the present invention may be realised for cavity sizes (or pore sizes) less than or equal to 5 Å.

Preferably the cavity size is similar to the de Broglie wavelength, suitably the thermal de Broglie wavelength, of the target substance(s). The cavity size is preferably numerically closer to the de Broglie wavelength (suitably the thermal de Broglie wavelength) of the target substance(s) than the de Broglie wavelength (suitably the thermal de Broglie wavelength) of the non-target substance(s). The latter is thought to increase selectivity for the target substance(s) over the non-target substance(s).

Suitably, the aforementioned sizes, be it the cavity size or size of the target substance (or relevant molecule thereof), are average (e.g. mean, or other statistical average, such as Boltzmann average) sizes.

Cavity sizes may be determined, whether by measurement or calculation (e.g. via molecular dynamics, MD, simulations), taking account of molecular flexibility to ascertain a time averaged pore-limiting envelope (PLE) rather than a single, static pore diameter (e.g. PLD). A specific PLE value suitably means a PLE centred at said value.

Suitably, the difference between the cavity size of the sorption compound, at SATP or at the relevant contacting temperature, and the size (atomic or molecular, e.g. Van der Waals diameter or effective Van der Waals diameter) of the target substance(s) is within +/−5 Å of the de Broglie wavelength of the target substance(s), respectively at SATP or at the relevant contacting temperature, suitably within +/−4 Å, suitably within +/−3.5 Å, suitably within +/−2 Å suitably within +/−1 Å, suitably within +/−0.5 Å. Suitably, the difference between the cavity size of the sorption compound, at SATP or at the relevant contacting temperature, and the size (atomic or molecular, e.g. Van der Waals diameter or effective Van der Waals diameter) of the target substance(s) is at most 0.4 Å of the de Broglie wavelength of the target substance(s), respectively at SATP or at the relevant contacting temperature, suitably at most 0.3 Å, suitably at most 0.2 Å.

Suitably, the cavity size of the sorption compound, at SATP, is within +/−5 Å of the de Broglie wavelength of the target substance(s) at SATP. Suitably, the cavity size of the sorption compound, at SATP, is within +/−4 Å of the de Broglie wavelength of the target substance(s) at SATP. Suitably, the cavity size of the sorption compound, at SATP, is within +/−3.5 Å of the de Broglie wavelength of the target substance(s) at SATP. More preferably, the cavity size of the sorption compound, at SATP, is within +/−2 Å of the de Broglie wavelength of the target substance(s) at SATP. Suitably, the cavity size of the sorption compound, at SATP, is within +/−1 Å of the de Broglie wavelength of the target substance(s) at SATP. Suitably, the cavity size of the sorption compound, at SATP, is within +/−0.5 Å of the de Broglie wavelength of the target substance(s) at SATP.

Suitably, the cavity size of the sorption compound, at the relevant contacting temperature, is within +/−5 Å of the de Broglie wavelength of the target substance(s) at the relevant contacting temperature. Suitably, the cavity size of the sorption compound, at the relevant contacting temperature, is within +/−4 Å of the de Broglie wavelength of the target substance(s) at the relevant contacting temperature. Suitably, the cavity size of the sorption compound, at the relevant contacting temperature, is within +/−3.5 Å of the de Broglie wavelength of the target substance(s) at the relevant contacting temperature. More preferably, the cavity size of the sorption compound, at the relevant contacting temperature, is within +/−2 Å of the de Broglie wavelength of the target substance(s) at the relevant contacting temperature. Suitably, the cavity size of the sorption compound, at the relevant contacting temperature, is within +/−1 Å of the de Broglie wavelength of the target substance(s) at the relevant contacting temperature. Suitably, the cavity size of the sorption compound, at the relevant contacting temperature, is within +/−0.5 Å of the de Broglie wavelength of the target substance(s) at the relevant contacting temperature. Suitably, the cavity size of the sorption compound, at the relevant contacting temperature, is within +/−0.4 Å of the de Broglie wavelength of the target substance(s) at the relevant contacting temperature.

Suitably, the cavity size at SATP is at most 6.0 Å. Suitably, the cavity size at SATP is at most 5.0 Å. Suitably, the cavity size at SATP is between 0.1 to 4.0 Å. Suitably, the cavity size at SATP is between 0.2 to 3.5 Å. Suitably, the cavity size at SATP is between 0.3 to 3.0 Å. Suitably, the cavity size at SATP is between 0.5 to 2.5 Å. Suitably, the cavity size at SATP is between 1 to 2.4 Å. Suitably, the cavity size at SATP is between 1.5 to 2.3 Å. Preferably, the cavity size at SATP is between 1.6 to 2.1 Å. In a particular embodiment, the cavity size is between 1.9 and 2.0 Å.

Suitably, the cavity size at the relevant contact temperature is at most 6.0 Å. Suitably, the cavity size at the relevant contact temperature is at most 5.0 Å. Suitably, the cavity size at the relevant contact temperature is between 0.1 to 4.0 Å. Suitably, the cavity size at the relevant contact temperature is between 0.2 to 3.5 Å. Suitably, the cavity size at the relevant contact temperature is between 0.3 to 3.0 Å. Suitably, the cavity size at the relevant contact temperature is between 0.5 to 2.5 Å. Suitably, the cavity size at the relevant contact temperature is between 1 to 2.4 Å. Suitably, the cavity size at the relevant contact temperature is between 1.5 to 2.3 Å. Preferably, the cavity size at the relevant contact temperature is between 1.6 to 2.1 Å. In a particular embodiment, the cavity size is between 1.9 and 2.0 Å.

The sorption compound is suitably porous to protium, suitably at SATP and/or suitably at the relevant contact temperature. The sorption compound is suitably porous to deuterium, suitably at SATP and/or suitably at the relevant contact temperature. The sorption compound is suitably porous to protium and deuterium, suitably at SATP and/or suitably at the relevant contact temperature.

Where the sorption compound crystallises to afford a sorption compound crystal or crystalline sorption compound, suitably the sorption compound comprises extrinsic voids that are larger than the cavity size, although in some embodiments, the extrinsic voids may be slightly smaller than the cavity size. Suitably, the size of the extrinsic voids of the sorption compound are within 1 Å of the cavity size of the sorption compound, suitably within 0.5 Å thereof, suitably within 0.2 Å thereof.

Method of Preparing Sorption Compound

The present invention provides a method of preparing a sorption compound, the method comprising reacting a precursor compound as defined herein with a molecular tie compound.

The present invention provides a method of preparing a sorption compound, the method comprising providing a precursor compound as defined herein, wherein the precursor compound is a porous organic cage comprising an internal cavity bearing one or more functionalizable groups; and functionalizing one or more of the functionalizable groups to modify (suitably reduce) the size of the internal cavity. Suitably functionalization of the internal cavity does not alter the crystal structure of the sorption compound.

The functionalizable groups of the internal cavity are suitably judiciously functionalized to provide the desired cavity size. As such, functionalizing the internal cavity suitably constitutes fine-tuning of the internal cavity and/or cavity size (and/or cavity-window size).

Functionalization of a precursor compound to form a sorption compound may suitably comprise one or more of the steps of:

vii) Functionalizing one or more functionalizable groups (or one or more sets or pairs of functionalizable groups) with a first functionalizing substance to provide one or more first-functionalized groups;

viii) Functionalizing one or more other functionalizable groups (or one or more other sets or pairs of functionalizable groups) with a second functionalizing substance to provide one or more second-functionalized groups;

ix) Defunctionalizing (or deprotecting) one or more of the first-functionalized groups to provide one or more first-defunctionalized groups, suitably corresponding to regenerated functionalizable group(s);

x) Refunctionalizing one or more of the first-defunctionalized group(s) with a third functionalizing substance, which is optionally the same as or different to either the first or second functionalizing substance, to provide one or more third-functionalized groups;

xi) Defunctionalizing (or deprotecting) one or more of the second-functionalized groups to provide one or more second-defunctionalized groups, suitably corresponding to regenerated functionalizable group(s);

xii) Refunctionalizing one or more of the second-defunctionalized group(s) with a functionalizing substance, which is optionally the same as or different to any of the first, second, or third functionalizing substances, to provide one or more fourth-functionalized groups.

Preferably, functionalization of a precursor compound comprises at least step i), and in some embodiments only step i) (of steps i)-vi)) to thereby provide a homo-functionalized sorption compound formed from a single functionalizing substance.

In an embodiment, functionalization of a precursor compound comprises at least steps i) and ii), and in some embodiments only steps i) and ii) (of steps i)-vi)) to thereby provide a hetero-functionalized sorption compound formed from two different functionalizing substances.

In an embodiment, functionalization of a precursor compound comprises at least steps i), ii), and iii), and in some embodiments only steps i), ii) and iii) (of steps i)-vi)) to thereby provide a homo-functionalized sorption compound formed from a single functionalizing substance (albeit suitably less functionalized and possibly with a smaller cavity size than a corresponding method which only involve step i) with the same functionalizing substance).

In an embodiment, functionalization of a precursor compound comprises at least steps i), ii), iii), and iv), and in some embodiments only steps i), ii), iii), and iv) (of steps i)-vi)) to thereby provide a hetero-functionalized sorption compound formed from two different functionalizing substances (second and third functionalizing substances). In such embodiments, step i) serves as a protecting step, installing the first functionalizing substance as a protecting group which is later removed in step iii).

In some embodiments, further fine tuning may take place where the second functionalization was also a protecting step, and such embodiments may comprise all of steps i)-v) or all of steps i)-vi).

Functionalization of a precursor compound to form a sorption compound may suitably comprise:
- functionalization with a single tie compound, whether partially (i.e. functionalizing some but not all functionalizable groups within the internal cavity) or fully (i.e. functionalizing all functionalizable groups within the internal cavity);
- partial functionalization with a first tie compound followed by functionalization with a second tie compound, wherein the first tie compound is larger (sterically) than the second tie compound;
- partial functionalization with a first tie compound followed by functionalization with a second tie compound and thereafter defunctionalization (deprotection) of the first tie compound, wherein the first tie compound is larger (sterically) than the second tie compound;
- partial functionalization with a first tie compound followed by functionalization with a second tie compound, and thereafter defunctionalization (deprotection) of the first tie compound and refunctionalization with a third tie compound, wherein the first tie compound is larger (sterically) than the second tie compound;

The method of preparing a sorption compound may suitably comprise reacting RCC3 with formaldehyde (or a synthetic equivalent thereof, e.g. paraformaldehyde or an acetal or hemiacetal of formaldehyde) to produce sorption compound 6FT-RCC3.

The method of preparing a sorption compound may suitably comprise reacting RCC3 with acetaldehyde (or a synthetic equivalent thereof) to produce sorption compound 6ET-RCC3.

The method of preparing a sorption compound may suitably comprise reacting RCC3 with acetone (or a synthetic equivalent thereof) to produce sorption compound 1AT-RCC3.

The method of preparing a sorption compound may suitably comprise reacting RCC3 with acetone (or a synthetic equivalent thereof) to produce sorption compound 1AT-RCC3, and thereafter react 1AT-RCC3 with formaldehyde (or a synthetic equivalent thereof) to produce sorption compound 1AT-5FT-RCC3.

The method of preparing a sorption compound may suitably comprise reacting RCC3 with acetone (or a synthetic equivalent thereof) to produce sorption compound 1AT-RCC3, then reacting 1AT-RCC3 with formaldehyde (or a synthetic equivalent thereof) to produce sorption compound 1AT-5FT-RCC3, and thereafter removing (deprotecting) the acetone tie to produce 5FT-RCC3.

The method of preparing a sorption compound may suitably comprise reacting RCC3 with acetone (or a synthetic equivalent thereof) to produce sorption compound 1AT-RCC3, then reacting 1AT-RCC3 with formaldehyde (or a synthetic equivalent thereof) to produce sorption compound 1AT-5FT-RCC3, thereafter removing (deprotecting) the acetone tie to produce 5FT-RCC3, and then reacting 5FT-RCC3 with acetaldehyde (or a synthetic equivalent thereof) to produce sorption compound 1ET-5FT-RCC3.

The method of preparing a sorption compound may suitably comprise reacting RCC3 with acetone (or a synthetic equivalent thereof) to produce sorption compound 1AT-RCC3, then reacting 1AT-RCC3 with formaldehyde (or a synthetic equivalent thereof) to produce sorption compound 1AT-5FT-RCC3, thereafter removing (deprotecting) the acetone tie to produce 5FT-RCC3, and then reacting 5FT-RCC3 with propionaldehyde (or a synthetic equivalent thereof) to produce sorption compound 1PT-5FT-RCC3.

All reactions suitably take place in solution.

The present invention provides a method of preparing a sorption compound, the method comprising:
- preparing a pre-functionalized sorption compound, wherein the sorption compound is a porous organic cage comprising an internal cavity with one or more functionalizable groups; and
- chemically modifying (post-functionalizing) the internal cavity of the sorption compound, optionally by: protecting some but not all functionalizable groups within the internal cavity with protecting groups, functionalizing one or more unprotected functionalizable groups, deprotecting the functionalizable groups protected with protecting groups, and optionally thereafter further functionalizing one or more unprotected functionalizable groups.

Fine Tuning

The present invention provides a method of fine-tuning the internal cavity of a porous organic cage, the method comprising providing a precursor compound as defined herein, wherein the precursor compound is a porous organic cage comprising an internal cavity bearing one or more functionalizable groups; and selectively functionalizing one or more of the functionalizable groups to fine-tune (suitably reduce) the size of the internal cavity. Suitably functionalization of the internal cavity does not alter the crystal structure of the sorption compound. The method of fine tuning suitably comprises performing the steps of a method of preparing a sorption compound as defined herein. The method may thereafter further comprise using the sorption compound in a method of sorbing (or other related methods, such as method of extracting, etc.) as defined herein.

According to an aspect of the present invention there is provided a method of preferentially sorbing one or more target substance(s) over one or more non-target substance(s) from a target mixture comprising, consisting essentially of, or consisting of the target substance(s) and the non-target substance(s), the method comprising: preparing a pre-functionalized sorption compound, wherein the sorption compound is a porous organic cage comprising an internal cavity with one or more functionalizable groups;
- chemically modifying (post-functionalizing) the internal cavity of the sorption compound, optionally by: protecting some but not all functionalizable groups within the internal cavity with protecting groups, functionalizing one or more unprotected functionalizable groups, deprotecting the functionalizable groups protected with protecting groups, and optionally thereafter further functionalizing one or more unprotected functionalizable groups; and contacting the target mixture with a sorption composition (or device comprising the sorption composition), wherein the sorption composition comprises, consists essentially of, or consists of a sorption compound and optionally a co-crystallization compound.

Co-Crystallization Compound

The co-crystallization compound may be defined according to any of the definitions given herein in relation to the sorption compound, with the sole proviso that the co-crystallization compound is a different compound (or molecule) to the sorption compound—i.e. is chemically different (though in any, some, or all other respect they may be similar or the same). As such, the co-crystallization compound suitably comprises a multidimensional (at least 2-dimensional, preferably 3-dimensional) interconnected (suitably via interconnecting voids) porous network. The co-crystallization compound suitably comprises intrinsic pores, suitably arising from cavities within the porous molecules themselves—such intrinsic voids are suitably independent of overall crystal structure. The co-crystallization compound may comprise either or both intrinsic and/or extrinsic pores (or voids). The sorption compound suitably comprises at least one internal cavity. The sorption compound is preferably a porous organic cage (POC).

Whilst the co-crystallization compound is suitably different to the sorption compound, the co-crystallization compound suitably crystallizes in a manner that is (substantially) isostructural with the sorption compound—i.e. the co-crystallization compound suitably has (substantially) the same crystal structure as the sorption compound. The co-crystallization compound and the sorption compound both suitably have a diamondoid pore network. Suitably, the individual crystal structures of the sorption compound and the co-crystallization compound have identical symmetry (even if slightly differently sized). Suitably, the individual crystal structures of the sorption compound and the co-crystallization compound have the same space group. Suitably, the individual crystal structures of the sorption compound and the co-crystallization compound have the same unit cell structure. The combination of intrinsic and extrinsic voids of the co-crystallization compound suitably affords an interconnected 3-dimensional (3D) porous network comprising continuous porous channels.

The co-crystallization compound is suitably shape-persistent—for instance, they are suitably not prone to collapse (e.g. pore collapse).

The co-crystallization compound suitably has an internal cavity capable of hosting a guest which, in this case, is suitably a target substance(s). The internal cavity of the co-crystallization compound is suitably sized to accommodate the target substance (or one or more target substance(s)).

The co-crystallization compound suitably has a cavity size that is larger than that of the sorption compound, suitably larger by at least 0.2 Å, suitably larger by at least 0.5 Å, suitably larger by at least 1 Å, suitably larger by at least 2 Å, suitably larger by at least 2.5 Å. The co-crystallization compound suitably has a cavity size that is larger than that of the sorption compound, though suitably larger by at most 30 Å, suitably larger by at most 20 Å, suitably larger by at most 10 Å, suitably larger by at most 5 Å, suitably larger by at most 4 Å, suitably larger by at most 3 Å. The co-crystallization compound suitably has a cavity size that is larger than that of the sorption compound by between 0.5-4 Å, suitably by between 1-3 Å.

Suitably, the cavity size of the co-crystallization compound at SATP is at most 30 Å. Suitably, the cavity size of the co-crystallization compound at SATP is at most 20 Å. Suitably, the cavity size of the co-crystallization compound at SATP is between 1 to 15 Å. Suitably, the cavity size of the co-crystallization compound at SATP is between 2 to 10 Å. Suitably, the cavity size of the co-crystallization compound at SATP is between 3 to 7 Å. Suitably, the cavity size of the co-crystallization compound at SATP is between 4 to 5 Å.

Suitably, the cavity size of the co-crystallization compound at the relevant contact temperature is at most 30 Å. Suitably, the cavity size of the co-crystallization compound at the relevant contact temperature is at most 20 Å. Suitably, the cavity size of the co-crystallization compound at the relevant contact temperature is between 1 to 15 Å. Suitably, the cavity size of the co-crystallization compound at the relevant contact temperature is between 2 to 10 Å. Suitably, the cavity size of the co-crystallization compound at the relevant contact temperature is between 3 to 7 Å. Suitably, the cavity size of the co-crystallization compound at the relevant contact temperature is between 4 to 5 Å.

The co-crystallization compound is suitably porous to protium, suitably at SATP and/or suitably at the relevant contact temperature. The co-crystallization compound is suitably porous to deuterium, suitably at SATP and/or suitably at the relevant contact temperature. The co-crystallization compound is suitably porous to protium and deuterium, suitably at SATP and/or suitably at the relevant contact temperature.

Where the co-crystallization compound crystallises to afford a co-crystallization compound crystal or crystalline co-crystallization compound, suitably the co-crystallization compound comprises extrinsic voids that are larger than the cavity size of the co-crystallization compound, although in some embodiments, the extrinsic voids may be slightly smaller than the cavity size. Suitably, the size of the extrinsic voids of the co-crystallization compound are within 3 Å of the cavity size of the co-crystallization compound, suitably within 2 Å thereof, suitably within 1 Å thereof.

The co-crystallization compound is suitably less selective (on its own), in terms of preferentially sorbing the target substance(s) over the non-target substance(s), than the sorption compound. The co-crystallization compound suitably exhibits (on its own) sorption selectivity (i.e. ratio, such as molar ratio, volume ratio, or weight ratio, of sorbed target substance(s) to sorbed non-target substance(s), preferably a molar ratio) of target substance(s) to non-target substance(s) of at most 3, suitably at least 2, suitably at most 0.5.

The co-crystallization compound suitably exhibits a higher sorption capacity for target substance(s) (and suitably also non-target substance(s)) than the sorption compound, especially at the relevant contacting temperature. The co-crystallization compound suitably has a sorption capacity (i.e. is capable of a sorption uptake), suitably at 1 bar at the relevant contacting temperature (or at SATP), of target substance(s) and/or non-target substance(s) of at least 1 mmol/g (i.e. 1 mmol of target/non-target substance(s) per gram of co-crystallization compound) more than that of the sorption compound, more suitably at least 2 mmol/g more than the sorption compound.

The co-crystallization compound suitably exhibits structural similarities with the sorption compound, though has larger internal cavities. Suitably, the internal cavities of the co-crystallization compound is free from the functionalized or functionalizable groups respectively present in the sorption compound and/or precursor compound related to the sorption compound. The internal cavity of the co-crystallization compound is suitably not chemically modifiable in the same way as the internal cavity of the sorption compound.

Where both the sorption compound and co-crystallization compound are chiral, both are suitably enantiomerically pure (or enantiomerically enriched) in a single enantiomer, wherein the single enantiomer of the sorption compound is the opposite chirality to the that of the co-crystallization compound (e.g. one is an R-enantiomer and the other is an S-enantiomer).

Suitably, the sorption compound and co-crystallization compound are the same or a related class of compound. For instance, if the sorption compound is a boronic ester cage, the co-crystallization compound is suitably also a boronic ester cage. However, in a particular embodiment, the sorption compound is a diamine cage whilst the co-crystallization compound is an imine cage. In a particular embodiment, the sorption compound is a [4-6] functionalized diamine cage and the co-crystallization compound is a [4+6] imine cage.

In a particular embodiment, the co-crystallization compound comprises one or more units defined by Formula E:

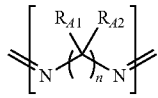

Formula E wherein:
n is an integer between 1 and 4;
each $R_{A1}$ and $R_{A2}$ group is independently hydrogen or an optionally substituted substituent group, wherein any pair of $R_{A1}$ and $R_{A2}$ groups are optionally joined together to form a carbocyclic, heterocyclic, aryl, or heteroaryl ring,
wherein suitably the units of Formula E are linked together via a linker (i.e. are not directly bonded).

The units of Formula E are represented in divalent form, as donated by the bonds intersected by square brackets (these bonds may be considered as radicals, or "connectable bonds"). These units may be considered repeat units where the relevant compounds comprise two or more of said units (which is generally the case). The co-crystallization compound suitably comprises a plurality of units of Formula E linked together (suitably to form an open chain, macrocyclic, or caged compound/molecule, most suitably a cage) via (heir "connectable bonds", suitably via an intervening linker. Such a linker may link together two or more units of Formula E, and in some embodiments links three such units. As such, said linker is suitably polyvalent (e.g. divalent, trivalent). The linker, n, $R_{A1}$, and $R_{A2}$ of the co-crystallization compound suitably have any of the definitions set forth in relation to the sorption compound. Most preferably, the sorption compound comprises one or more tied units of Formula C, and the co-crystallization compound comprises one or more tied units of Formula E, wherein the two compound correspond in every other respect (e.g. same linker, n, $R_{A1}$, and $R_{A2}$).

In a particular embodiment $R_{A1}$, $R_{A2}$ and -$L_1$- are selected such that the co-crystallization compound comprises a plurality of reactive units of Formula $E_1$, each reactive unit being indirectly linked (through their connectable bonds denoted by square brackets) to a neighbouring distinct unit via an intervening linker unit of Formula $A_L$ (through connectable bonds thereof denoted again by square brackets):

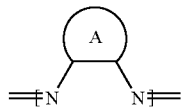

Formula $E_1$ wherein Ring A is a carbocyclic, aryl, heterocyclic, or heteroaryl ring:
wherein any of the groups of Formula $E_1$ or $A_{1L}$ are optionally substituted as defined herein. In this embodiment, the co-crystallization compound suitably comprises units of Formula $E_1$ and $A_{1L}$ respectively in a molar ratio of 3:2 (e.g. 6 units of $A_1$ and 4 of $A_{1L}$). In adaptations of this embodiment, Ring A may be replaced with a (2-3C)alkylene group between the relevant imine moieties to produce an alkylenediimine.

In a particular embodiment $R_{A1}$, $R_{A2}$-$L_1$-, Ring A, and Ring L are selected such that the co-crystallization compound comprises a plurality of reactive units of Formula $E_2$, each reactive unit being indirectly linked to a neighbouring distinct reactive unit via an intervening linker unit of Formula $A_{2L}$:

Formula $E_2$ wherein any of the groups of Formula $E_2$ or $A_{2L}$ are optionally substituted as defined herein, though most suitably they are unsubstituted. In this embodiment, the co-crystallization compound suitably comprises units of Formula $E_2$ and $A_{2L}$ respectively in a molar ratio of 3:2 (e.g. 6 units of $A_2$ and 4 pf $A_{2L}$). In adaptations of this embodiment, the cyclohexane ring may be replaced with a (2-3C)alkylene group between the relevant imine moieties to produce an alkylenediimine and optionally the benzene ring of the linker may be replaced with a heteroarene ring.

In a particular embodiment, the co-crystallization compound is imine compound of Formula E3:

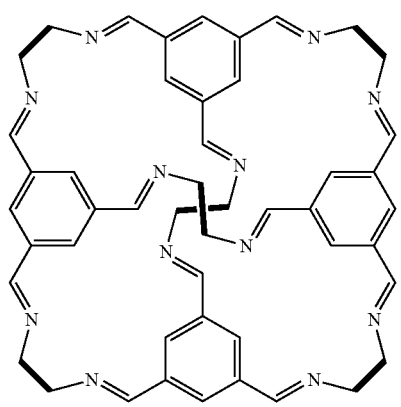

wherein the bold lines match those of the Formula A3. This imine compound is also referred to herein as CC3.

The co-crystallization compound is suitably CC3.

Co-Crystal

The present invention provides a co-crystal comprising the sorption compound, as defined herein, and the co-crystallization compound, as defined herein. In the co-crystal, the sorption compound and co-crystallization compound are co-crystallized together.

A co-crystal is suitably formed by co-crystallization (or recrystallization) of the sorption compound and co-crystallization compound from a mixture thereof, more suitably from a solution thereof. Suitably, the sorption compound and co-crystallization compound are mixed in a molar ratio suitable for achieving the target molar ratio in the co-crystal.

The co-crystal suitably crystallizes in a manner that is (substantially) isostructural with the sorption compound and/or co-crystallization compound. The co-crystal suitably has a diamondoid pore network. Suitably, the co-crystal has identical symmetry (even if slightly differently sized) to the sorption compound and/or co-crystallization compound. Suitably, the co-crystal has the same space group as the sorption compound and/or co-crystallization compound. Suitably, the co-crystal has the same unit cell structure as the sorption compound and/or co-crystallization compound. The co-crystal suitably comprises intrinsic voids (internal cavities) provided by the internal cavities of the sorption compound and co-crystallization compound, and thus suitably comprise two different internal cavities, suitably of a different size (see above for cavity sizes are the respective sorption compound and co-crystallization compound, which suitably correspond with the cavity sizes within the co-crystal). The co-crystal suitably also comprises extrinsic voids. The combination of intrinsic and extrinsic voids of the co-crystallization compound suitably affords an interconnected 3-dimensional (3D) porous network comprising continuous porous channels.

The co-crystal is suitably shape-persistent—for instance, they are suitably not prone to collapse (e.g. pore collapse).

The co-crystal suitably has a relatively small internal cavity and a relatively large internal cavity, both of which are capable of hosting a guest which, in this case, is suitably a target substance(s). The small internal cavity is suitably provided by the sorption compound (and its properties are suitably as defined herein in relation to the sorption compound), whereas the large internal cavity is suitably provided by the co-crystallization compound (and its properties are suitably as defined herein in relation to the co-crystallization compound). Any extrinsic voids are suitably larger than the small internal cavity.

Whilst the sorption compound and co-crystallization compound are most suitably distinct molecules, in some embodiments, the two compounds may be covalently linked, optionally via a linker, to form a sorption-cocrystallization compound (suitably with two different types of internal cavity with size differentials as aforementioned), and the co-crystal may in such circumstances comprise or consist of the sorption-cocrystallization compound.

The co-crystal is suitably porous to protium, suitably at SATP and/or suitably at the relevant contact temperature. The co-crystal is suitably porous to deuterium, suitably at SATP and/or suitably at the relevant contact temperature. The co-crystal is suitably porous to protium and deuterium, suitably at SATP and/or suitably at the relevant contact temperature.

The co-crystal is suitably more selective, in terms of preferentially sorbing the target substance(s) over the non-target substance(s), than the sorption compound. The co-crystal suitably exhibits sorption selectivity (i.e. ratio, such as molar ratio, volume ratio, or weight ratio, of sorbed target substance(s) to sorbed non-target substance(s), preferably a molar ratio) of target substance(s) to non-target substance(s) of at least 3, suitably at least 5, suitably at least 7.

The co-crystal suitably exhibits a higher sorption capacity for target substance(s) (and suitably also non-target substance(s)) than the sorption compound, especially at the relevant contacting temperature. The co-crystal suitably has a sorption capacity (i.e. is capable of a sorption uptake), suitably at 1 bar at the relevant contacting temperature (or at SATP), of target substance(s) and/or non-target substance(s) of at least 1 mmol/g (i.e. 1 mmol of target/non-target substance(s) per gram of co-crystal) more than that of the sorption compound, more suitably at least 2 mmol/g more than the sorption compound.

Within the co-crystal, suitably the sorption compound and co-crystallization compound have the opposite chirality, where they are chiral. This suitably allows for "chiral recognition" that facilitates more closely packed crystal structures.

The co-crystal suitably exhibits an alternating crystal structure with respect to sorption compound molecules and co-crystallization compound molecules.

The co-crystal is suitably configured to sorb, at the relevant contacting temperature and pressure, the target substance(s) in both the internal cavity provided by the sorption compound and internal cavity provided by the co-crystallization compound.

The molar ratio of sorption compound to co-crystallization compound in the co-crystal is suitably between 10:1 and 1:10, more suitably between 5:1 and 1:5, more suitably between 3:1 and 1:3. In a particular embodiment, the molar ratio of sorption compound to co-crystallization compound in the co-crystal is about 1:1.

Particular Embodiments of the Invention

In a particular embodiment are methods of the invention, the sorption compound is a porous organic cage with a functionalized internal cavity having a size, at SATP, within +/−1 Å of the de Broglie wavelength of the target substance(s) at the relevant contact temperature, the co-crystallization compound is a porous organic cage with an internal cavity size that, at SATP, is at least 1 Å larger than the internal cavity size of the sorption compound, the sorption composition comprises a co-crystal of the sorption compound and co-crystallization compound, the target compound is or comprises deuterium and/or tritium, the non-target compound is or comprises protium, and the contacting temperature is 20-80K.

In a particular embodiment are methods of the invention, the sorption compound is a porous organic cage with a functionalized internal cavity having a size, at SATP, within +/−1 Å of the de Broglie wavelength of the target substance(s) at the relevant contact temperature, the co-crystallization compound is a porous organic cage with an internal cavity size that, at SATP, is at least 1 Å larger than the internal cavity size of the sorption compound, the sorption composition comprises a co-crystal of the sorption compound and co-crystallization compound, the target compound is deuterium, the non-target compound is or comprises protium, and the contacting temperature is 20-80K.

In a particular embodiment are methods of the invention, the sorption compound is a functionalized polydiamine cage, suitably wherein one, some, or all (though not necessarily all) diamine units are functionalized (suitably by a molecular tie).

In a particular embodiment are methods of the invention, the sorption compound is a functionalized polydiamine cage with an internal cavity size at SATP between 1 to 2.4 Å, the co-crystallization compound is polydiimine cage with an internal cavity size that, at SATP, is at least 1 Å larger than the internal cavity size of the sorption compound, the sorption composition comprises a co-crystal of the sorption compound and co-crystallization compound, the target compound is or comprises deuterium and/or tritium, the non-target compound is or comprises protium, and the contacting temperature is 20-80K.

In a particular embodiment are methods of the invention, the sorption compound is a functionalized polydiamine cage with an internal cavity size at SATP between 1 to 2.4 Å, the co-crystallization compound is polydiimine cage with an internal cavity size that, at SATP, is at least 1 Å larger than the internal cavity size of the sorption compound, the sorption composition comprises a co-crystal of the sorption compound and co-crystallization compound, the target compound is deuterium, the non-target compound is or comprises protium, and the contacting temperature is 20-80K.

In a particular embodiment are methods of the invention, the sorption compound is 6ET-RCC3, the co-crystallization compound is CC3, the sorption composition comprises a co-crystal of the sorption compound and co-crystallization compound, the target compound is or comprises deuterium and/or tritium, the non-target compound is or comprises protium, the contacting temperature is 25-35K, the contacting pressure is 10-1100 mbar.

In a particular embodiment are methods of the invention, the sorption compound is 6ET-RCC3, the co-crystallization compound is CC3, the sorption composition comprises a co-crystal of the sorption compound and co-crystallization compound, the target compound is deuterium, the non-target compound is or comprises protium, the contacting temperature is 25-35K, the contacting pressure is 10-1100 mbar.

EXAMPLES

The present invention is further illustrated by way of the following non-limiting Examples, Experiments, and Results, from which it will be self-evident that certain specific features may be combined with any aspects and embodiments of the invention described elsewhere herein. Before embarking upon a detailed discussion of the Experiments, first relevant materials, protocols, methods, and compounds are elucidated.

The aforementioned prior disclosure by the inventors, Liu M et al. Barely porous organic cages for hydrogen isotope separation. *Science*. 2019; 366(6465):613-620. doi:10.1126/science.aax7427, describes the same or similar Examples, and nomenclature, abbreviations, and terminology used below may be clarified by reference to this document or its Supplementary Materials. Likewise, additional data and explanations are elucidated in the Supplementary Materials of this disclosure. Moreover, certain references cited within this disclosure may be pertinent to enable the production of relevant compounds, compositions, and materials discussed below.

Materials

Nomenclature: The organic cage molecules were named according to the 'tying' molecules molecules that were reacted with the six diamine groups of RCC3. Hence, FI, AT, ET, and PT represent products where the diamine group/s were tied with formaldehyde, acetone, ethanal (acetaldehyde), and propionaldehyde. The preceding number indicates how many of the RCC3 diamine groups were reacted in this way; for example, 1AT-5FT-RCC3 is the product formed by sequentially reacting RCC3 with one acetone molecule (1AT) and then five formaldehyde molecules (5FT).

1,3,5-Triformylbenzene was purchased from Manchester Organics, UK. All other chemicals were purchased from Sigma-Aldrich and used as received. CC3 (covalent cage 3), RCC3 (reduced covalent cage 3), 1AT-RCC3, and 6FT-RCC3 were prepared according to previously reported procedures in their homochiral form, using chirally pure (1S, 2S)-(+)-1,2-diaminocyclohexane (31).

Cocryst1 (CC3-S/6ET-RCC3-R Co-crystal) formation. CC3-S was dissolved in DCM (5 mg/mL) and added to an equivalent dichloromethane solution of 6ET-RCC3-R at equal molar concentration (5.75 mg/mL). The solutions were mixed by direct addition at room temperature, with stirring. No precipitation was observed on mixing, but the solution became cloudy after approximately 10 minutes. The co-crystal, Cocryst1, was collected by filtration (Whatman® membrane filter PTFE, pore size 0.2 μm). Crystals suitable for single-crystal X-ray diffraction were cultured by vapour diffusion of acetone into the $CHCl_3$ solution of equal molar concentration CC3-S and 6ET-RCC3-R.

Analytical Protocols

Solution NMR

Solution $^1H$ NMR spectra were recorded at 400.13 MHz using a Bruker Avance 400 NMR spectrometer. $^{13}C$ NMR spectra were recorded at 100.6 MHz.

Fourier Transform Infrared Spectroscopy (FTIR)

IR spectra were collected on a Bruker Tensor 27 spectrometer. Samples were analyzed as KBr disks for 16 scans with a resolution of 4 $cm^{-1}$. Spectra were recorded in transmission mode.

Thermogravimetric Analysis

TGA analysis was carried out using a Q5000IR analyzer (TA instruments) with an automated vertical overhead thermobalance. The samples were heated at the rate of 5° C./min.

Powder X-Ray Diffraction

Laboratory powder X-ray diffraction (PXRD) patterns were collected in transmission mode on samples held on thin Mylar film in aluminium well plates on a Panalytical Empyrean diffractometer, equipped with a high throughput screening (HTS) XYZ stage, X-ray focusing mirror, and PIXcel detector, using Cu-Kα ($\lambda$=1.541 Å) radiation. PXRD patterns were measured over the 2θ range 5-50°, in ~0.013° steps, over 1 hour. For indexing, samples were loaded into borosilicate glass capillaries, and PXRD patterns were recorded in transmission mode on a Panalytical Empyrean diffractometer, equipped with a sample spinner to improve powder averaging. High resolution synchrotron PXRD data for Cocryst1, (CC3-S/6ET-RCC3-R), was collected using the I11 beamline at Diamond Light Source ($\lambda$=0.825015 Å), which is equipped with a Mythen II position sensitive detector. This sample was loaded in a borosilicate glass capillary that was rocked to improve powder averaging during data acquisition.

Electron Microscopy

Imaging of the crystal morphology was achieved using a Hitachi S-4800 cold field emission scanning electron microscope (FE-SEM) operating in both scanning and transmission modes. Scanning-mode samples were prepared by depositing dry crystals on 15 mm Hitachi M4 aluminum stubs using an adhesive high-purity carbon tab before coating with a 2 nm layer of gold using an Emitech K550X automated sputter coater. Imaging was conducted at a working distance of 8 mm and a working voltage of 3 kV using a mix of upper and lower secondary electron detectors. Transmission-mode samples were prepared by dispersing the cage particles in a methanol suspension and depositing onto carbon-coated copper grids (300 mesh), imaging at 30 kV working voltage and 7 mm distance.

Gas Sorption Analysis

For determining gas sorption isotherms gasses of the following purities were used: hydrogen (99.9995%—BOC gases) and carbon dioxide (SCF grade—BOC gases). Surface areas and pore size distributions were measured by nitrogen adsorption and desorption at 77.3 K using a Micromeritics ASAP 2020 volumetric adsorption analyzer. Samples were degassed at offline at 80° C. for 15 h under vacuum (10-5 bar) before analysis, followed by degassing on the analysis port under vacuum, also at 80° C. Carbon dioxide isotherms were measured at 289K using a Micromeritics 2420 volumetric adsorption analyzer using the same degassing procedure.

Single Crystal X-ray Diffraction

Single crystal X-ray data sets were measured using a Rigaku MicroMax-007 HF rotating anode diffractometer (Mo-Kα radiation, λ=0.71073 Å, Kappa 4-circle goniometer, Rigaku Saturn724+ detector); at beamline 11.3.1, Advanced Light Source, Berkeley, USA, using silicon monochromated synchrotron radiation (λ=0.7749 Å or 1.0332 Å, PHOTON100 CMOS detector); or at beamline 119, Diamond Light Source, Didcot, UK using silicon double crystal monochromated synchrotron radiation (λ=0.6889 Å, Dectris Pilatus 2M detector). Unless started in the refinement details section, desolvated single crystals, which had been activated by removing solvent at 353 K under dynamic vacuum, were mounted on a MiTeGen loops and flash cooled to 100 K under a dry nitrogen gas flow. Empirical absorption corrections, using the multi-scan method, were performed with the program SADABS.(49) For synchrotron X-ray data collected at Diamond Light Source (λ=0.6889 Å), data reduction and absorption corrections were performed with xia2.(50) Structures were solved with SHELXT (51) and refined by full-matrix least squares on |F|$^2$ by SHELX (52), interfaced through the programme OLEX2 (53). Unless stated all non-H-atoms were refined anisotropically, and unless stated H-atoms were fixed in geometrically estimated positions and refined using the riding model. Supplementary CIF's, which include structure factors, are available free of charge from the Cambridge Crystallographic Data Centre (CCDC) via www.ccdc.cam.ac.uk/data_request/cif.

Hydrogen Isotope Adsorption/Separation Measurements

A fully automated Sierverts apparatus iQ2 (Quantachrome Instruments) was used to perform the adsorption experiments. The calibration cell is an empty analysis carried out at the same temperature and pressure range than each experiment; corrections related the sample volume and the non-linearity of the adsorbate are made. Around 20 mg of sample were activated at 343K under vacuum for 5 hrs in order to remove any solvent molecules. A coupled cryocooler based on the Gifford-McMahon cycle was used to control the sample temperature. The cooling system allows us to measure temperatures from 20 to 300K with an estimated error of <0.05 K.

The selective adsorption after exposure to $D_2/H_2$ isotope mixtures was directly measured by the in-house designed setup of thermal desorption spectroscopy (TDS). For a typical process, about 4 mg sample was loaded in the sample holder and activated at 343 K under vacuum for 5 h. Then, an equimolar $D_2/H_2$ isotope mixture was loaded on the sample at a fixed temperature (exposure temperature, $T_{exp}$) for a chosen exposure time ($t_{exp}$). The free gas was evacuated and then the sample was cooled down to 20 K in order to preserve the adsorbed state. Finally, during heating from 20 K to room temperature with a heating rate of 0.1 K/s, the desorbing gas was continuously detected using a mass spectrometer (QMS), recognizing a pressure increase in the sample chamber when gas desorbs. The area under the desorption peak was proportional to the desorbing amount of gas, which can be quantified after careful calibration of the TDS apparatus.

Calibration of the Mass Spectrometer Signal

A solid polycrystalline piece of a diluted Pd alloy $Pd_{95}Ce_5$ (~0.5 g) was used for calibration. Prior to the calibration, the alloy was etched with aqua regia in order to remove the oxide layer and it was then heated up to 600 K under high vacuum to remove any hydrogen that might be absorbed during the etching procedure. Afterwards, it was weighted and inserted into the sample chamber. At 350 K, it was loaded with 40 mbar pure $H_2$ or pure $D_2$ for 1.5-2.5 h. As H and D were bound preferentially to the Cerium atoms at low loading pressures in this diluted alloy, the alloy could be handled under ambient conditions for a short period of time. After loading, the alloy was cooled to room temperature and weighed. Afterwards, it was placed back in the sample chamber and a normal TDS measurement with 0.1 K/s was performed. After the desorption, the alloy was cooled back to RT and weighted again. The weight difference between unloaded state and loaded state was equal to the mass uptake of hydrogen or deuterium, respectively.

Computational Methods 2.10.1 Pore-Limiting Envelope

Molecular dynamics (MD) simulations were used to calculate a time-averaged, pore-limiting envelope (PLE) for the isostructural series of post-synthetically modified cages in this study. Individual frames of these MD simulations were extracted; with the pore-limiting diameter (PLD) determined for each of them using the high-throughput geometry-based analysis tool Zeo++ (55). Histograms of these values form the respective PLEs for the systems studied here and are displayed in FIG. 1C. PLEs account for the flexibility, intramolecular vibrations and molecular motion about the equilibrium crystal structure. For MD simulations, the experimental single-crystal structures were used as the starting configuration. The MD simulations were carried out using DL_POLY_2.20 (56), with a 2×2×2 supercell. All cage crystals were modelled using the OPLS force field with a cutoff distance of 10 Å. An NPT ensemble at 1 atm and 298 K was used with the Hoover barostat and thermostat, and both had a time constant of 0.5 ps. A timestep of 0.5 fs was used, with the system first equilibrated for 100 ps, followed by a production run of 2 ns, with a frame output every 1 ps. This MD trajectory was used to generate a PLE for the system.

2.10.2 Adsorption and Diffusion Simulations

To account for quantum diffraction effects in classical molecular simulations, the so-called Feynman-Hibbs (FH) effective potentials may be used (44). The quadratic FH potential, $U_{FH}(r)$, operates on a given classical model potential, $U_C(r)$, and is given by $$U_{FH}(r_{ij}) = U_C(r_{ij}) + \frac{\hbar^2}{24\mu_{ij}k_B T}\left[U_C{}''(r_{ij}) + 2\frac{U_C'(r_{ij})}{r_{ij}}\right]$$

where $r_{ij}$ is the separation distance between particles i and j, $\hbar$ the reduced Planck constant, $k_B$ the Boltzmann constant, T the temperature, and $\mu_{ij}$ the reduced mass, which equates to $m_i m_j/(m_i+m_j)$ with $m_i$ and $m_j$ being the masses of the particles. In our simulations of hydrogen adsorption/diffusion at a temperature of 77 K or below, $U_C(r)$ took the form of Lennard-Jones (LJ) potential. Together with a simple charge-charge Coulomb potential, the total (non-bonded) interaction energy is given by $$U^{tot}(r_{ij}) = 4\epsilon_{ij}\left[\left(\frac{\sigma_{ij}}{r_{ij}}\right)^{12} - \left(\frac{\sigma_{ij}}{r_{ij}}\right)^{6}\right] + \frac{4\epsilon_{ij}}{r_{ij}^2}\frac{\hbar^2}{24\mu_{ij}k_BT}\left[132\left(\frac{\sigma_{ij}}{r_{ij}}\right)^{12} - 30\left(\frac{\sigma_{ij}}{r_{ij}}\right)^{6}\right] + \frac{q_i q_j}{4\pi\varepsilon_0 r_{ij}}$$

where $\epsilon_{ij}$ and $\alpha_{ij}$ are the LJ potential well depth and hard-core diameter, respectively, $q_i$ and $q_j$ the partial atomic charges, and $\varepsilon_0$ the vacuum permittivity.

The model proposed by Levesque et al. (57) was used to describe hydrogen as a rigid two-site molecule with the H—H bond length fixed at 0.74 Å; partial atomic charges were placed on the two hydrogen atoms and the centre of mass of the hydrogen molecule to reproduce the quadrupole moment of molecular hydrogen in gas phase. Despite the same force-field parameters (of Levesque et al.) being used for both $H_2$ and $D_2$, their interactions with the surroundings may still be different because of the use of the FH effective potentials. A real-space cutoff of 12.0 Å was applied to all LJ interactions, while long-range Coulomb interactions were handled by the Ewald summation technique with a relative precision of $10^{-6}$. The Lorentz-Berthelot combining rules were used to calculate the LJ cross-parameters for host-guest and guest-guest interactions. For all the porous organic cage crystals simulated, one unit-cell of the experimental crystal structure was used, with periodic boundary conditions exerted in three dimensions. In the cases of flexible-host simulations, the experimental crystal structures were used as starting configurations. The OPLS force field (58) was used to assign force-field parameters (for both bonded and non-bonded interactions) and partial atomic charges to all the cage molecules.

The molecular simulation software for adsorption and diffusion in flexible nanoporous materials, RASPA 2.0 (59), was used throughout this study. Gas adsorption simulations were carried out using a hybrid grand-canonical Monte Carlo (GCMC)/molecular dynamics (MD) scheme, which allows for direct sampling of host motions in adsorption simulations. The hybrid MC/MD moves consisted of an MD path computed in the isoenthalpic-isobaric (NPH) ensemble. Each MD move was performed for 5 timesteps of 0.5 fs each, with a probability of 2% in the simulation. The MD runs allowed the molecular cage crystals to relax upon the loading of the guest molecules, with newly relaxed configurations either accepted or rejected by the MC sampling rule. Other trial MC moves included insertion, deletion, translation, rotation, reinsertion and identity swap (in the case of a gas mixture); these moves were randomly attempted with equal probabilities. All the GCMC/MD and GCMC simulations involved an 800,000-cycle equilibration period followed by a 200,000-cycle production run; one cycle consisted of n MC moves, with n being equal to the number of adsorbate molecules (or 20, whichever is greater). In a typical GCMC/MD simulation performed here, the sampled MD path amounted to approximately 1 ns in total.

2.10.3 Free Energy Profiles of Gas Diffusion in Cage Crystals

Molecular diffusion in nanometer confinements, such as those present in the crystal structures simulated here, can be so slow that the timescale for a particle to hop from one free-energy minimum to the next becomes too large to be reached by routine application of molecular dynamics simulations. For example, a guest molecule may be trapped inside a cage molecule, and the actual time needed for it to escape through a cage window is negligible compared to the time it spends inside the cage. Such a process can be considered an activated process, which may be alternatively probed by rare-event simulation methods such as transition state theory (TST). A comprehensive demonstration of the method in studying transport of adsorbates in nanoporous adsorbents was given by Dubbeldam et al (60).

Free energy profiles (FIG. 5 A-C) were calculated using Monte Carlo simulations in the canonical (NVT) ensemble, together with the Widom particle insertion method. During the simulation, a probe molecule (i.e., $H_2$ or $D_2$) was inserted at many random positions in the cage crystal structure to measure the energy required for or obtained by each of the insertions of the molecule into the system. This energy is mapped onto the reaction coordinate q to produce a free-energy profile, using $$\beta F(q) = -\ln \langle e^{-\beta \Delta U} \rangle_N$$

where $\beta = 1/(k_B T)$ with $k_B$ being the Boltzmann constant and T being the temperature, $\langle e^{-\beta \Delta U} \rangle_N$ is the average Boltzmann factor of all N sampled positions in the plane perpendicular to the reaction coordinate q.

2.11 Host-Guest Binding Energies

Path integral molecular dynamics (PIMD) simulations were combined with quantum mechanical interaction evaluations to further probe the diffusion behaviors of $H_2$ and $D_2$ in the cage molecules, explicitly accounting for the quantum mechanical nature of both the electrons and nuclei. Since path integral simulations are typically two orders of magnitude more expensive to perform than when treating the nuclei classically, we focused only on an isolated 6ET-RCC3 cage molecule with one gas molecule (i.e., $H_2$ or $D_2$) diffusing out of the cage. Further computational cost savings were made by using the self-consistent-charge density-functional tight-binding DFTB3 method (61) for calculation of the interactions from evaluation of the electronic structure, together with a dispersion correction scheme based on UFF (62).

We benchmarked the DFTB3-UFF method for describing the energetics of our host-guest systems (i.e., 6ET-RCC3 with $H_2$ or $D_2$) against DFT-D3 methods with the BLYP and PBE density functionals. The 3OB parameterization was used for all DFTB3 calculations (63). For DFT based calculations, the MOLOPT-DZVP basis set was used for all elements, together with the Goedecker-Teter-Hutter pseudo-potentials (64, 65). The auxiliary planewave basis set was defined by an energy cutoff of 500 Ry, accompanied by a relative cutoff of 50 Ry for the Gaussian basis set collocation. During each self-consistent-field cycle, the electronic structure was minimized to a tolerance of $10^{-8}$ Hartree. Calculations were performed with the CP2K simulation package (https://www.cp2k.org/). The host-guest binding energies were defined as $$E_{binding} = E(\text{host} \ldots \text{guest}) - E(\text{host}) - E(\text{guest})$$

where E(host . . . guest), E(host), and E(guest) are the total energies of the guest-loaded 6ET-RCC3 host, empty 6ET-RCC3 host, and isolated guest molecule ($H_2$ or $D_2$) respectively. Table S6 reports all the binding energies obtained using different methods, which clearly shows that the DFTB3-UFF method is not only computationally efficient but can also describe the systems correctly. Therefore, all the PIMD simulations made use of the DFTB3-UFF method for electronic structure evaluations.

TABLE S6

Gas-phase host-guest binding energies for a single $H_2$ or $D_2$ molecule at the centre of an isolated 6ET-RCC3 cage molecule.

| Electronic structure method | Dispersion correction | $E_{binding}$ (kJ mol$^{-1}$) |
|---|---|---|
| DFTB3 | UFF | −13.95 |
| DFTB3 | D3 | −48.58 |
| BLYP | D3 | −14.93 |
| PBE | D3 | −17.85 |

2.12 Minimum-Energy Pathways for $H_2$ Diffusing Through Cage Windows

We performed climbing-image nudged elastic band (CI-NEB) calculations to determine the minimum-energy pathway (MEP) for a single $H_2$ molecule migrating through each of the four windows of the 6ET-RCC3 cage molecule. The same DFTB3-UFF setup as described above was used for all CI-NEB calculations.

2.13 Path Integral Molecular Dynamics Simulations and Free Energy Calculations

System. As discussed above, direct simulation of the periodic cage crystal structures with PIMD is intractable because of the large system sizes (for example, the cocrystal structure comprises more than 1,500 atoms in the unit cell). Since molecular cage crystals are assembled by packing of discrete cage molecules, many porosity-related properties of the crystal structure closely follow those of the constituent molecular subunits; for example, the pore-limiting diameter in the CC3 crystal structure is governed by the sizes of cage windows. This allows us to study isolated cage molecules to understand the properties of the cage crystals, which has been shown previously to capture the essential features of the diffusion process of interest (66).

Statistical Mechanics. To account for quantum Boltzmann statistics of the nuclear degrees of freedom, we used imaginary time path integral molecular dynamics (PIMD) (67). This technique is based on an isomorphism between the quantum statistical mechanics of a system and the classical statistical mechanics of a so-called ring polymer made of multiple replicas of the system (68). This method rigorously accounts for the statistics of zero-point fluctuations and quantum tunneling but does not include effects arising from the indistinguishability of identical atoms. This approximation could become problematic for the atoms in the $H_2$ or $D_2$ molecule at low temperatures (69). However, including the effects of exchange within PIMD simulations leads to a pathological sign problem (70) and posterior corrections to account for it are non-trivial. We therefore performed all the simulations assuming distinguishable atoms, keeping in mind that the approximation may not be an accurate one.

Relative population of $D_2$ over $H_2$ inside the 6ET-RCC3 cage. The relative population of $D_2$ over $H_2$ inside the cage at a specific temperature is a measure of the relative preference of $D_2$ over $H_2$, which may be compared with the experimental $D_2/H_2$ selectivity. To calculate relative population, we consider a reversible substitution of a molecule of $H_2$ inside the cage with a molecule of $D_2$ in the gas phase:

$$H2(cage)+D2(gas) \rightleftharpoons H2(gas)+D2(cage)$$

The equilibrium constant ($\alpha$) of this substitution gives the relative abundance of $D_2$ over $H_2$ inside the cage over the gas phase at the temperature T and can be expressed as (71):

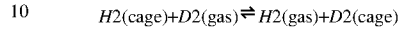

where A denotes the Helmholtz free energy of the system and $k_B$ is the Boltzmann constant. The free energy difference is calculated by performing a thermodynamic integration over the masses (72), evaluating:

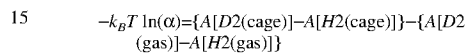

where $m_{D_2}$ and $m_{H_2}$ are the atomic masses of the $D_2$ and $H_2$ molecules, respective; T(m; cage/gas) is the expectation value of the quantum kinetic energy of the guest molecule with the atomic mass m in the cage or gas phase. The integral was discretized with three points, selected using the quadrature of Ceriotti and Markland (73). PIMD simulations were used to calculate the quantum kinetic energies of $H_2$ and $D_2$ inside the cage molecule and in the gas phase. The simulations were performed using i-PI (74) in the NT ensemble at temperatures T=30 K, 40 K, 50 K, 77 K and 100 K. Quantum fluctuations were enforced using the PIGLET thermostat (75), with the following parameters:

| T(K) | Number of replicas | GLE parameters | Centroid thermostat |
|---|---|---|---|
| 30 | 32 | Ns = 8, hw/kT = 500, PIGLET | OPT(H), Ns = 8 wmax/wmin = 10$^4$ |
| 40 | 32 | Ns = 8, hw/kT = 200, PIGLET | OPT(H), Ns = 8 wmax/wmin = 10$^4$ |
| 50 | 32 | Ns = 8, hw/kT = 200, PIGLET | OPT(H), Ns = 8 wmax/wmin = 10$^4$ |
| 77 | 24 | Ns = 8, hw/kT = 100, PIGLET | OPT(H), Ns = 8 wmax/wmin = 10$^4$ |
| 100 | 16 | Ns = 8, hw/kT = 100, PIGLET | OPT(H), Ns = 8 wmax/wmin = 10$^4$ |

These parameters were retrieved from the online repository, http://gle4md.org/. The DFTB+ code (76) was used to perform force evaluations. The equations of motion were integrated using a BAOAB scheme (77) using a time step of 0.5 fs. The simulations were run for 20 ps and the quantum kinetic energy was sampled at each step. The error in the relative population was calculated by propagation of the error from the quantum kinetic energy, which was calculated as the standard error of the time series obtained from the PIMD simulations (FIG. 5 H).

Free energy profiles for $H_2$ and $D_2$ diffusing through cage windows. Free energy profiles were calculated using a combination of PIMD and umbrella sampling (78). The cage window of 6ET-RCC3 with the lowest energy barrier, as estimated by the CI-NEB calculations, was investigated. The order parameter is defined as:

$$s=(r_{guest}-r_{cage})\cdot(r_{window}-r_{cage})/|(r_{window}-r_{cage})|^2$$

where $r_{guest}$, $r_{cage}$, and $r_{window}$ are the position vectors of the guest molecule, the center of the cage and the center of the window, respectively, s=0, s=1 and s>1 correspond to the guest molecule located at the center of the cage, in the transition state with the guest molecule at the center of the window and outside the cage, respectively. The cage is roughly an irregular octahedron with four windows that are diagonally opposite to phenyl rings. The center of the window of interest is defined as the centroid of the three carbon atoms. The center of the cage molecule is defined as the centroid of the six carbon atoms.

A total of 50 harmonic restraints uniformly centered between s=0.0 and s=4.5 were used. Harmonic force constants were set to K=150 kJ mol$^{-1}$ and K=500 kJ mol$^{-1}$ for the first 40 and the remaining 10 restraints, respectively. To prevent the guest molecule from flying away from the cage molecule, a wall was applied at $$s' = \sqrt{|(r_{guest} - r_{cage})|^2 - [(r_{guest} - r_{cage}) \cdot (r_{window} - r_{cage})/|(r_{window-r_{cage}})|]^2}$$
$$= 0.20$$

The PIMD simulations were performed at 50 K using i-PI; PLUMED (79) was used to apply the bias on the centroid of the ring polymer Hamiltonian. The computational setting was kept the same as in the previous sections. For each restraint, a simulation was run for 10 ps. A weighted histogram analysis method, as implemented by Grossfield (80), was used to harness unbiased free energy curves. This process was repeated four times using different starting configurations, as well as different random number seeds, to obtain an averaged free energy profile with error bars (FIG. 5 I).

Additional Techniques Applicable in the Context of the Invention

Whilst not necessarily specifically implemented in the Experiments discussed below, the following techniques may be implemented to further exploit the invention and/or provide further embodiments.

Gas Chromatographic Quantification and Separation of Diatomic Hydrogen Isotopes

M. Ravichandran, P. R. Ramya, S. Sankar Ganesh, K. Ramesh Naidu and M. M. Rajput, "Optimization of Indigenously Developed Column for the Separation and Analysis of All the Six Hydrogen Isotopic Combinations in Elemental form using Gas Chromatograph", BARC NEWSLETTER, JANUARY-FEBRUARY 2016, pages 23-26, ISSN 0976-2108, describes gas chromatographic apparatus and methods for separating, and thus quantifying, homo-diatomic and hetero-diatomic isotopes of hydrogen, such as $H_2$, HD, HT, $D_2$, DT and $T_2$, from mixtures thereof (typically mixed with a helium carrier gas) based on their differential affinities for a treated γ-Alumina stationary phase and differences in their thermal conductivities. This is envisaged to be particularly useful when deploying the technologies of the present invention to separate outputs of nuclear fusion.

Pressure Swing Absorption

Pressure Swing Absorption (PSA) is well known in the art and works on the basis that under high pressure gases tend to become adsorbed onto solid surfaces yet desorb therefrom at reduced pressures. Whilst PSA processes may seek to enrich a gas mixture in a "target" gas by selectively removing a "non-target" gas(es) therefrom, the reverse is also perfectly viable, a particularly applicable to the present invention—e.g. selectively extracting and purify a "target" gas by selectively sorbing it. Utilising two adsorption apparatuses facilitates a substantially-continuous process that either enriches a mixture in a particular gas or selectively extracts a target gas. In fact, where the "target" gas is the sorbed species, this target gas can, following desorption (upon depressurisation), be used to partially pressurize the second apparatus. Moreover, the desorbed target gas (which may need further purification to remove a non-target gas) may inputted (or reinputted) in the same process (via the same apparatus or via further similar downstream apparatus, whether inline or separate). K. Kotoh and M. Tanaka and Y. Nakamura and T. Sakamoto and Y. Asakura and T. Uda and T. Sugiyama, "Experimental Verification of Hydrogen Isotope Separation by Pressure Swing Adsorption", Fusion Science and Technology, Vol. 54, No. 2, 2008, Pages 411-414, https://doi.org/10.13182/FST08-A1842, describes pressure swing absorption techniques applicable to the invention.

Different Types of Porous Organic Cages Applicable to Invention

Hasell, T., Cooper, A. Porous organic cages: soluble, modular and molecular pores. Nat Rev Mater 1, 16053 (2016). https://doi.org/10.1038/natrevmats.2016.53, is a review article that not only defines the term "porous organic cage", as distinguished from other porous compounds (e.g. MOFs, zeolites), but also illustrates the scope of this term by exploring a non-exhaustive range of different types of porous organic cages. Whilst the experiments elaborated below focus on a particular subtype of porous organic cage compounds, a person skilled in the art will readily appreciate that the principles of the invention are more broadly applicable.

Synthesis of Relevant Compounds

CC3 (Cage 3) was prepared as previously reported in its homochiral form, CC3-R (see Jones, J. T.; Hasell, T.; Wu, X.; Bacsa, J.; Jelfs, K. E.; Schmidtmann, M.; Chong, S. Y.; Adams, D. J.; Trewin, A.; Schiffman, F.; Cora, F.; Slater, B.; Steiner, A.; Day, G. M.; Cooper, A. I. Nature 2011, 474, 367). 1AT-RCC3, and 6FT-RCC3 were prepared according to previously reported procedures in their homochiral form, using chirally pure (1S,2S)-(+)-1,2-diaminocyclohexane (31).

Synthesis of RCC3

The imine cage CC3-R (926 mg, 0.83 mmol) was dissolved in a CHCl$_3$/methanol mixture (1:1 v/v, 50 mL) by stirring. When this solution became clear, sodium borohydride (1.00 g, 26.5 mol) was added and the reaction was stirred for a further 12 hours at room temperature. Water (2 mL) was then added, and the reaction stirred for a further 12 hours. The solvent was then removed under vacuum. The resulting white solid was extracted with chloroform (2×50 mL) and then the combined organic phase was washed by water (2×100 mL). The CHCl$_3$ phase was dried using anhydrous MgSO$_4$ before being removed under vacuum. Amine cage 1 (crude yield=900 mg, 95.1%) was obtained as a white solid. $^1$H NMR (CDCl$_3$, 400 MHz) δ 7.12 (s, 12H, —ArH), 3.81 (d, 12H, —ArCH$_2$), 3.59 (d, 12H, —ArCH$_2$), 2.18 (m, 12H, CH on cyclohexane), 0.95-1.98 (m, 48H, CH$_2$ on cyclohexane) ppm; $^{13}$C NMR (CDCl$_3$, 100 MHz): δ 141.2, 124.9, 61.2, 50.7, 32.0, 25.0 ppm. IR (KBr pellet, ν) 2922 (s), 2850 (s), 1603 (w), 1446 (s), 1354 (w), 1338 (w), 1153 (m), 1113 (s), 856 (s), 789 (m), 750 (m), 714 (m), 525 (w) cm$^{-1}$. MS (ES+) 1141.9 ([M+H]$^+$).

Crystal data for RCC3.14.68 (H$_2$O). Formula C$_{72}$H$_{137.3}$N$_{12}$O$_{14.68}$; M=1406.21 g·mol$^{-1}$; cubic space group F4$_1$32, colourless crystal; a=25.71(1) Å; V=16999(13) Å$^3$; ρ=1.092 g·cm$^{-3}$; μ=0.077 mm$^{-3}$; F (000)=6034; crystal size=0.25×0.20×0.15 mm$^3$; T=100(2) K; 33 042 reflections measured (2.63<Θ<25.010), 1274 unique ($R_{int}$=0.0466), 1070 (I>2σ(1)); $R_1$=0.0759 for observed and $R_1$=0.0863 for all reflections; w$R_2$=0.2324 for all reflections; max/min residual electron density=0.493 and −0.275 e·Å$^{-3}$; data/restraints/parameters=1274/0/100; GOF=1.054.

RCC3·14.68 (H$_2$O) crystallised from a MeOH/H$_2$O solution. The structure was solved and refined in the chiral cubic space groups F4$_1$32 with the asymmetric unit comprised of 1/12 of a RCC3 fragment. Residual electron density was extremely diffuse and tentatively assigned as H$_2$O solvent, the occupancies for which were determined using $F_{VAR}$ during refinement. The H$_2$O solvent molecules were refined without riding proton atoms however these were included in the refined formula unit.

To obtain a large quantity of crystalline RCC3 for subsequent analysis, a solution of RCC3 dissolved in CHCl$_3$ was allowed to slowly evaporate over two days. Powder X-ray diffraction (PXRD) confirmed that this solvate material was the same phase as the single-crystal structure. Different desolvation methods for activation of the RCC3 solvate were investigated, including high/low temperature vacuum, N$_2$ flow, solvent exchange, and supercritical CO$_2$ drying. However, none of these activation conditions maintained the crystallinity of RCC3 upon desolvation, and we instead isolated an amorphous solid in all cases that showed no Bragg reflections in the PXRD pattern.

Synthesis of AT-RCC3

The reduced amine cage RCC3 (50 mg, 0.044 mmol) was dissolved in 3 mL acetone in a 10 mL vial. The vial was sealed and left to stand. Single crystals of AT-RCC3 gradually appeared on the walls and the bottom of the vial after about 30 min. The crystals were collected after 12 h by filtration and washed by acetone (2×100 mL). Yield: 39 mg, 75.4%. (Note: The filtrate can be left to stand for >12 h to collect a further crop of crystals, thus improving this 75% yield.) $^1$H NMR (CDCl$_3$, 400 MHz) δ 7.35-6.83 (m, 12H, —ArH), 4.00-3.04 (m, 12H, —ArCH$_2$), 2.49-0.7 (m, 12H, —ArCH$_2$), 2.18 (in, 60H, CH & CH$_2$ on cyclohexane), 0.95-1.98 (m, 48H, CH$_2$ on cyclohexane) ppm; $^{13}$C NMR (CDCl$_3$, 100 MHz): δ 141.2, 127.7, 125.0, 61.4, 51.8, 50.8, 50.0, 31.8, 30.9, 25.0, 23.9 ppm. IR (KBr pellet, ν) 2927 (s), 2855 (m), 1605 (m), 1449 (m), 1374 (w), 1355 (w), 1337 (w), 1293 (w), 1206 (w), 1158 (w), 1110 (w), 1074 (w), 1001 (w), 862 (w), 789 (w), 736 (w) cm$^{-1}$. MS (ES+) 1181.9 ([M+H]$^+$).

Crystal data for AT-RCC3.7.5 (H$_2$O). Formula C$_{75}$H$_{127}$N$_{12}$O$_{7.5}$; M=1301.77 g·mol$^{-1}$; cubic space group F4$_1$32, colourless crystal; a=25.469(1) Å; V=16520(2) Å$^3$; ρ=1.047 g·cm$^{-3}$; μ=0.068 mm$^{-3}$; F (000)=5648; crystal size=0.18×0.18×0.12 mm$^3$; T=100(2) K; 29 022 reflections measured (1.38<Θ<23.24°), 993 unique ($R_{int}$=0.0508), 955 (I>2σ(f)); $R_1$=0.0848 for observed and $R_1$=0.0868 for all reflections; w$R_2$=0.2534 for all reflections; max/min residual electron density=0.485 and −0.250 e·Å$^{-3}$; data/restraints/parameters=993/17/92; GOF=1.166.

Crystal data for AT-RCC3.4.5 (H$_2$O). Formula C$_{75}$H$_{121}$N$_{12}$O$_{4.5}$; M=1262.84 g·mol$^{-1}$; cubic space group F4$_1$32, colourless crystal; a=25.612(5) Å; V=16801(6) Å$^3$; ρ=0.998 g cm$^{-3}$; μ=0.063 mm$^{-3}$; F (000)=5528; crystal size=0.18×0.18×0.12 mm$^3$; T=300(2) K; 26 066 reflections measured (1.38<Θ<20.88°), 759 unique ($R_{int}$=0.0767), 708 (I>2σ(I); $R_1$=0.0828 for observed and $R_1$=0.0928 for all reflections; w$R_2$=0.2501 for all reflections; max/min residual electron density=0.346 and −0.377 e·Å$^{-3}$; data/restraints/parameters=759/14/95; GOF=1.125.

Crystal data for AT-RCC3. Formula C$_{72}$H$_{112}$N$_{12}$; M=1181.76 g·mol$^{-1}$; cubic space group F4$_1$32, colourless crystal; a=25.456(6) Å; V=16495(7) Å$^3$; ρ=0.952 g·cm$^{-3}$; μ=0.057 mm$^{-3}$; F (000)=5168; crystal size=0.18×0.18×0.12 mm$^3$; T=350(2) K; 25 340 reflections measured (2.26<Θ<20.82°), 730 unique ($R_{int}$=0.0940), 570 (I>2σ(I); $R_1$=0.1097 for observed and $R_1$=0.1260 for all reflections; w$R_2$=0.3059 for all reflections; max/min residual electron density=0.412 and −0.171 e·Å$^{-3}$; data/restraints/parameters=730/14/81; GOF=1.287.

Synthesis of FT-RCC3

Paraformaldehyde (52 mg, 20 eq.) dissolved in CH$_3$OH (10 mL) was stirred at 70° C. To this clear solution was added RCC3 (100 mg) dissolved in CH$_3$OH (10 mL). A white precipitate appeared upon addition of RCC3. The reaction was stirred for a further 2 h at 70° C. The reaction was cooled to room temperature and the precipitate was collected by filtration. FT-RCC3 (52 mg, 70%) was obtained after being washed with CH$_3$OH (3×10 mL) and dried under vacuum. $^1$H NMR (CDCl$_3$, 400 MHz) δ 7.11 (s, 12H, —ArH), 3.99 (d, 12H, —ArCH$_2$), 3.23 (s, 12H, —NCH$_2$N—), 3.19 (d, 12H, —ArCH$_2$), 2.27 (d, 12H, CH on cyclohexane), 1.96 (d, 12H, CH$_2$ on cyclohexane), 1.80 (d, 12H, CH$_2$ on cyclohexane), 1.28 (m, 24H, CH$_2$ on cyclohexane) ppm; $^{13}$C NMR (CDCl$_3$, 100 MHz): δ 140.1, 123.6, 77.2, 68.8, 57.3, 29.4, 24.4 ppm. IR (KBr pellet, ν) 2925 (s), 2858 (m), 2803 (w), 1605 (m), 1436 (s), 1348 (w), 1336 (s), 1313 (w), 1292 (m), 1215 (s), 1187 (s), 1122 (m), 1094 (w), 1066 (w), 1039 (w), 1006 (m), 952 (w), 908 (m), 858 (m), 835 (s), 751 (s), 684 (m), 666 (w), 584 (m), 541 (w), 453 (m) cm$^{-1}$. MS (ES+) 1213.9 ([M+H]$^+$). Accurate mass calculated for C$_{78}$H$_{109}$N$_{12}$: 1213.8898. Found: 1213.8894.

Crystal data for FT-RCC3.4(MeOH).2(CHCl$_3$). Formula C$_{84}$H$_{126}$Cl$_6$N$_{12}$O$_4$; M=1580.67 g·mol$^{-1}$; cubic space group F4$_1$32, colourless crystal; a=25.370(3) Å; V=16329(3) Å$^3$; ρ=1.286 g cm$^3$; μ=0.268 mm$^{-3}$; F (000)=6784; crystal size=0.06×0.06×0.05 mm$^3$; T=30(2) K; 11 627 reflections measured (2.66<Θ<26.35°), 1382 unique ($R_{int}$=0.0740), 1040 (I>2σ(I); $R_1$=0.1455 for observed and $R_1$=0.1720 for all reflections; w$R_2$=0.4196 for all reflections; max/min residual electron density=0.819 and −0.465 e·Å$^{-3}$; data/restraints/parameters=1382/0/85; GOF=1.769.

Single crystals of FT-RCC3 crystallized from a CHCl$_3$/MeOH solution in the chiral cubic space group F4$_1$32. The crystals were small and weakly diffracting. Suitable quality X-ray diffraction data was obtained using a synchrotron radiation source at beamline I19, Diamond Light Source, UK. A collection temperature of 30 K was used to greatly improve data quality. One CHCl$_3$ molecule, disordered over two positions was found in the interstitial cavity between two cage windows. Additional electron density was modelled as MeOH solvent. No restraints were used during refinement. The exact occupancy of the CHCl$_3$ and MeOH solvent should be regarded as tentatively assigned due to close contacts. At higher collection temperature (>275 K) single crystals of FT-RCC3 were weakly diffracting.

Synthesis of 1AT-5FT-RCC3

1AT-RCC3 (200 mg, 0.17 mmol) solid was ground into fine powder and transferred into a 12 mL open glass vial. The open cage-containing vial was then placed into a larger 50 mL glass vessel that contained solid paraformaldehyde (200 mg). The glass vessel was sealed, and then heated at 60° C. in oil bath to generate a gaseous formaldehyde atmosphere. [CAUTION: formaldehyde is a class I human carcinogen and it should only be handled in contained environment by trained personnel with suitable personal protective equipment]. The reaction was left sealed at 60° C. for 12 hours, before the reaction was cooled to room temperature. The solid in the vial was retrieved and dried under dynamic vacuum at 40° C. to remove the surface adsorbed formaldehyde. 1AT-5FT-RCC3 (crude yield=205 mg, 97.5%) was obtained as a crystalline white solid. $^1$H NMR (CDCl$_3$, 400 MHz) δ 7.20-6.95 (m, 12H, —ArH), 4.14-3.86 (m, 12H, —ArCH$_2$), 3.45-3.00 (m, 12H, —ArCH$_2$ and 10H, —NCH$_2$N—), 2.20-2.40 (m, 12H, CH on cyclohexane), 2.15-1.75 (m, 24H, CH$_2$ on cyclohexane), 1.40-1.00 (m, 24H, CH$_2$ on cyclohexane), 0.85-0.40 (m, 6H, CH$_3$) ppm; $^{13}$C NMR (CDCl$_3$, 100 MHz): δ 140.1, 123.6, 78.4, 68.8, 57.8, 57.3, 30.9, 29.4, 24.4 ppm. IR (KBr pellet, v) 2925 (s), 2857 (s), 2795 (w), 1669 (w), 1605 (m), 1446 (s), 1349 (w), 1335 (s), 1313 (w), 1291 (m), 1216 (w), 1185 (m), 1121 (m), 1065 (w), 1039 (w), 1005 (m), 953 (w), 907 (m), 859 (m), 834 (m), 736 (w), 685 (m), cm$^{-1}$. MS (ES+) 1241.9 ([M+H]$^+$). Accurate mass calculated for [C$_{80}$H$_{113}$N$_{12}$]$^+$: 1241.921. Found: 1241.849.

Synthesis of 5FT-RCC3

1AT-5FT-RCC3 (100 mg, 0.081 mmol) was dissolved in a 20 mL mixture of CHCl$_3$:MeOH (1:1, v:v). One drop of water was added and the mixture was stirred vigorously at room temperature for 12 hours. 5FT-RCC3 (91 mg, 94.0%), was isolated as a white solid after removing the solvent under reduced pressure followed by drying under dynamic vacuum at 60° C. $^1$H NMR (CDCl$_3$, 400 MHz) δ 7.55-6.75 (m, 12H, —ArH), 4.16-2.95 (m, 24H, —ArCH$_2$ and 10H, —NCH$_2$N—), 2.50-0.85 (m, 12H, CH on cyclohexane and 48H, CH$_2$ on cyclohexane). $^{13}$C NMR (CDCl$_3$, 100 MHz): δ 140.1, 123.6, 78.4, 68.8, 57.3, 29.4, 24.4 ppm. IR (KBr pellet, v) 2923 (s), 2854 (m), 1668 (w), 1605 (w), 1447 (m), 1349 (w), 1336 (m), 1313 (w), 1292 (w), 1215 (w), 1184 (m), 1121(w), 1066 (w), 1039 (w), 1006 (m), 950 (w), 908 (m), 858 (w), 835 (m), 749 (s), 684 (w), 666 (w) cm$^{-1}$. MS (ES+) 1201.8 ([M+H]$^+$). Accurate mass calculated for [C$_{77}$H$_{109}$N$_{12}$]$^+$: 1201.813. Found: 1201.890.

Synthesis of 1ET-5FT-RCC3

Ethanal (acetaldehyde 15.7 mg, 0.36 mmol) was dissolved in 10 mL CHCl$_3$/MeOH (50:50, v:v) mixture and stirred at 0° C. 5FT-RCC3 (128 mg, 0.11 mmol) in 20 mL CHCl$_3$/MeOH (50:50, v:v) was added to the above solution at 0° C. A white precipitate gradually appeared after this reaction mixture was stirred at room temperature, 1ET-5FT-RCC3 (126 mg, 96.3%) was isolated as a white solid after the removal of the reaction solvents under vacuum. $^1$H NMR (CDCl$_3$, 400 MHz) δ 7.50-6.99 (m, 12H, —ArH), 4.05-3.95 (m, 12H, —ArCH$_2$), 3.54-3.16 (m, 12H, —ArCH$_2$; 10 H, —NCH$_2$N— and 1H, —N$_2$CHCH$_3$—), 2.10-2.40 (m, 12H, CH on cyclohexane), 2.15-1.75 (m, 24H, CH$_2$ on cyclohexane), 1.40-1.10 (m, 24H, CH$_2$ on cyclohexane), 0.86 (m, 3H, CH$_3$) ppm; $^{13}$C NMR (CDCl$_3$, 100 MHz): δ 140.0, 123.6, 78.2, 68.7, 57.3, 30.9, 29.4, 24.4 ppm. IR (KBr pellet, v) 2925 (s), 2857 (s), 2798 (w), 1606 (m), 1436 (s), 1349 (w), 1336 (s), 1313 (w), 1293 (m), 1218 (w), 1190 (m), 1122 (m), 1094 (w), 1066 (w), 1039 (w), 1006 (m), 953 (w), 908 (m), 859 (m), 836 (m), 753 (w), 685 (m) cm$^{-1}$. MS (ES+) 1227.9 ([M+H]$^+$). Accurate mass calculated for [C$_{79}$H$_{111}$N$_{12}$]$^+$: 1227.905. Found: 1227.837.

Synthesis of 1PT-5FT-RCC3

Propionaldehyde (5.0 mg, 0.09 mmol) was dissolved in 5 mL CHCl$_3$/MeOH (50:50, v:v) mixture and stirred at 0° C. 5FT-RCC3 (50.0 mg, 0.04 mmol) in 10 mL CHCl$_3$/MeOH (50:50, v:v) was added to the above solution at 0° C. A white precipitate gradually appeared after the mixture was stirred at room temperature. 1PT-5FT-RCC3 (49 mg, 94.8%), a white solid, was recovered after removal of solvents and being dried under vacuum. $^1$H NMR (CDCl$_3$, 400 MHz) δ 7.50-6.98 (m, 12H, —ArH), 4.25-3.75 (m, 12H, —ArCH$_2$), 3.49-3.15 (m, 12H, —ArCH$_2$; 10H, —NCH$_2$N— and 1H, —N$_2$CHCH$_2$CH$_3$—), 2.50-1.50 (m, 12H, CH on cyclohexane; m, 24H, CH$_2$ on cyclohexane), 1.40-1.01 (m, 24H, CH$_2$ on cyclohexane), 0.88 (m, 5H, CH$_2$CH$_3$) ppm; $^{13}$C NMR (CDCl$_3$, 100 MHz): δ 140.0, 123.6, 78.2, 68.7, 57.3, 30.9, 29.4, 24.4 ppm. MS (ES+) 1241.9 ([M+H]$^+$). Accurate mass calculated for [C$_{80}$H$_{113}$N$_{12}$]$^+$: 1241.921. Found: 1241.850.

Synthesis of 6ET-RCC3

Acetaldehyde (200 mg, 4.55 mmol) was dissolved in MeOH (10 mL) and this solution was stirred at 0° C. RCC3 (500 mg, 0.438 mmol) in MeOH (20 mL) was added into the above solution. A white precipitate appeared upon addition of RCC3. The reaction was stirred for a further 2 h at room temperature. The precipitate was collected by filtration. 6ET-RCC3 (472 mg, 83.0%) was obtained after washing the precipitate with MeOH (3×10 mL) and drying the product under vacuum. $^1$H NMR (CDCl$_3$, 400 MHz) δ 7.50-6.74 (m, 12H, —ArH), 4.23-3.05 (m, 6H, —NCHCH$_3$N and m, 24H, —NCH$_2$Ar—), 2.75-2.15 (m, 12H, CH$_2$ on cyclohexane), 2.10-1.75 (m, 24H, CH$_2$ on cyclohexane), 1.47-1.12 (m, 24H, CH$_2$ on cyclohexane), 0.50-0.15 (m, 18H, CH$_3$) ppm; $^{13}$C NMR (CDCl$_3$, 100 MHz): δ 140.4, 128.2, 126.6, 125.7, 123.1, 79.7, 69.4, 65.7, 52.4, 29.5, 29.4, 24.7, 20.5, 18.0 ppm. MS (ES+) 1296.9759 ([M+H]$^+$). Accurate mass calculated for [C$_{84}$H$_{121}$N$_{12}$]$^+$: 1297.9837. Found: 1297.9727.

Context of Experiments

Deuterium (D) is used as a neutron moderator, as a nonradioactive isotopic tracer, and in neutron scattering experiments. These applications need high-purity deuterium, which is expensive because of its low natural abundance (0.0156 mol %). Typically, D$_2$ is produced by electrolysis of heavy water and extracted using the Girdler-sulfide process (2) or by cryogenic distillation at 24 K (3). Both processes are costly and energy intensive because of the multiple enrichment steps required (4).

An attractive alternative to purify D$_2$ from H$_2$/D$_2$ gas mixtures is to adsorb D$_2$ selectively on a microporous bed (5). Kinetic quantum sieving (KQS) using nanoporous solids was first proposed by Beenakker et al. (6). The KQS effect becomes pronounced when the difference in size between a hydrogen molecule and the confining space is comparable to the thermal de Broglie wavelength of molecular hydrogen, $\lambda_T = h/(2\pi m k_B T)^{1/2}$. Quantum sieving has been exploited for the separation of gaseous isotope mixtures like D$_2$/H$_2$ (7), but it is challenging to identify suitable porous solids. This is because KQS requires ultrafine pore apertures (around 3 Å) (8, 9), and this typically leads to materials with low pore volumes and, hence, low D$_2$ adsorption capacities, making such processes difficult to scale. An analogous selectivity-capacity trade-off—or, for membranes, a selectivity-permeance trade-off—is observed for a wide range of other gas separations that do not involve KQS (10-13).

Various porous materials have been studied for hydrogen isotope separation including carbons (14, 15), carbon nanotubes (16), zeolites (17, 18), metal-organic-frameworks (MOFs) (7, 19-20), covalent organic frameworks (COFs) (21), and 2D crystals (22). MOFs and COFs have received much attention because of their crystalline nature and synthetically tuneable pore size and functionality (23). However, even with MOFs or COFs, it is challenging to tune pore sizes at the exceptionally fine level required for KQS. For example, in MOFs, a common strategy for tuning the pore apertures is through systematic expansion or reduction of the number of the phenylene rings in the organic linker, with a discrete increment-decrement of ~2.8 Å (24); that is, much coarser than the size control needed for KQS.

Porous organic cages (POCs) (25, 26) are discrete molecules that have been used previously for the separation of xylene isomers (27), noble gases (28), and chiral molecules (28). POCs might also be promising candidates for $H_2/D_2$ separation but, unlike MOFs and COFs, it is difficult to tune the pore size in POCs simply by changing the constituent linkers. Because POCs are discrete molecules, small changes in their molecular structure can have profound effects on the solid-state packing of the cages and hence the pore structure (25). Modifying only the interior of the cage molecule, rather than the cage structure itself, could avoid altering the crystal packing. Internal functionalization is possible. For example, Mastalerz et al. described the post-synthetic modification of the interior of organic cages using a sixfold Williamson etherification (29), but this interior modification affected the cage shape, which in turn altered the crystal packing mode.

Experiments, Results, and Discussion

The experiments discussed below, performed in the aforesaid context, utilise the aforementioned materials, analytical protocols, computational methods, and synthesised compounds.

Figures 1, 3A:
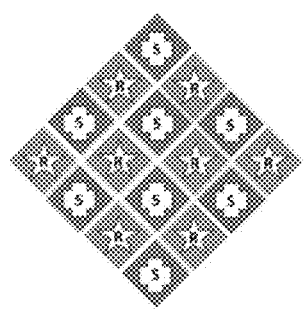

Systematically Tuning the Pore Size of Organic Cages by Postsynthetic Modification We synthesized a series of internally post-functionalized porous organic cages that crystallized in an isostructural way. Specifically, we used a protection-deprotection strategy to produce cages where five out of the six internal reaction sites in the cage cavity were functionalized using a formaldehyde "tying" method we reported (31) (FIGS. 1, A and B). After deprotection, the single unreacted diamine group can be reacted with a range of aldehyde or ketone precursors to achieve ultrafine control over the cage cavity size and, hence, the pore envelope (FIG. 1C). This method allowed us to tune the size and shape of the cage pore systematically at the atomic level without affecting the external cage shape and size, or its crystal packing. Using this strategy, we tuned the pore size for the series of POCs in the range 3.5 to 1.95 Å, which is a useful cut-off range for the separation of gas pairs such as $H_2/N_2$, $H_2/CO$, $CH_4/N_2$, and Xe/Kr (8).

Previously, we reported that an organic cage with six diamine groups, RCC3, reacts with six formaldehyde molecules to form 6FT-RCC3 through the formation of cyclic aminal rings (31). Here, RCC3 was reacted with six equivalents of acetaldehyde to form a new cage, 6ET-RCC3 (reaction a, FIG. 1B), where bulkier ethylidene bridges replaced the six methylene bridges in 6FT-RCC3. By contrast, RCC3 reacted with just a single acetone molecule to form 1AT-RCC3 (31) reaction b, FIG. 1B); steric hindrance prevented further reaction in the cage cavity.

Figure 1B:
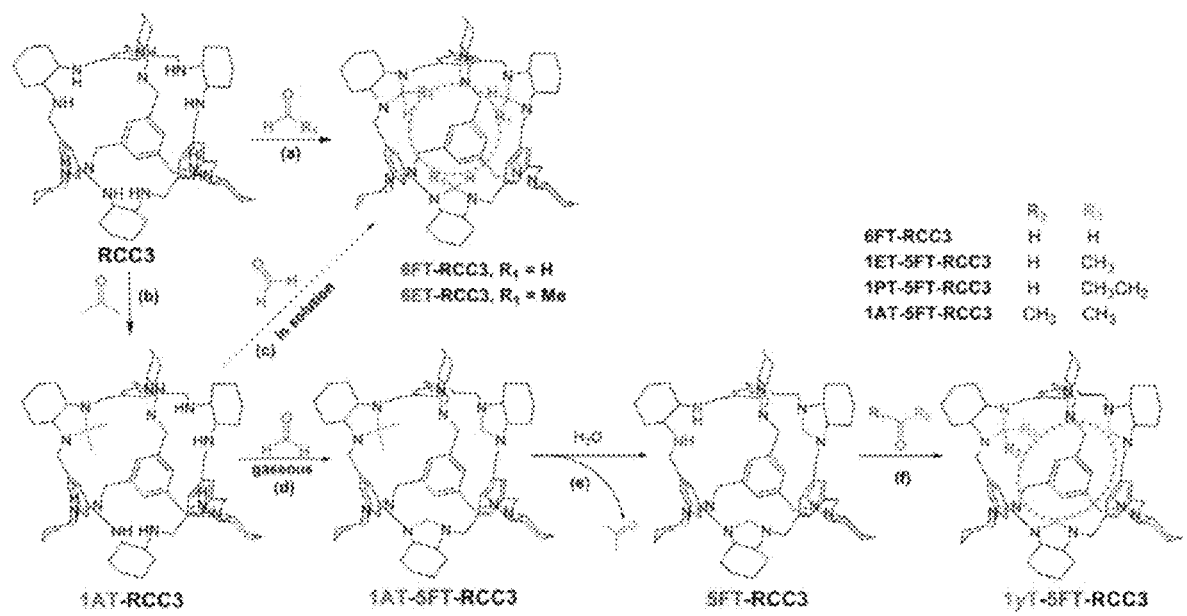
Figure 1C:
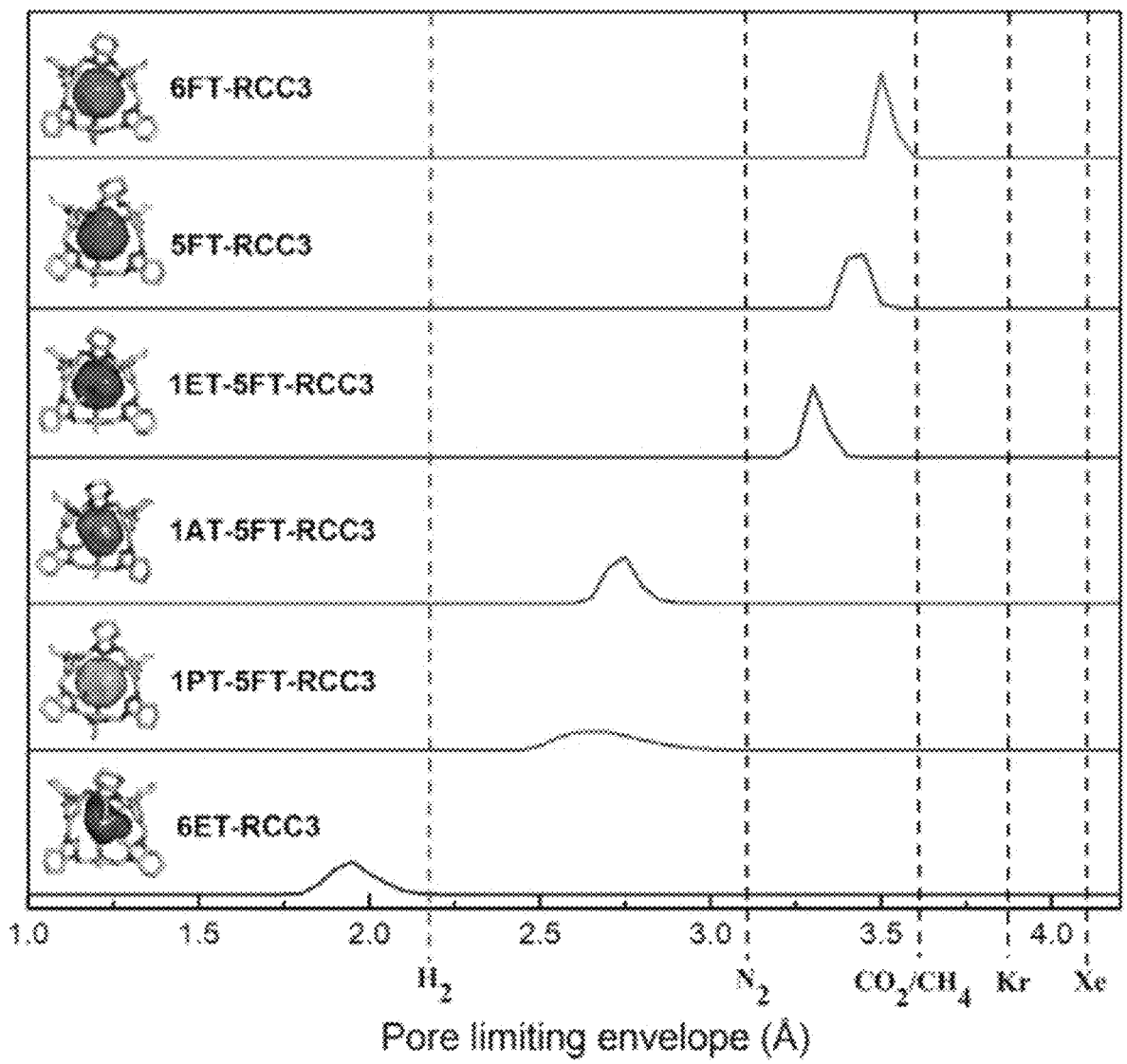

Based on this result, we developed a protection-deprotection strategy where we reacted the five unfunctionalized diamine groups in 1AT-RCC3 with gaseous formaldehyde in the solid state, through a single-crystal-to-single-crystal reaction, to form a new dual 'tied' cage molecule, 1AT-5FT-RCC3 (reaction d, FIG. 1B). Solid-state synthesis was essential here, in that when 1AT-RCC3 was mixed with formaldehyde in solution ($CHCl_3$ or MeOH), the single acetone 'protecting group' was displaced to afford 6FT-RCC3 (reaction c in FIG. 1B). By exploiting the different chemical labilities of imidazolidine rings in 1AT-5FT-RCC3, we could selectively hydrolyze the single propyl 'tie' by stirring in $CHCl_3$:MeOH (1:1, v/v), thus synthesizing a new deprotected cage, 5FT-RCC3 (reaction e in FIG. 1B). After deprotection, we reacted the now vacant diamine group in 5FT-RCC3 with acetaldehyde and propionaldehyde to synthesize two new cages, 1ET-5FT-RCC3 and 1PT-5FT-RCC3 (reaction f; FIG. 1B). All reactions proceeded with nearly 100% conversion with no additional purification steps.

The parent cage for this study, RCC3, is derived from the shape-persistent imine precursor, CC3, which crystallized from most organic solvents to form a microporous solid with a diamondoid pore network (25, 27, 28). For guests to diffuse through this pore network, they must pass through the intrinsic cage cavities that act as the tetrahedral nodes (26). Hence, internal functionalization of the cages cavities provided a route to systematically fine tune pore size without altering the underlying shape and crystallization habit of the cage molecule (33). All cages were isostructural with CC3, as determined by powder x-ray diffraction (PXRD) and by single-crystal x-ray diffraction. The high crystallographic symmetry of the structures (cubic $F4_132$) did not allow us to determine if the different 'tied' groups were ordered in the microporous pore structures, but all cages had the same diamondoid pore structure.

To allow for the effect of molecular flexibility on the diffusivity of small gas molecules through these structures, we used molecular dynamics (MD) simulations to calculate a time-averaged pore-limiting envelope (PLE) (28), rather than measuring a single, static pore diameter. These calculations showed that postsynthetic modification allowed the PLE to range from 1.95 Å (6ET-RCC3) to 3.50 Å (6FT-RCC3), resulting in a tunability window of 1.55 Å (FIG. 1C). For context, this tunability window equates to the van der Waals (vdW) radius of a single nitrogen atom across the whole series of isostructural cages.

Figure 1D:
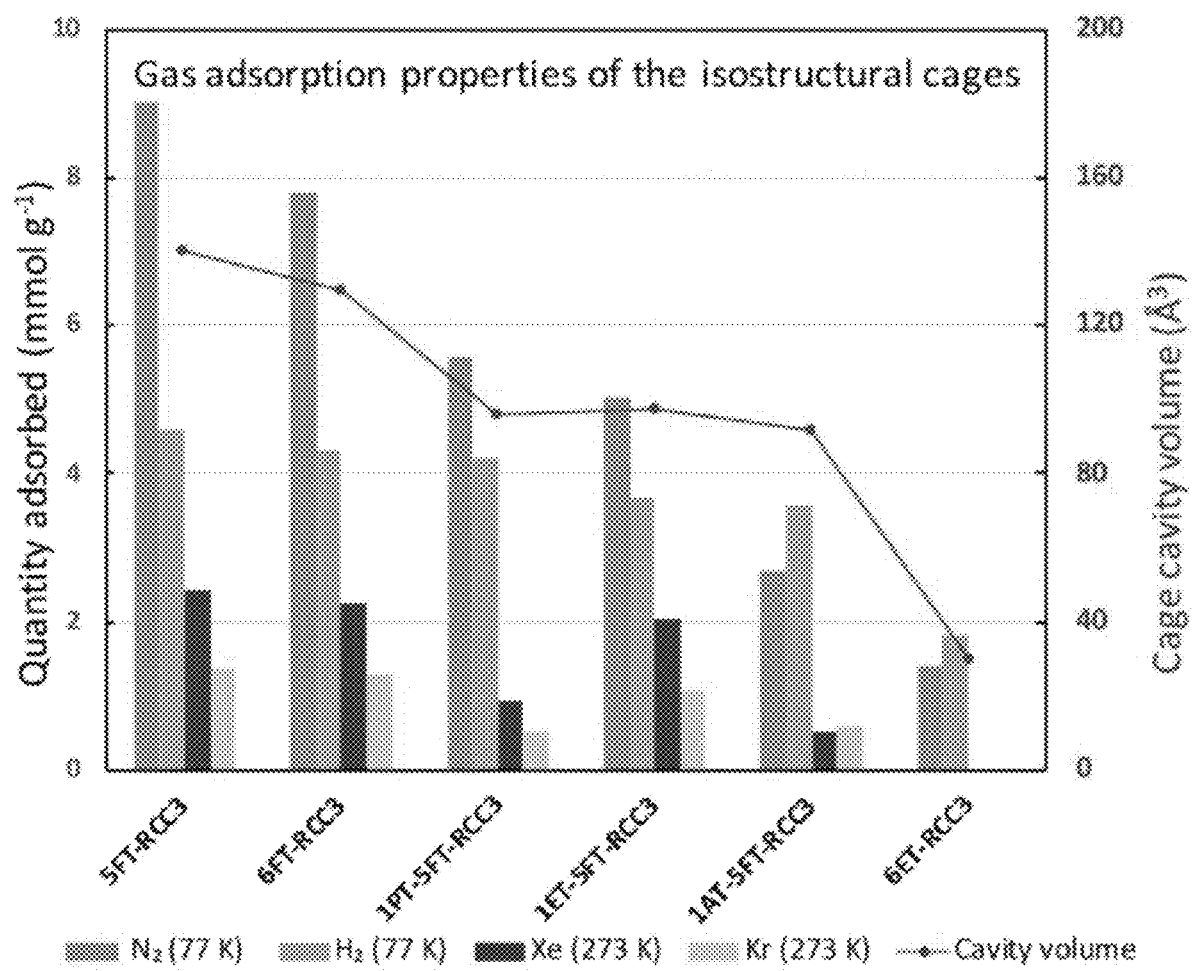

We studied the gas adsorption properties of these cages for four different gases (FIG. 1D). As expected, there is a positive correlation between the cage cavity volume and the overall gas uptake, especially under conditions where gases are close to saturation (e.g., $N_2$ at 77 K; orange bars in FIG. 1D). For example, 5FT-RCC3, with the largest cage cavity in this series, showed the highest uptakes for all four of the gases studied. By contrast, 1AT-5FT-RCC3 showed much lower gas uptakes, and 6ET-RCC3 size-excluded krypton (Kr) and xenon (Xe) altogether.

This synthetic strategy was also used to tune gas selectivity for hard-to-separate gas pairs, such as Xe and Kr (34, 35). Xenon is heavier and more polarizable than Kr, and it tends to form stronger vdW interactions with most sorbents unless the pores are specifically attuned for Kr adsorption. Preferential Kr adsorption is very rare. For example, just one MOF, FMOFCu, adsorbs Kr selectively over Xe at temperatures below 0° C. (35).

Most of these organic cages also exhibit higher uptakes for Xe than for Kr, but 1AT-5FT-RCC3 exhibited reverse uptake for these two gases. The estimated ideal Kr/Xe molar selectivity could be switched at temperature below 0° C. We ascribe this effect to 1AT-5FT-RCC3 having a cavity ideally suited to accommodate Kr but too small for Xe. Inserting one additional methyl group to form 6ET-RCC3 rendered the cavity too small to allow adsorption of either gas.

Hydrogen Isotope Separation Using an Ultrafine Aperture Cage

Efficient KQS requires porous solids where the difference between aperture size and gas diameter is comparable to the de Broglie wavelength. The kinetic diameter of hydrogen is 2.89 Å and previous studies suggest that the optimum aperture size to achieve KQS with rigid frameworks lies below 3.40 Å (21). It is quite difficult to obtain porous materials with pore apertures in this range, and so far, only one material with pore size <3.00 Å has been reported to separate $D_2$ and $H_2$ (7).

Figure 2A:
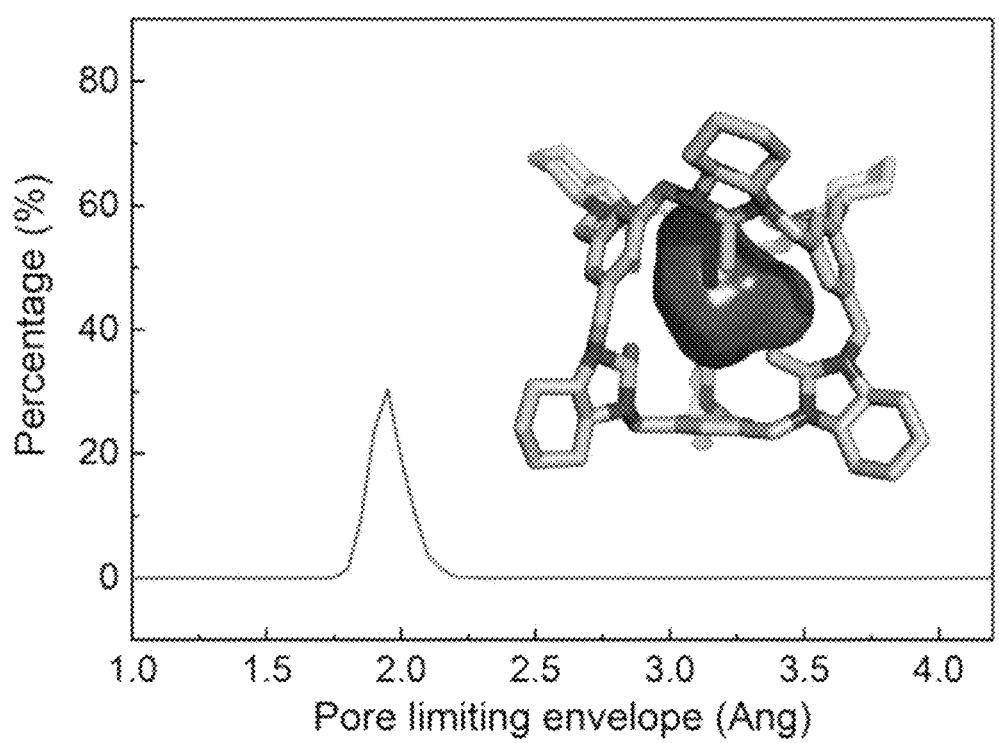
FIGS. 2A-D show kinetic quantum sieving using ultra-small-pore organic cages.
Figure 2B:
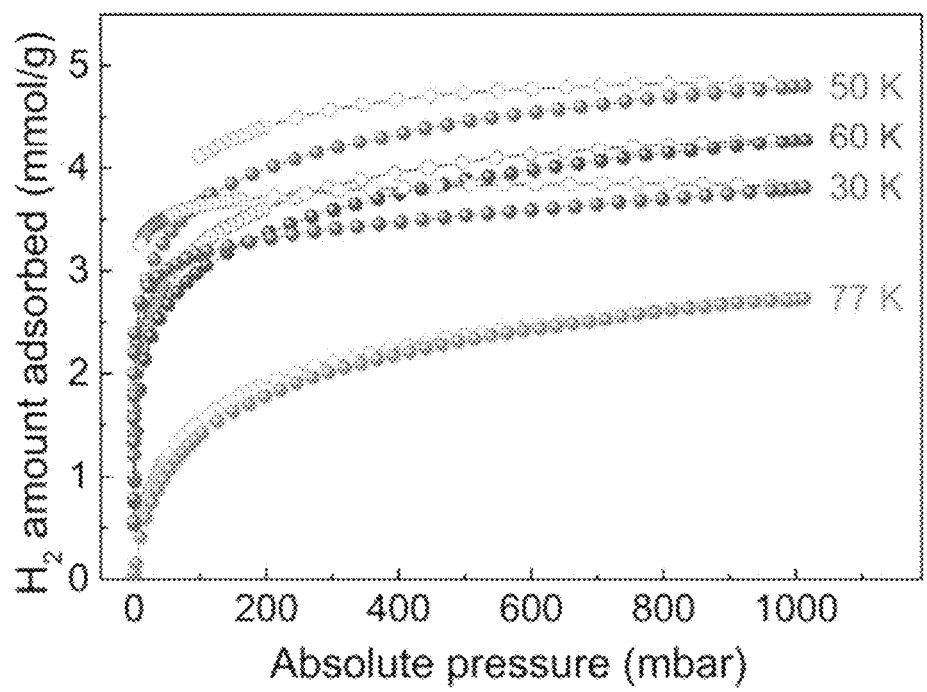

Molecular dynamic simulations suggested that 6ET-RCC3 has a pore-limiting envelope (PLE) centered at 1.95 Å (FIG. 2A) but with a relatively broad time-averaged size distribution, with a value near the minimum molecular dimension of $H_2$ (2.2 Å; FIG. 1C) (28). Hydrogen adsorption isotherms obtained from 6ET-RCC3 exhibited hysteresis between 30 and 60 K (FIG. 2B). The $H_2$ uptake reached a maximum at 50 K (4.8 mmol/g at 1 bar). We observed the same phenomena for $D_2$ adsorption. The hysteresis was largest at 30 K and decreased with increasing temperature, suggesting greater equilibration.

We also compared the $H_2$ adsorption behavior for two other organic cages, CC3 (25) and 6FT-RCC3, with calculated pore envelopes of around 4.5 Å and 3.4 Å, respectively. Both CC3 and 6FT-RCC3 exhibited reversible type I adsorption isotherms, typical of nanoporous materials without kinetic diffusion barriers. The two cages showed an increased $H_2$ uptake with decreasing temperature, with maximum uptakes at 30 K of 8.0 and 8.2 mmol/g at 1 bar. Unlike 6ET-RCC3, no hysteresis was observed for CC3 or 6FT-RCC3. This difference suggests that the methyl groups in the 6ET-RCC3 cavities were responsible for its temperature-dependent flexibility, as this is the only structural difference between 6FT-RCC3 and 6ET-RCC3.

Figure 2C:
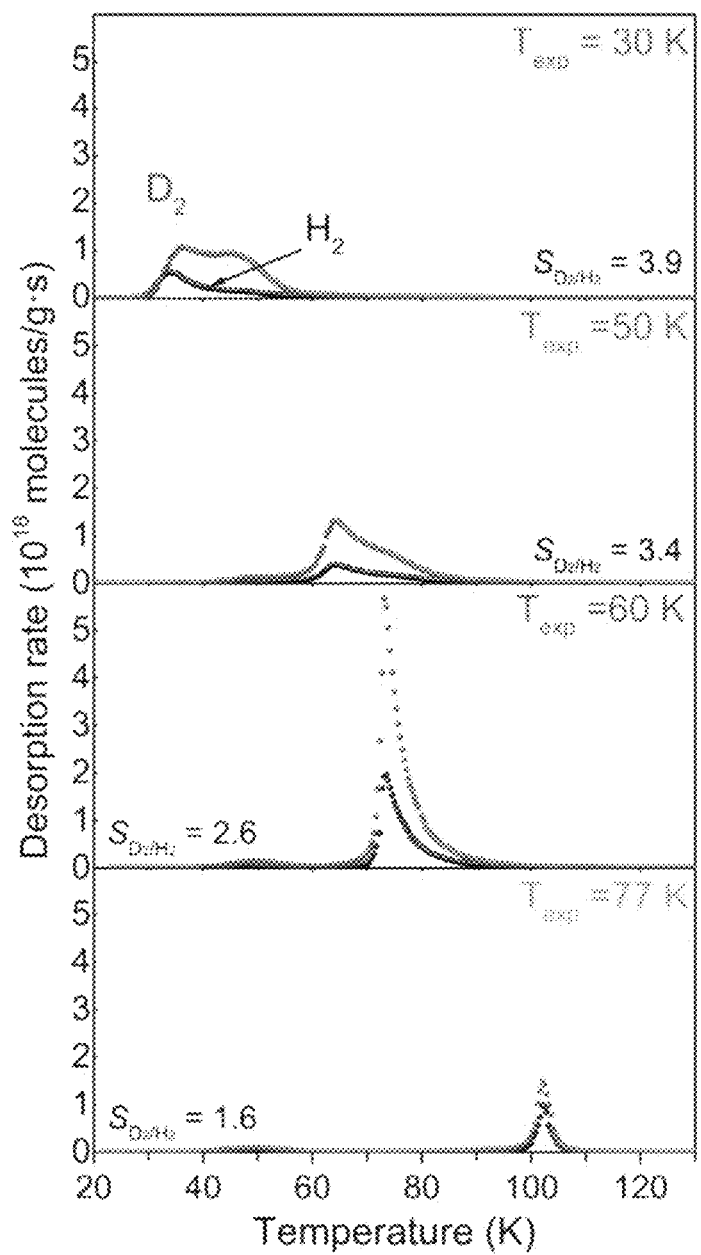

Cryogenic thermal desorption spectroscopy (TDS) measurements verified the hydrogen isotope separation performance of 6ET-RCC3. $H_2$ and $D_2$ desorption rates of 6ET-RCC3 (FIG. 2C) were collected during heating in vacuum with a rate of 0.1 K/s, after prior exposure to 1:1 $H_2/D_2$ mixture (10 mbar) at various exposure temperatures ($T_{exp}$) between 30 and 77 K for 10 min exposure time ($t_{exp}$). The area under the desorption peak is proportional to the amount of the desorbing gas, hence the selectivity for $D_2$ over $H_2$ could be obtained from the ratio of the peak areas (7).

TDS measurements showed that the uptake in 6ET-RCC3 increased with increasing temperature until a maximum for $H_2$ and $D_2$ was reached at $T_{exp}$ of 60 K before decreasing again at 77 K. The selectivity, $S_{D2/H2}$, decreased with increasing $T_{exp}$ and exhibited a maximum of 3.9 at 30 K, which is a fairly good separation performance compared with previous reports of kinetic quantum sieving (7, 36). The onset temperature of gas desorption is nearly identical to the exposure temperature, since after exposure the chamber is evacuated at $T_{exp}$ prior to cooling to 20 K. No desorption peak was observed above 60 K for $T_{exp}$=30 K, implying no deep penetration into the structure at this temperature. For higher $T_{exp}$, the desorption spectra were unusually shifted to higher temperatures, which we attributed to an increased penetration depth of gas molecules deeper into the cage structure. In agreement with observations from pure gas isotherms, the properties of 6ET-RCC3 can be attributed to the temperature-dependent opening of the pore aperture, similar behavior as observed in MFU-4 reported previously (7), which exhibited different effective aperture size at different $T_{exp}$. This flexibility enhanced the accessibility of the pores to isotope molecules at higher exposure temperatures.

Figure 2D:
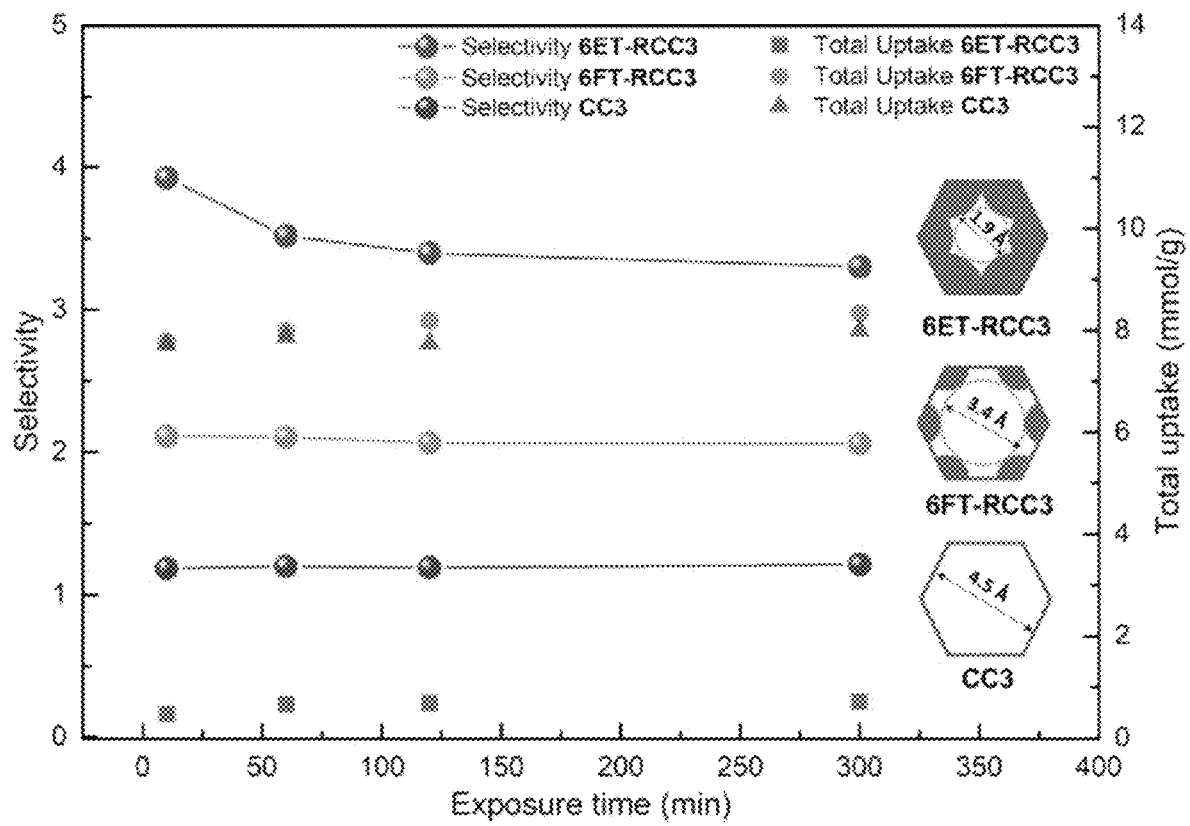

FIG. 2D shows $S_{D2/H2}$ and the total quantity of gas adsorbed for 6ET-RCC3, 6FT-RCC3, and CC3 as a function of $t_{exp}$ at $T_{exp}$=30 K. 6ET-RCC3 showed an increase in uptake for longer tap, revealing that diffusion was hindered. At 30 K, $S_{D2/H2}$ decreased with longer $t_{exp}$, from 3.9 to 3.3 in the range between 10 and 300 min of exposure, which is a typical KQS response. The KQS effect is based on the diffusion limitation of the lighter isotope; equilibrium is approached for both isotopes for longer exposure times. The total uptake for 6ET-RCC3 at 30 K was only 0.8 mmol/g at $t_{exp}$ of 300 min, which is related to the hysteresis observed in the isotherm experiment at 30 K. The total gas uptake obtained at 30 K for CC3 and 6FT-RCC3 was much higher (8.0 mmol/g), which is consistent with the adsorption results. For the larger-pore materials, CC3 and 6FT-RCC3, $S_{D2/H2}$ was lower and remained constant at 1.2 and 2.1, respectively, for different $t_{exp}$, in keeping with rapid, barrier-free diffusion of $H_2$ and $D_2$.

Enhanced Quantum Sieving Performance in a Two-Component Cage Cocrystal

These single-component cage crystals either exhibited good selectivity but poor gas capacity (6ET-RCC3) or good gas capacity but poor selectivity (CC3 and 6FT-RCC3). For the optimal separation of isotopes, the ideal KQS material should combine large cavities to store more $D_2$ along with a narrow pore aperture to increase the kinetic separation. Taking advantage of the chiral recognition assembly of discrete cage molecules (37), we designed a cocrystal structure that combined two different cages: 6ET-RCC3 was chosen as the diffusion barrier, blocking $H_2$ diffusion and providing the KQS effect, and CC3 was chosen as the partner cage to provide enough pore space for high gas adsorption (FIG. 3A).

Figures 2, 3A:
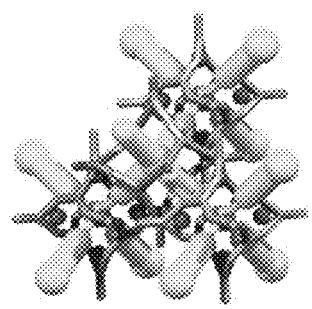
Figures 3, 3A:
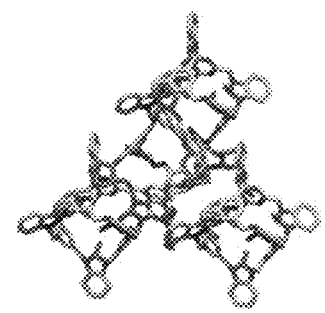

The structure of the cocrystal, Cocryst1 (6ET-RCC3-R/CC3-S, 1:1), is shown in FIG. 3A-3 (right). Because the cage cavities formed the nodes of the diamondoid pore network, four selective 6ET-RCC3 cages surrounded each CC3 storage. Gas molecules diffusing through the cocrystal were forced to traverse the small pores in 6ET-RCC3.

Figures 1, 2, 3B:
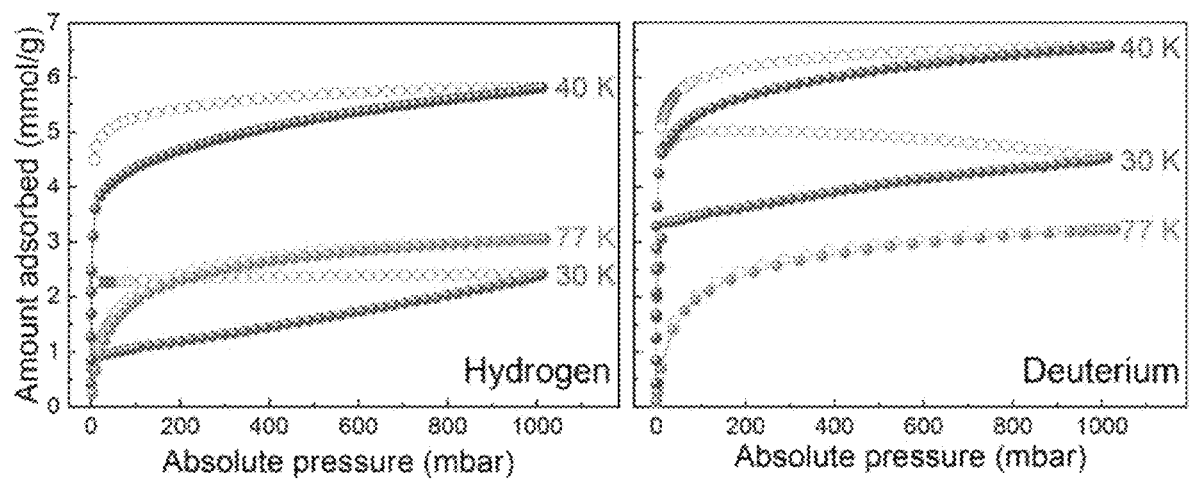

Cocryst1 was studied using $D_2$ and $H_2$ high-resolution adsorption experiments collected between 20 and 77 K (FIGS. 3B-1, 3B-2). The amount of gas absorbed at 1 bar showed a maximum at 40 K for both gases. As for 6ET-RCC3, the hysteresis in Cocryst1 was high at lower temperatures because of the large diffusion barrier, particularly at 30 K; at higher temperatures, a temperature-dependent opening of the aperture allowed both $H_2$ and $D_2$ molecules to diffuse faster.

Figure 3C:
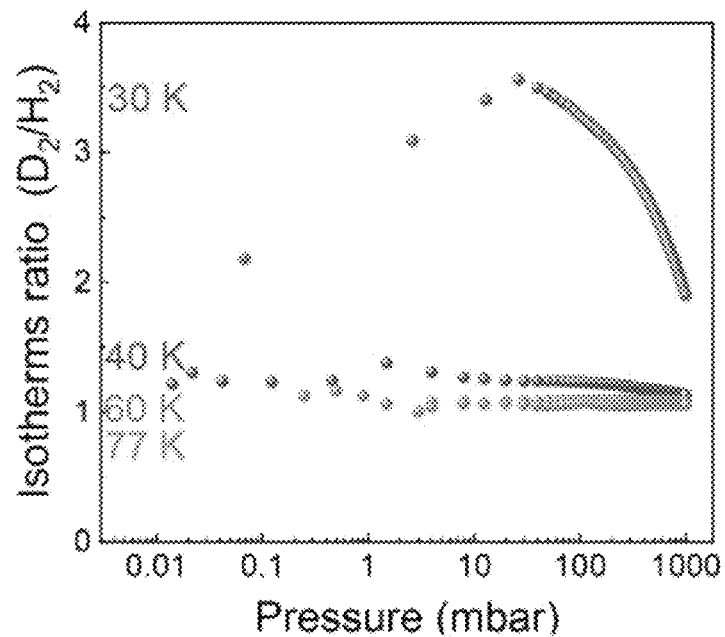
Figures 1, 3D:
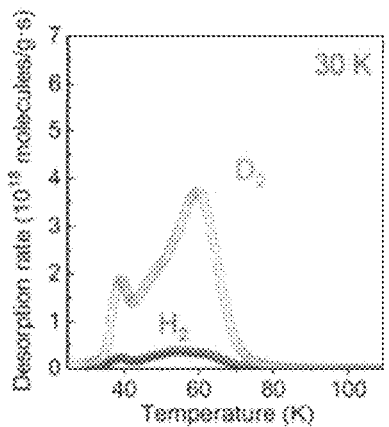
Figures 2, 3D:
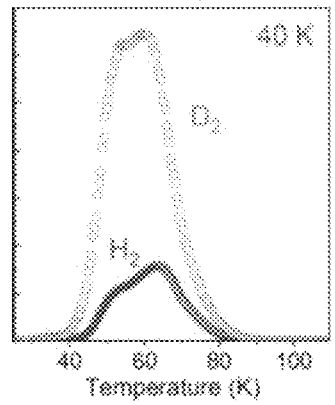
Figures 3, 3D:
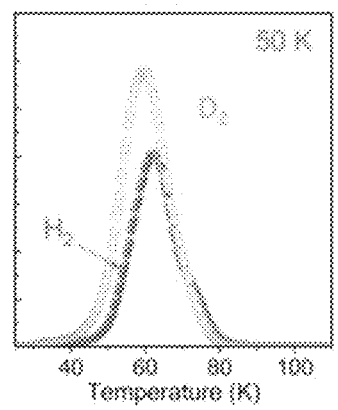

The ratio of $D_2/H_2$ calculated for each point on the isotherms as a function of the pressure is presented in FIG. 3C. Cocryst1 exhibited a maximum $D_2/H_2$ uptake ratio of 3.5 at 30 K and 25 mbar, which is consistent with the lack of equilibrium at 30 K, implying that the cocrystal possessed good separation capabilities. To our knowledge, the $D_2/H_2$ uptake ratio of Cocryst1 is one of the largest values calculated from pure-gas adsorption isotherms (7, 21, 36, 38, 39).

Figure 3E:
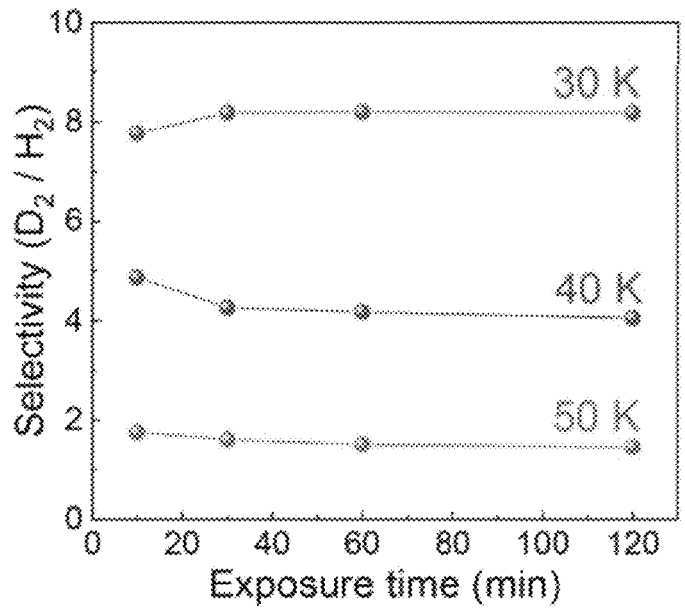
Figures 1, 3F:
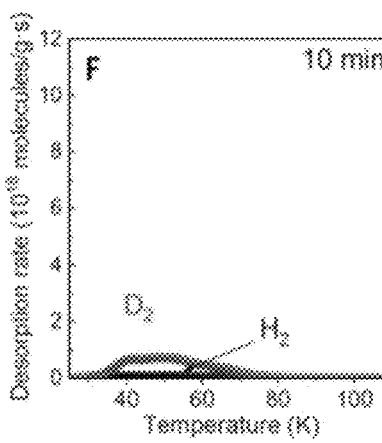
Figures 2, 3F:
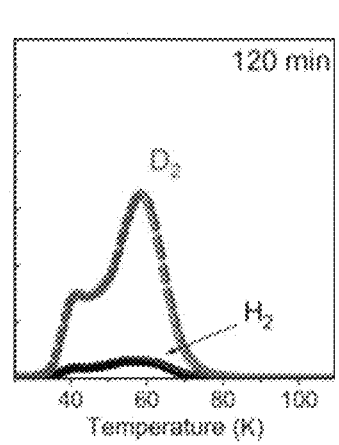
Figures 3, 3F:
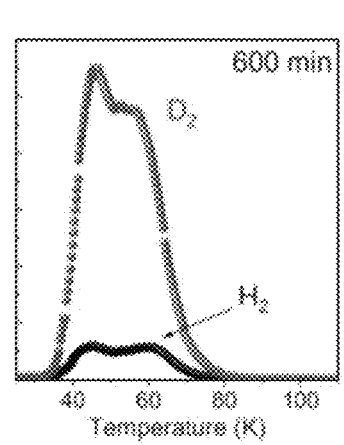
Figure 3G:
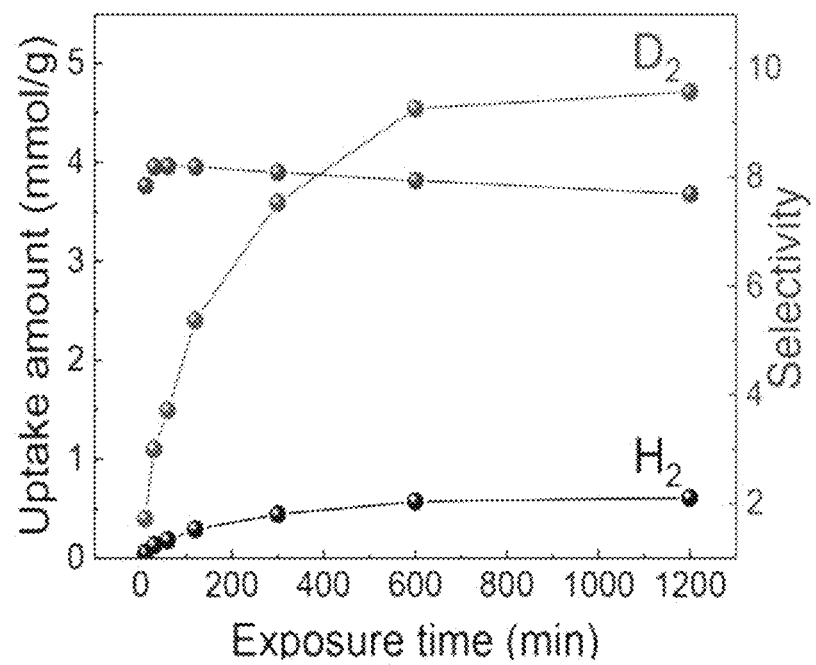

We investigated actual gas separation by TDS. Cocryst1 was exposed to 10 mbar of 1:1 $H_2/D_2$ mixture for 30 min at various exposure temperatures. The resulting TDS spectra for $T_{exp}$ 30, 40, and 50 K are shown in FIGS. 3D-1, 3D-2 and 3D-3, respectively. The uptake after exposure to the gas mixture rose with increasing exposure temperature, until a maximum for the combined gas uptake was reached at 40 K. In contrast to 6ET-RCC3, Cocryst1 shows desorption up to 80 K for $T_{exp}$=30 K, indicating gas penetration of the cages at a lower exposure temperature. The uptake then decreased until no desorption peak is observed at 77 K. $S_{D2/H2}$ reached a maximum of 7.7 at 30 K, and dropped to lower values at 40 and 50 K (FIG. 3E). For a constant exposure temperature of 30 K, thermally-activated flexibility was again observed. As exposure time increased from 10 to 600 min, $S_{D2/H2}$ remained near 8.0 (7.8 to 8.2), but the $D_2$ uptake was enhanced from 0.4 to 4.7 mmol/g (FIGS. 3F-1, F-2, F-3 and G), indicating hindered diffusion. X-ray diffraction data indicate that Cocryst1 remained highly crystalline and did not change its structure during the TDS measurements.

The kinetics of pure $H_2$ and $D_2$ gas uptake were studied by TDS after exposure at 30 K for exposure times varying from 10 to 1200 min. For both gases, Cocryst1 showed a remarkable increase in uptake for longer exposure time. Whereas the $D_2$ uptake was almost identical for exposure times between 600 and 1200 min, the $H_2$ amount still increased at longer exposure times. Because $D_2$ reached saturation faster, it likely had a much different diffusion rate than $H_2$.

Figure 4:
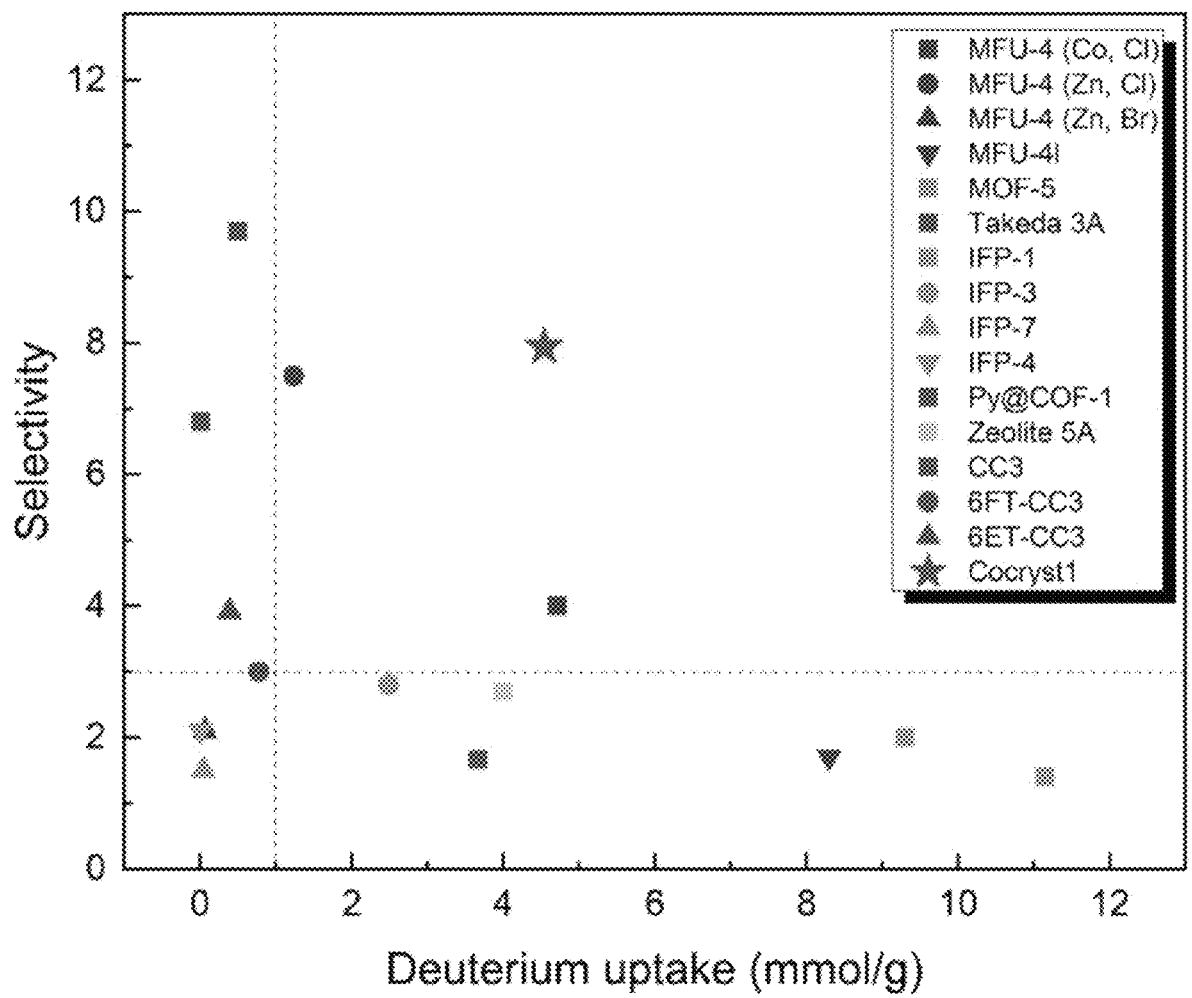
FIG. 4 shows a summary of hydrogen isotope KQS selectivities and adsorption capacities for various porous materials. The list includes carbon (Takeda 3A (40)), MOFs (MFU-4 (18, 40), MOF-5 (40), IFP (41)), COFs (Py@COF-1 (42), zeolite 5A (16), and porous organic cages (CC3, 6FT-CC3, 6ET-CC3, Cocryst1). The practical performance of a KQS adsorbent will be a combination of its selectivity and its capacity; on this basis, the cage cocrystal shows the most promising performance here.

The $H_2/D_2$ separation properties of Cocryst1 were excellent; $S_{D2/H2}$~8.0, combined with a greatly enhanced $D_2$ uptake with respect to 6ET-RCC3 (4.7 mmol/g). The experimental $S_{D2/H2}$ values for various reported porous KQS adsorbents are compared in FIG. 4 and table S2. Of these, only two other porous solids have combined a selectivity greater than 3 with a gas uptake larger than 1.0 mmol/g (dashed lines in FIG. 4). The cage cocrystal displays the best combination of selectivity and $D_2$ uptake reported so far.

Molecular Simulations of the Hydrogen Isotope Separation in Organic Cages

To further probe the separation mechanism, we simulated equilibrium adsorption isotherms for an equimolar mixture of $H_2$ and $D_2$ in CC3, 6ET-RCC3 and Cocryst1 by combining grand-canonical Monte Carlo (GCMC) simulations with the Feynman-Hibbs (FH) effective potential (43). We also used a hybrid GCMC/molecular dynamic scheme, allowing for direct sampling of host motions in adsorption simulations, which was shown before to be important for gas adsorption in porous organic cages (28, 44). The simulated competitive adsorption isotherms (FIG. 5, D to F) are in good agreement with experiment, corroborating both the experimental adsorption data and the TDS results. All three cage crystals were predicted to be selective toward $D_2$ over $H_2$, with increased selectivity as the temperature decreases. Moreover, computation suggests, in agreement with experiment, that Cocryst1 exhibits the high $D_2$ selectivity of 6ET-RCC3 while achieving the higher gas uptake capacities associated with the CC3 partner cage.

Figure 5A:
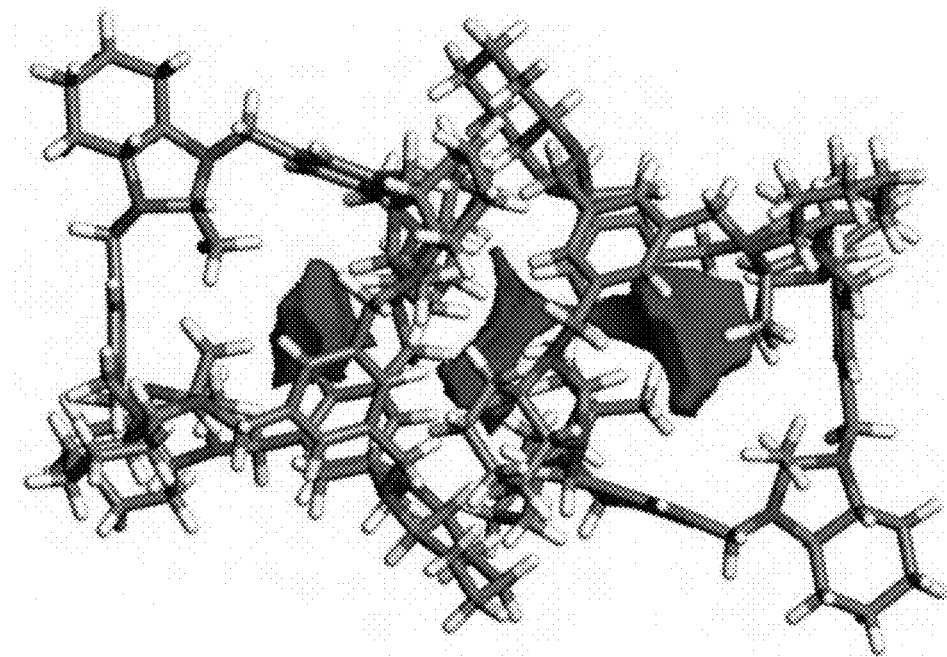
FIGS. 5A-I show simulations and provide insights into the mechanism for hydrogen isotope separation by the porous organic cages. Simulated free energy profiles of a single $H_2$ or $D_2$ molecule diffusing between the centers of mass of two neighboring cage molecules for 6ET-RCC3 (A), Cocryst1 (B), and CC3 (C), are shown in (FIGS. 5A-C) respectively. Free energy profiles were calculated for the diffusion pathways using the respective crystal structures; only the relevant two cage molecules involved are shown here. The diffusion pathway in FIG. 5A runs through a 6ET-RCC3 cage window with two methyl groups (left cage) and a second 6ET-RCC3 cage window with one methyl group (right cage); the diffusion pathway in FIG. 5B runs through a 6ET-RCC3 cage window with one methyl group (left cage) and a neighboring CC3 cage window (right cage). Gray, white and blue atoms represent carbon, hydrogen and nitrogen, respectively; pore spaces inside the cage molecules, defined by a spherical probe with diameter 2.2 Å, are colored in red.
Figure 5B:
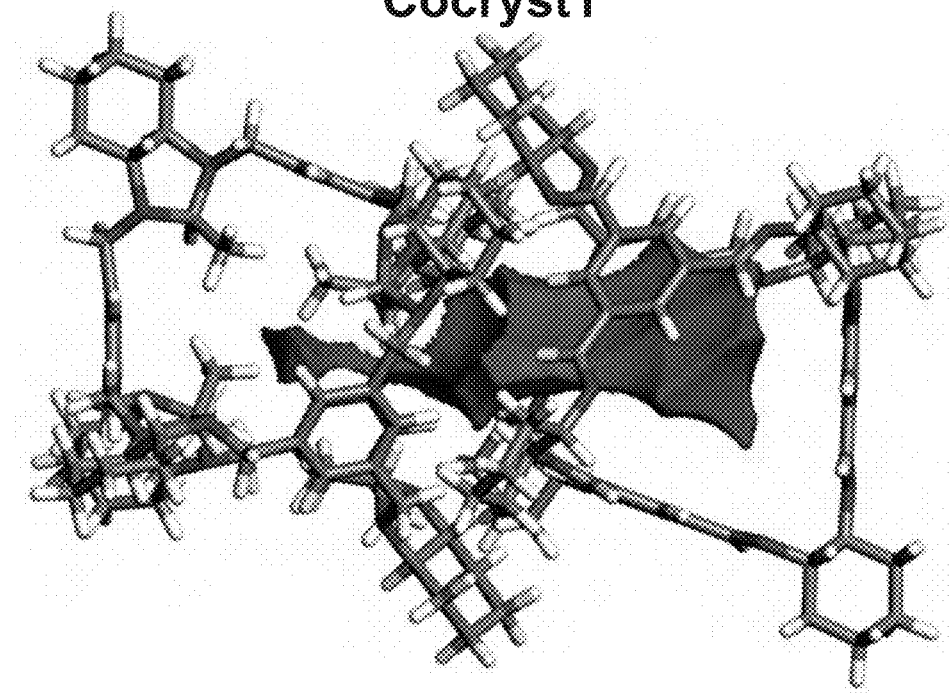
Figure 5C:
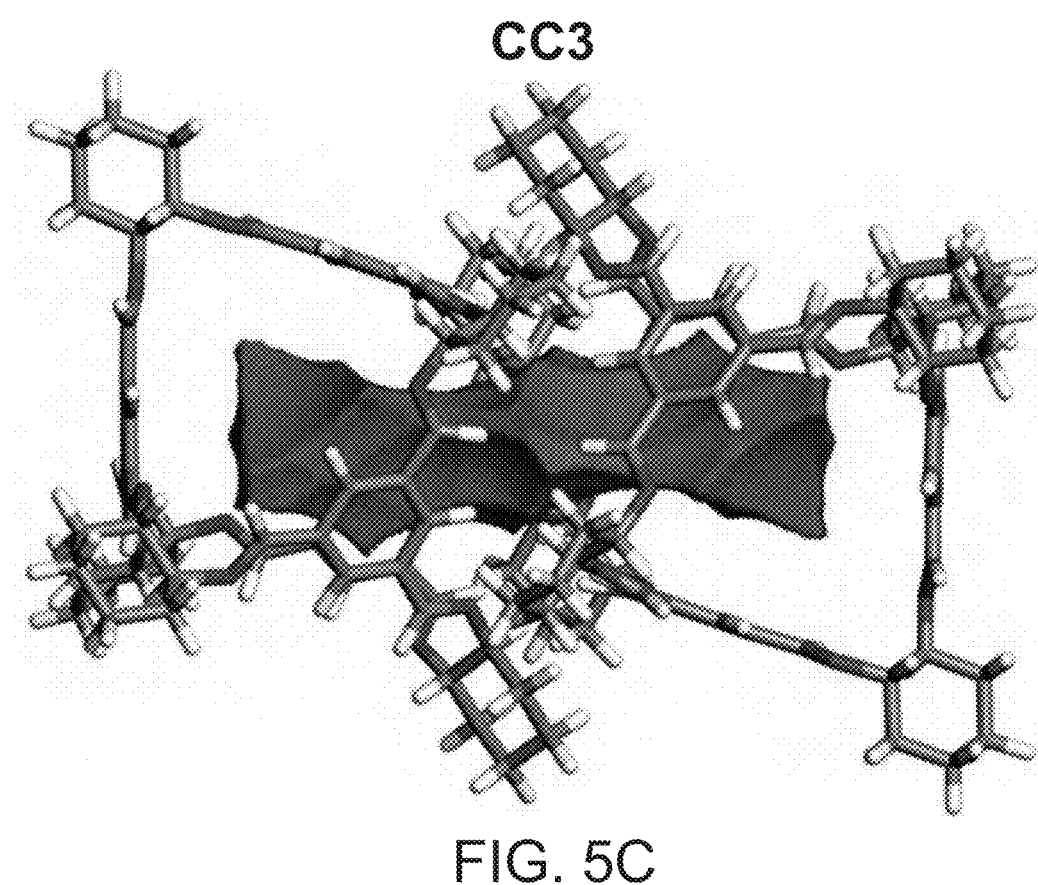
Figure 5D:
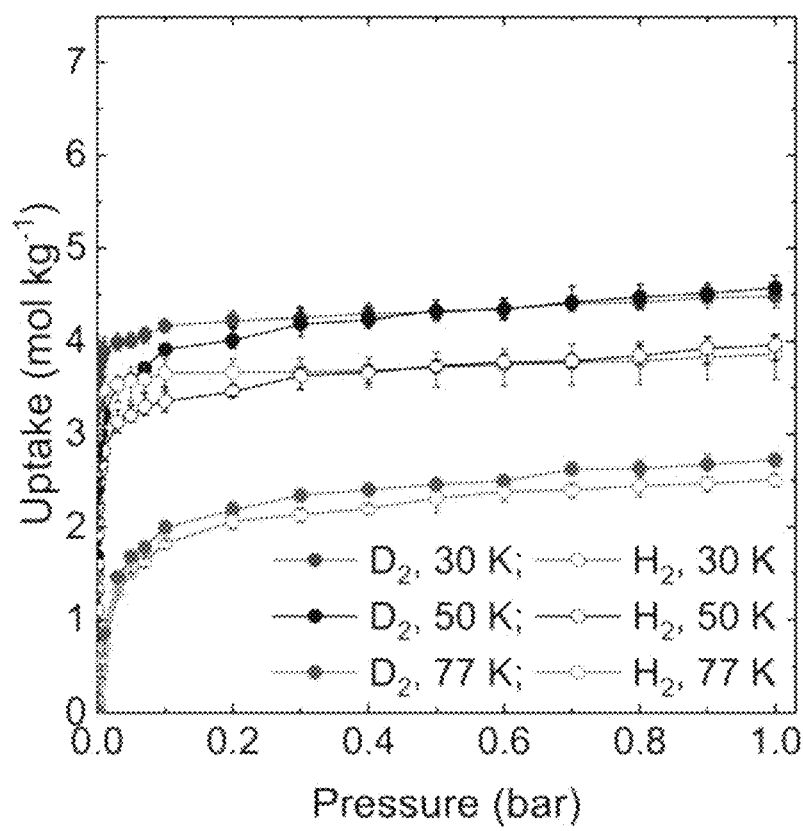
Figure 5E:
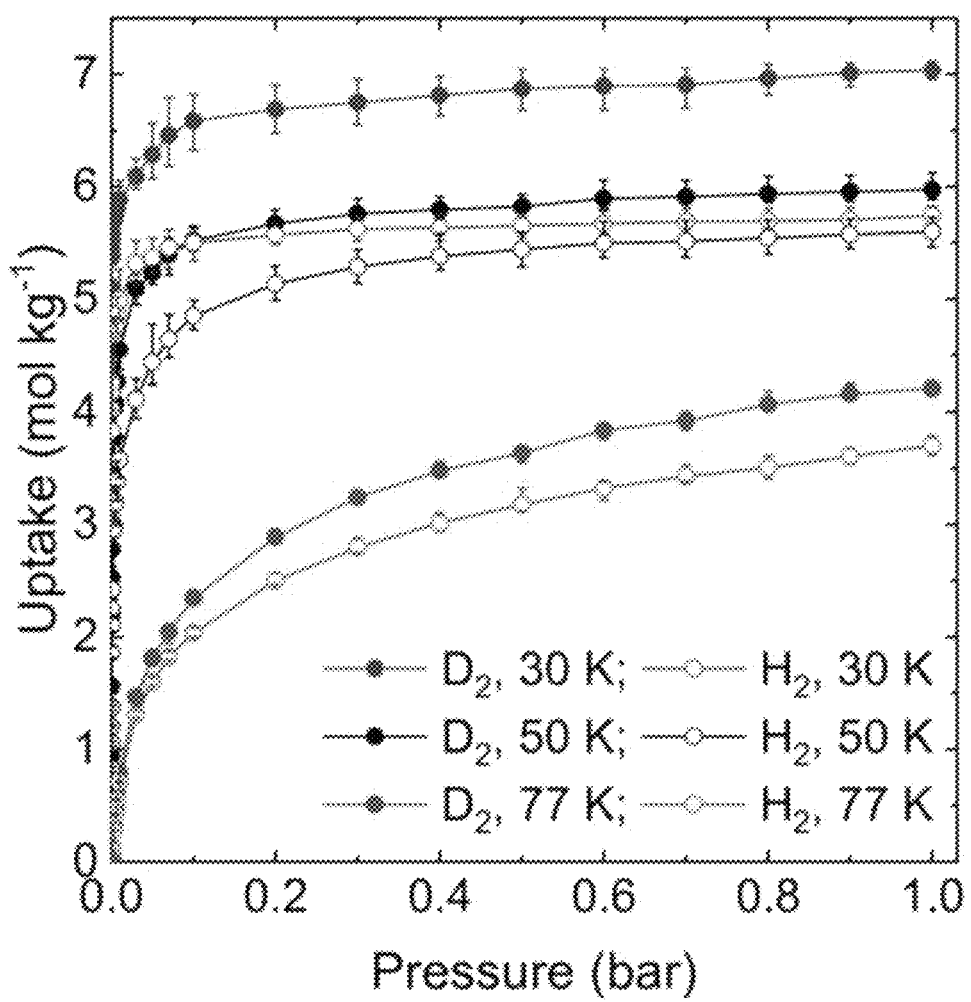
Figure 5F:
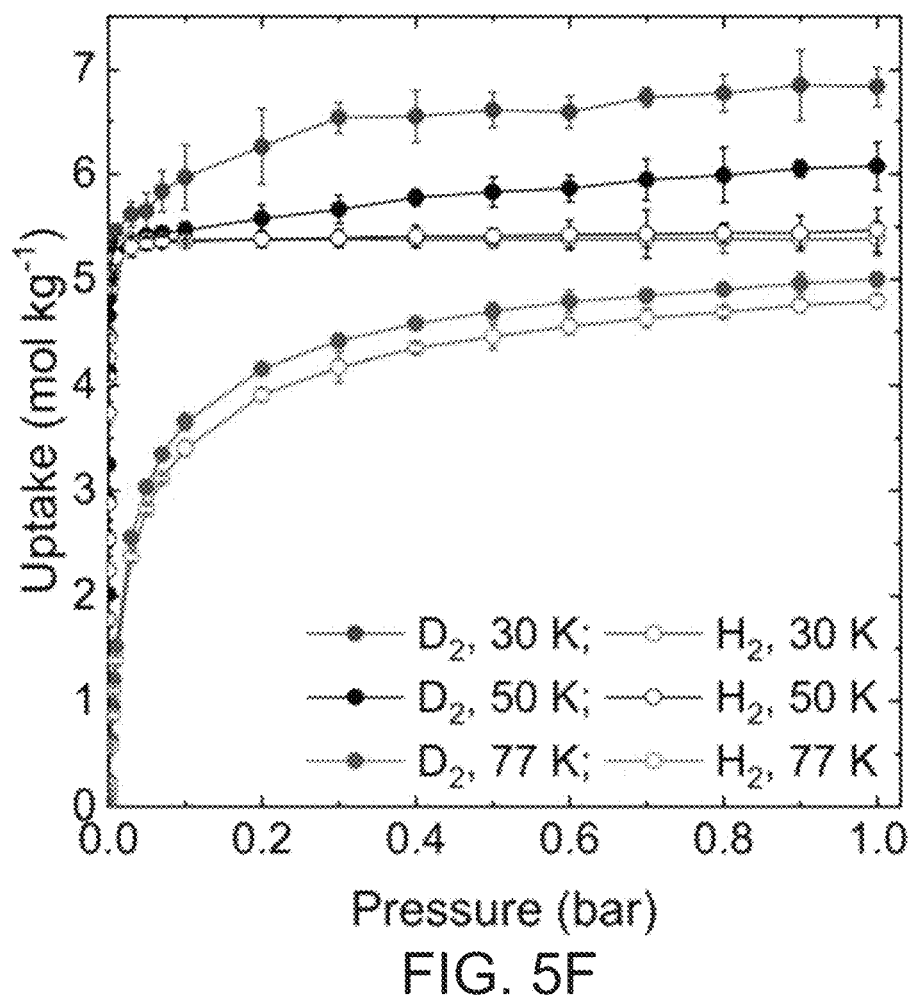
Figure 5G:
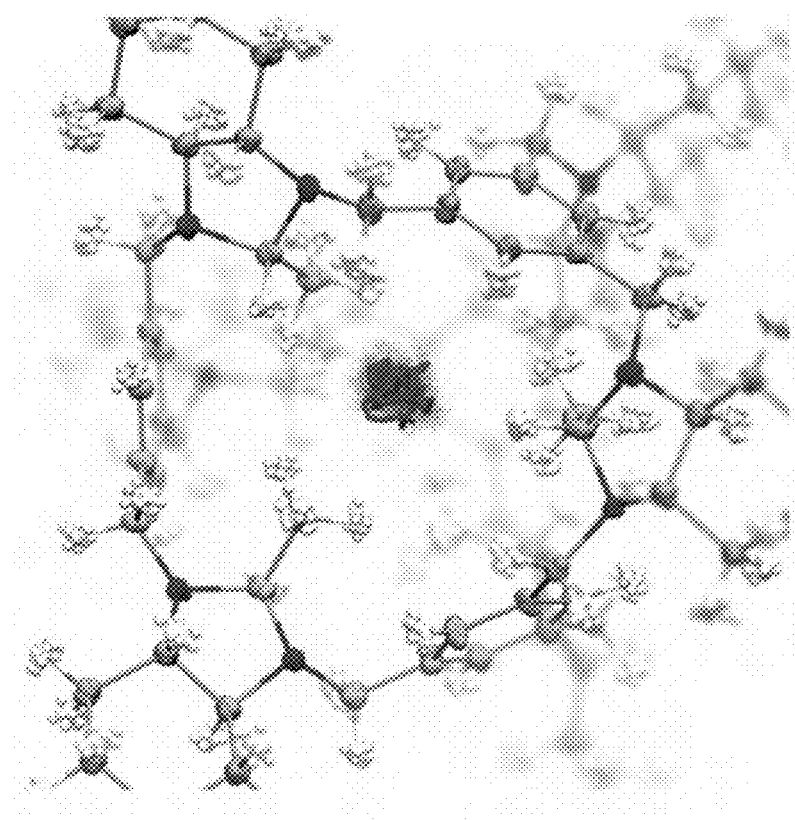
Figure 5H:
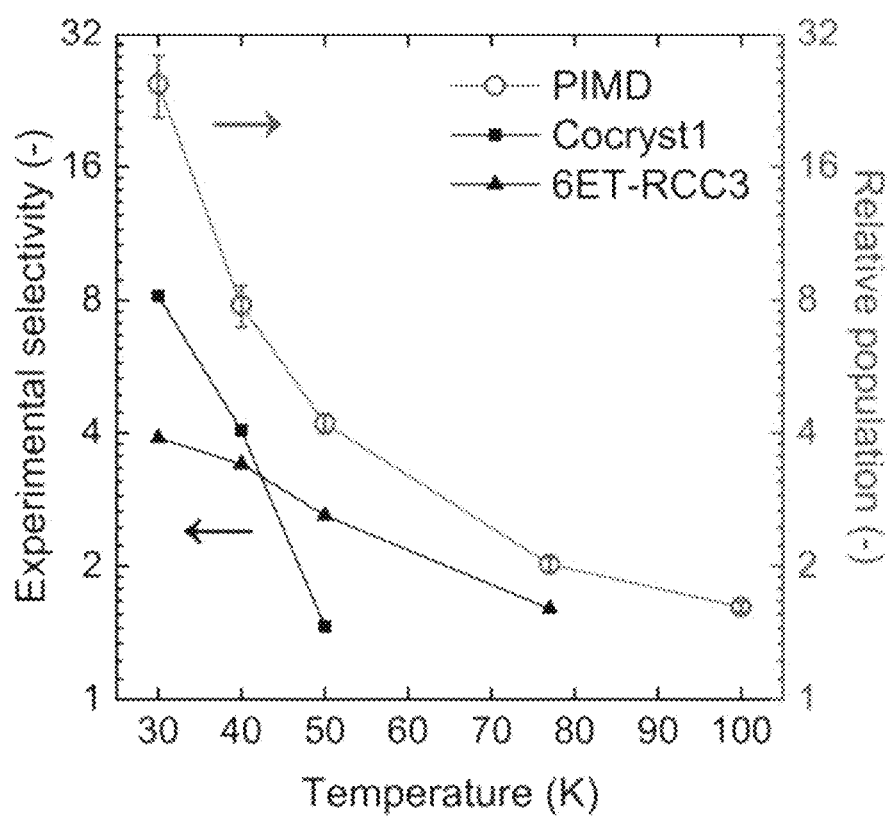

Diffusion of the hydrogen isotopes in CC3, 6ET-RCC3 and Cocryst1 were investigated and interpreted by comparison of the free-energy barriers for $H_2$ and $D_2$ in a given crystal structure at infinite dilution. In the transition-state theory approximation, molecular diffusivity can be derived from a rate constant for the molecule hopping over the free-energy barrier. FIGS. 5A-C show the free-energy profile for a diffusion pathway between the center of mass of a cage molecule and the center of mass of a neighboring cage, travelling across two cage windows. In CC3 (FIG. 5C), both $H_2$ and $D_2$ moved easily between the two cage molecules in an almost barrier-free way. By contrast, the congested cage cavities and narrowed window apertures in 6ET-RCC3 resulted in sharply peaked free-energy barriers (FIG. 5A), strongly decreasing the molecular diffusivity compared to CC3.

When two methyl groups were located in a single 6ET-RCC3 cage window, the pore space became disconnected and the diffusion barrier became too large to cross (off-scale in FIG. 5A; cage on the left). For windows with only one methyl group (FIG. 5A, cage on the right), the pore space ran through continuously between the cages and the free-energy barriers for $H_2$ and $D_2$ were lowered substantially. Crucially, 6ET-RCC3 cage windows containing one methyl group provided diffusion barriers that were different for $D_2$ and $H_2$ and acted as a kinetic sieve. This feature was also carried over into Cocryst1 (FIG. 5B). In Cocryst1, the large CC3 cavities also provided good dynamical relaxation, resulting in improved $D_2$ kinetics and higher $D_2$ uptakes.

Analysis of the various pore structures and the calculated diffusion barriers (FIG. 5, A to I) could explain why the selectivity for Cocryst1 was double that of 6ET-RCC3 ($S_{D2/H2}$=8.2 vs 3.9). The small channels in 6ET-RCC3 led to single-file diffusion. Once a molecule penetrated the pore, no passing between the isotopes in the channels is possible. Hence, the desorption after exposure to a 1:1 mixture exhibited identical maximum temperatures for both isotopes (FIG. 2C)—the gas molecules left in the order they entered-whereas the maximum for pure gas desorption appeared lower for $D_2$ than for $H_2$ (FIG. 2B). Thus, the KQS effect could occur only at the entrance of pore apertures on the cage crystal surface, without further exchange once inside the channels.

Figure 5I:
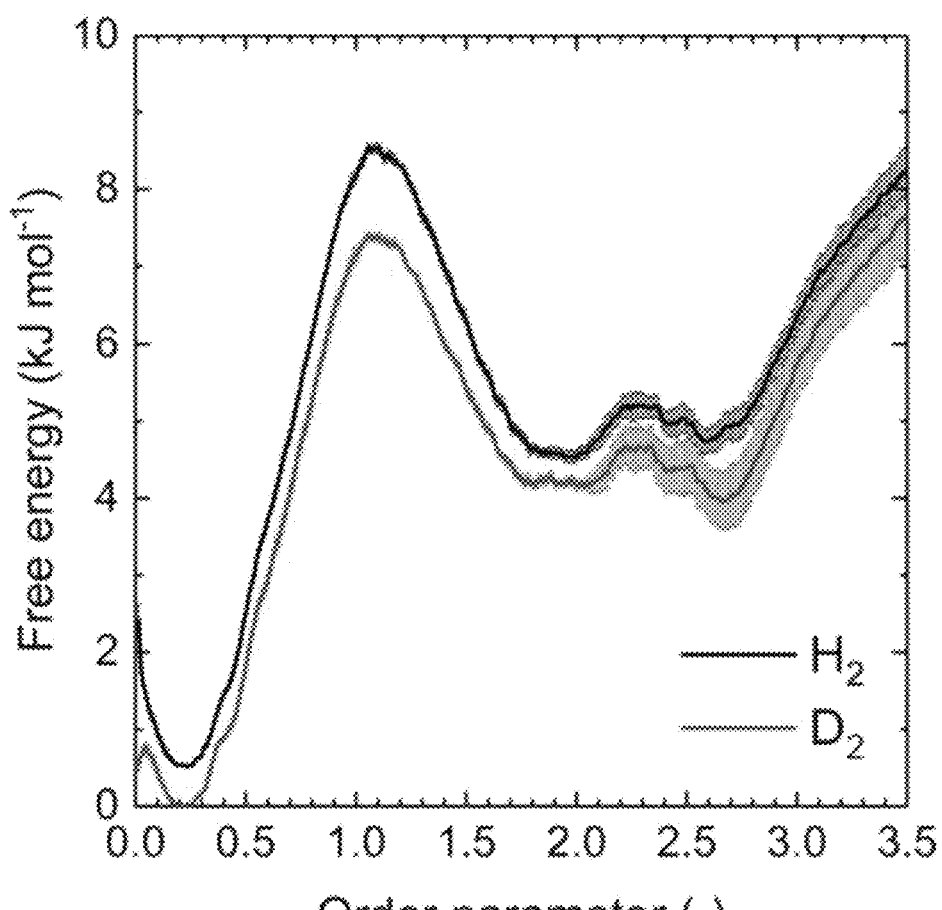

By contrast, Cocryst1 consisted of a combination of large storage pores and small separation pores, separated by a differential diffusional barrier (FIG. 5I). Penetration through the small apertures into the next larger cavity yielded an additional sieving effect, whereby $D_2$ molecules can pass neighboring $H_2$ molecules, unlike in the single-file pores of 6ET-RCC3. Counterintuitively, Cocryst1 had greatly enhanced $D_2/H_2$ selectivity, although there were half as many small windows as in 6ET-RCC3.

Figure 6A:
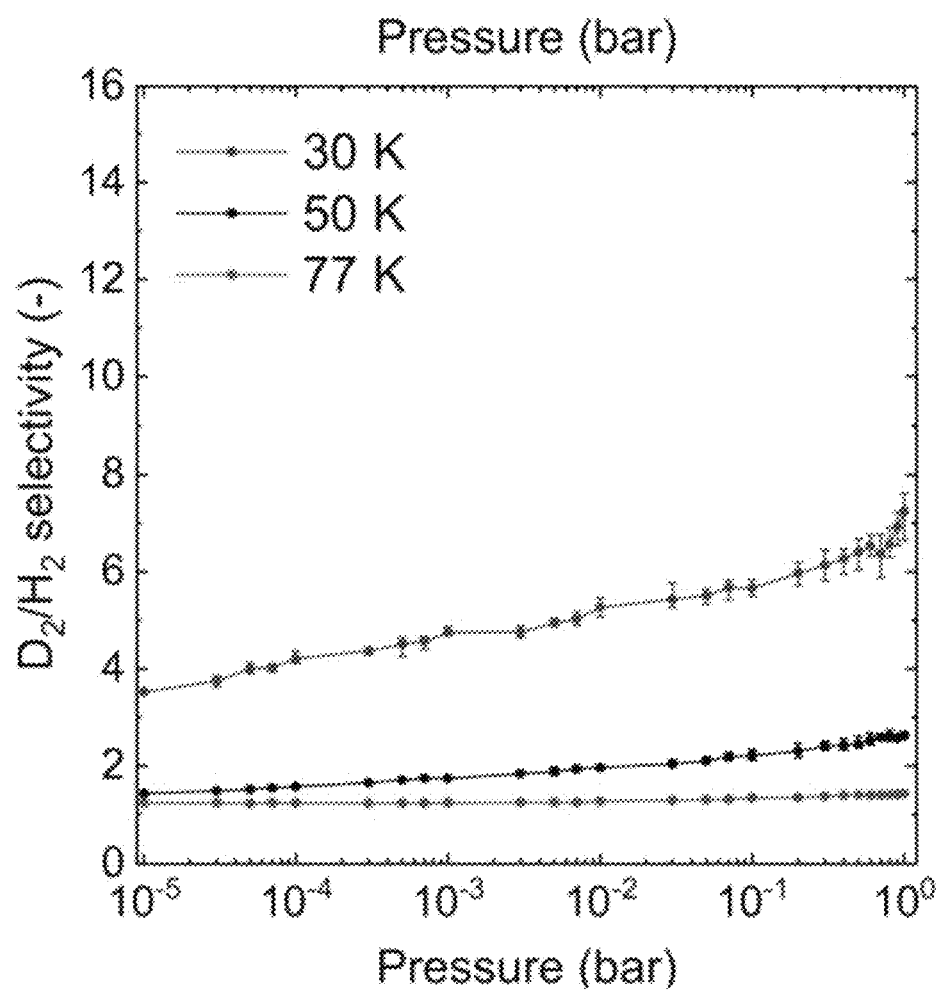
FIGS. 6A-C show predicted $D_2/H_2$ selectivity, calculated using competitive adsorption simulations of an equimolar $D_2/H_2$ mixture for 6ET-RCC3 (FIG. 6A), Cocryst1 (FIG. 6B), and CC3 (FIG. 6C). Similarly, five independent simulations were performed to predict the average uptake and to determine the error bars.
Figure 6B:
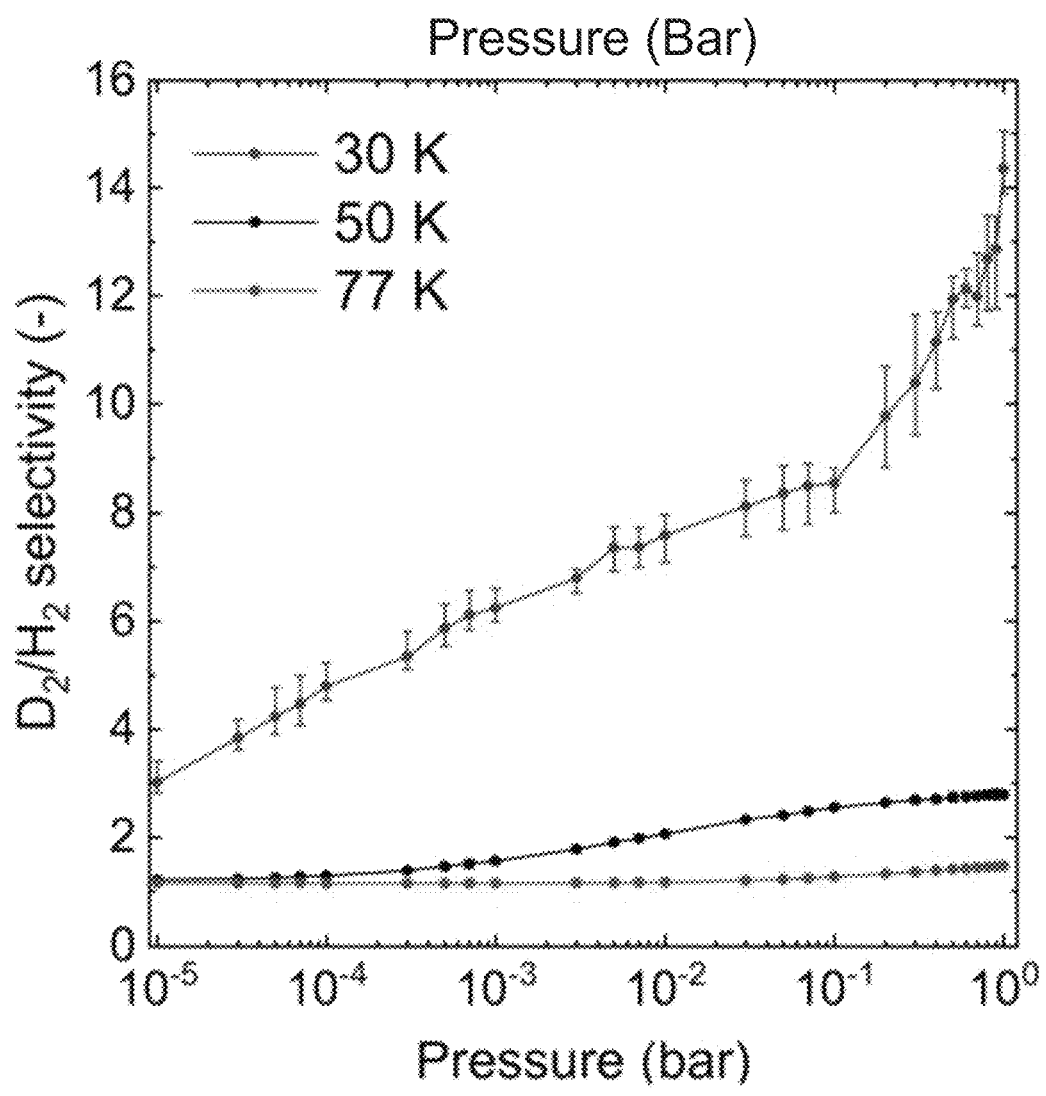

We further combined path integral molecular dynamics (PIMD) simulations with quantum mechanical interaction evaluations to probe the adsorption and diffusion behaviors of $H_2$ and $D_2$ in the 6ET-RCC3 cage molecule, explicitly accounting for the quantum mechanical nature of both the electrons and the nuclei (FIG. 5, G to I). PIMD simulations predicted the binding free energy of $D_2$ to be around 0.50 kJ $mol^{-1}$ lower than for $H_2$ across the temperature range 30-77 K. This difference in binding free energy translates into a relative population of $D_2$ over $H_2$ inside the cage of 4.21 at 50 K (FIG. 6B), rising to 24.65 at 30 K. There is qualitative agreement between these simulated relative populations and the measured $D_2/H_2$ selectivity in the temperature range 30-77 K (FIG. 5H). We also estimated the free energy barriers for a single molecule of quantum $H_2$ and quantum $D_2$ diffusing out of the 6ET-RCC3 cage molecule (FIG. 5I). These simulations show that nuclear quantum effects both destabilize $H_2$ relative to $D_2$ inside the cage, and also provide a higher free energy barrier for diffusion of $H_2$ through the cage windows. The different barrier heights can be understood as the different degrees of zero-point fluctuations that increase the effective size of $H_2$ more than $D_2$, thereby making it more difficult for $H_2$ to pass through the window aperture.

Conclusions

When the field of porous organic cages (POCs) began, there was a strong emphasis on producing materials with large pore volumes and high surface areas to rival solids such as MOFs (25, 45-47). Our study suggests that there are benefits in designing solids that are "barely porous" (46). By itself, this approach led to materials such as 6ET-RCC3 with low gas capacities, but by pairing small- and large-pore cages in a single cocrystal, we accessed a material with unprecedented gas separation properties. This strategy might be extended to give even better performance, for example, by introducing storage cages with larger capacities than CC3, providing that the differential diffusional barrier between cages is preserved.

Our approach allows extremely delicate tuning of pore size—the entire tunability window for this series of cages spans the diameter a single nitrogen atom—and ideally suits applications such as KQS. Although the synthetic method involves multistep organic synthesis (FIG. 1B), including protection and deprotection steps, each step proceeded in nearly 100% yield. Because there was no need to purify intermediates, there is good potential to scale up the amount of materials made for practical separations.

Figure 6C:
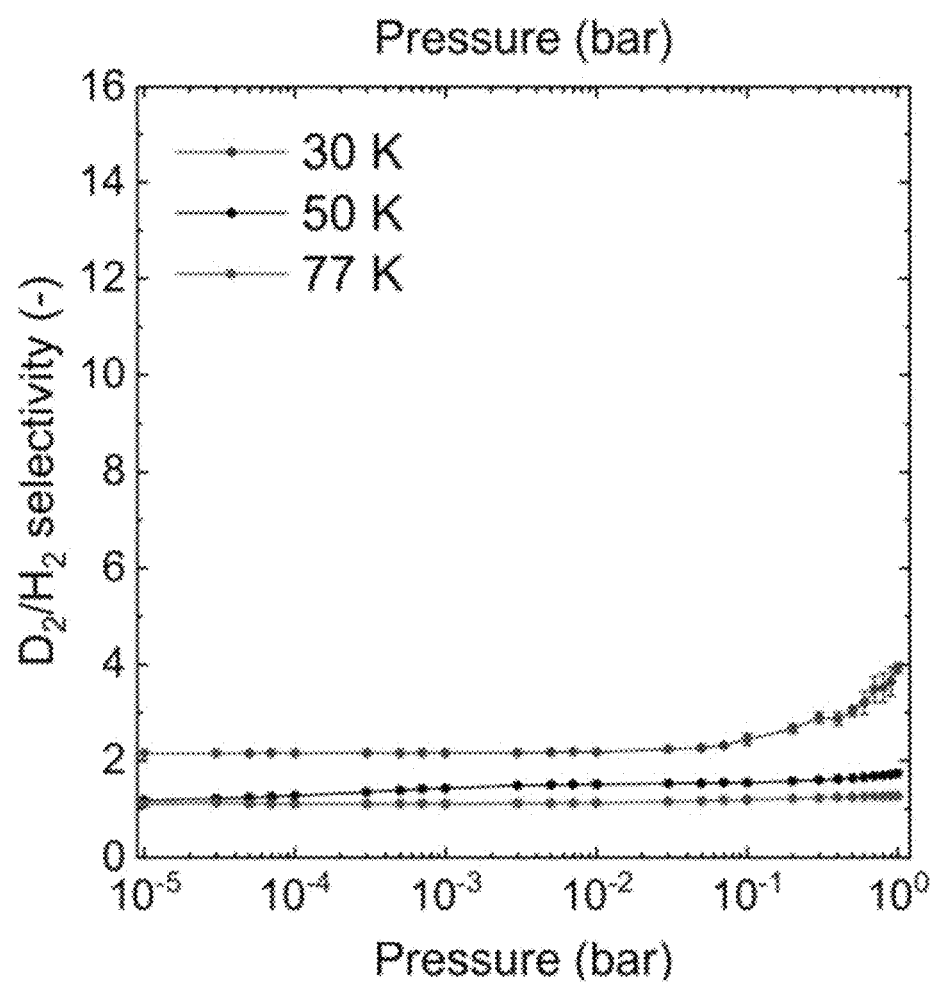

Computational studies (FIGS. 5 & 6) helped to explain the superior $H_2/D_2$ separation performance of the cocrystal.

REFERENCES

1. T. S. Pedersen, T. Andreeva, H. S. Bosch, S. Bozhenkov, F. Effenberg, M. Endler, Y. Feng, D. A. Gates, J. Geiger, D. Hartmann, H. Holbe, M. Jakubowski, R. Konig, H. P. Laqua, S. Lazerson, M. Otte, M. Preynas, O. Schmitz, T. Stange, Y. Turkin, W. X. Team, Plans for the first plasma operation of Wendelstein 7-X. *Nuclear Fusion* 55, 126001-126014 (2015).
2. H. K. Rae, "Selecting heavy water processes" in *Separation of Hydrogen Isotopes* (Symposium Series, ACS, Washington, DC, 1978), vol. 68, chap. 1, pp. 1-26.
3. G. M. Keyser, D. B. McConnell, N. Anyas-Weiss, P. Kirkby, "Heavy Water Distillation" in *Separation of Hydrogen Isotopes* (ACS, Washington, DC, 1978), vol. 68, pp. 126-133.
4. H. Tanaka, D. Noguchi, A. Yuzawa, T. Kodaira, H. Kanoh, K. Kaneko, Quantum effects on hydrogen isotopes adsorption in nanopores. *J. Low Temp. Phys.* 157, 352-373 (2009).
5. H. Oh, M. Hirsher, Quantum sieving for separation of hydrogen isotopes using MOFs. *Eur. J. Inorg. Chem.* 27, 4278-4289 (2016).
6. J. J. Beenakker, V. D. Borman, S. Yu. Krylov, Molecular-transport in subnanometer pores: zero-point energy, reduced dimensionality and quantum sieving. *Chem. Phys. Lett.* 232, 379-382 (1995).
7. J. Teufel, H. Oh, M. Hirscher, M. Wahiduzzaman, L. Zhechkov, A. Kuc, T. Heine, D. Denysenko, D. Volkmer, MFU-4—A metal-organic framework for highly effective $H_2/D_2$ separation. *Adv. Mater.* 25, 635-639 (2012).
8. K. Adil, Y. Belmabkhout, R. S. Pillai, A. Cadiau, P. M. Bhatt, A. H. Assen, G. Maurin, M. Eddaoudi, Gas/vapour separation using ultra-microporous metal-organic frameworks: insights into the structure/separation relationship. *Chem. Soc. Rev.* 46, 3402-3430 (2017).
9. J-Y. Kim, H. Oh, H-R. Moon, Hydrogen isotope separation in confined nanospaces: Carbons, zeolites, metal-organic frameworks, and covalent organic frameworks. *Adv. Mater.* 1805293 (2018).
10. L. M. Robeson, The upper bound revisited. *J. Membr. Sci.* 320, 390-400 (2008).
11. Z. R. Herm, B. M. Wiers, J. A. Mason, J. M. van Baten, M. R. Hudson, P. Zajdel, C. M. Brown, N. Masciocchi, R. Krishna, J. R. Long, Separation of hexane isomers in a metal-organic framework with triangular channels. *Science* 340, 960-964 (2013).
12. A. Cadiau, K. Adil, P. M. Bhatt, Y. Belmabkhout, M. Eddaoudi, A metal-organic framework-based splitter for separating propylene from propane. *Science* 353, 137-140 (2016).
13. N. B. McKeown, P. M. Budd, Polymers of intrinsic microporosity (PIMs): organic materials for membrane separations, heterogeneous catalysis and hydrogen storage. *Chem. Soc. Rev.* 35, 675-683 (2006).
14. P. Kowalczyk, A. P. Terzyk, P. A. Gauden, S. Furmaniak, K. Kaneko, T. F. Miller, Nuclear quantum effects in the layering and diffusion of hydrogen isotopes in carbon nanotubes. *J. Phys. Chem. Lett.* 6, 3367-3372 (2015).
15. G. Garberoglio, M. M. DeKlavon, J. K. Johnson. Quantum sieving in single-walled carbon nanotubes: Effect of interaction potential and rotational-translational coupling. *J. Phys. Chem. B* 110, 1733-1741 (2006).
16. Q. Wang, S. R. Challa, D. S. Sholl, J. K. Johnson, Quantum sieving in carbon nanotubes and zeolites. *Phys. Rev. Lett.* 82, 956-959 (1999).
17. R. Xiong, R. Balderas-Xicohténcatl, L. Zhang, P. Li, Y. Yao, G. Sang, C. Chen, T. Tang, D. Luo, M. Hirscher. Thermodynamics, kinetics and selectivity of $H_2$ and $D_2$ on zeolite 5A below 77K. *Microporous Mesoporous Mater.* 264, 22-27 (2017).
18. M. Giraudet, I. Bezverkhyy, G. Weber, C. Dirand, M. Macaud, J-P. Bellat, $D_2/H_2$ adsorption selectivity on FAU zeolites at 77.4 K: Influence of Si/Al ratio and cationic composition. *Microporous Mesoporous Mater.* 270, 211-219 (2018).
19. H. Oh, I. Savchenko, A. Mavrandonakis, T. Heine, M. Hirscher, Highly effective hydrogen isotope separation in nanoporous metal-organic frameworks with open metal sites: Direct measurement and theoretical analysis. *ACS Nan.* 8, 761-770 (2014).
20. B. Chen. X. Zhao, A. Putkham, K. Hong, E. B. Lobkovsky, E. J. Hurtado, A. J. Fletcher, K. M. Thomas, Surface interactions and quantum kinetic molecular sieving for $H_2$ and $D_2$ adsorption on a mixed metal-organic framework material. *J. Am. Chem. Soc.* 130, 6411-6423 (2008).
21. H. Oh, K-S. Park, S. B. Kalidindi, R. A. Fischer, M. Hirscher, Quantum cryo-sieving for hydrogen isotope separation in microporous frameworks: an experimental study on the correlation between effective quantum sieving and pore size. *J. Mater. Chem.* A 1, 3244-3248 (2013).
22. M. Lozada-Hidalgo, S. Hu, O. Marshalli, A. Mishchenko, A. N. Grigorenko, R. A. W. Dryfe, B. Radham, I. V. Grigorieva, A. K. Geim, Sieving hydrogen isotopes through two-dimensional crystals. *Science* 351, 68-70 (2016).
23. Savchenko, A. Mavrandonakis, T. Heine, H. Oh, J. Teufel, M. Hirscher, Hydrogen isotope separation in metal-organic frameworks: Kinetic or chemical affinity quantum-sieving? *Microporous Mesoporous Mater.* 216, 133-137 (2015).
24. H. Deng, S. Grunder, K. E. Cordova. C. Valente, H. Furukawa, M. Hmadeh, F. Gandara, A. C. Whalley, Z. Liu, S. Asahina, H. Kazunori, M. O'Keeffe, O. Terasaki, J. F. Stoddart, O. M. Yaghi, Large-pore apertures in a series of metal-organic frameworks. *Science* 336, 1018-1023 (2012).
25. T. Tozawa, J. T. A. Jones, S. I. Swamy, S. Jiang, D. J. Adams, S. Shakespeare, R. Clowes, D. Bradshaw, T. Hasell, S. Y. Chong, C. Tang, S. Thompson, J. Parker, A. Trewin, J. Bacsa, A. M. Z. Slawin, A. Steiner, A. I. Cooper, Porous organic cages. *Nat. Mater.* 8, 973-978 (2009).
26. T. Hasell, A. I. Cooper, Porous organic cages: soluble, modular and molecular pores. *Nat. Rev. Mater.* 1, 16053 (2016).
27. T. Mitra, K. E. Jelfs, M. Schmidtmann, A. Ahmed, S. Y. Chong, D. J. Adams, A. I. Cooper, Molecular shape sorting using molecular organic cages. *Nat. Chem.* 5, 276-281 (2013).
28. L. Chen. P. S. Reiss. S. Y. Chong, D. Holden, K. E. Jelfs, T. Hasell, M. A. Little, A. Kewley, M. E. Briggs, A. Stephenson, K. M. Thomas, J. A. Armstrong, J. Bell, J. Busto, R. Noel, J. Liu, D. M. Strachan, P. K. Thallapally, A. I. Cooper, Separation of rare gases and chiral molecules by selective binding in porous organic cages. *Nat. Mater.* 13, 954-960 (2014).
29. M. W. Schneider, I. M. Oppel, A. Griffin, M. Mastalerz, Post-modification of the interior of porous shape-persistent organic cage compounds. *Angew. Chem. Int. Ed.* 52, 3611-3615 (2013).
30. G. J. Kleywegt, T. A. Jones, Detection, delineation, measurement and display of cavities in macromolecular structures. *Acta Crystallogr. Sect. D: Biol.* 50, 178-185 (1994).
31. M. Liu, M. A. Little, K. E. Jelfs, J. T. A. Jones, M. Schmidtmann, S. Y. Chong, T. Hasell, A. I. Cooper, Acid- and base-stable porous organic cages: shape persistence and pH stability via post-synthetic "tying" of a flexible amine cage. *J. Am. Chem. Soc.* 136, 7583-7586 (2014).
32. P. G. M. Wuts, T. W. Greene, T. W. Greene, Dawsonera, *Greene's protective groups in organic synthesis fourth edition* (Wiley, Inc., Hoboken, New Jersey, 2016).
33. T. Hasell, J. L. Culshaw, S. Y. Chong, M. Schmidtmann, M. A. Little, K. E. Jelfs, E. O. Pyzer-Knapp, H. Shepherd, D. J. Adams, G. M. Day, A. I. Cooper, Controlling the crystallization of porous organic cages: molecular analogs of isoreticular frameworks using shape-specific directing solvents. *J. Am. Chem. Soc.* 136, 1438-1448 (2014).
34. D. Banerjee, A. J. Cairns, J. Liu, R. K. Motkuri, S. K. Nune, C. A. Fernandez, R. Krishna, D. M. Strachan, P. K. Thallapally, Potential of metal-organic frameworks for separation of xenon and krypton. *Acc. Chem. Res.* 48, 211-219 (2015).
35. C. A. Fernandez, J. Liu, P. K. Thallapally, D. M. Strachan, Switching Kr/Xe selectivity with temperature in a metal-organic framework. *J. Am. Chem. Soc.* 134, 9046-9049 (2012).
36. D. Noguchi, H. Tanaka, A. Kondo, H. Kajiro, H. Noguchi, T. Ohba, H. Kanoh, K. Kaneko, Quantum sieving effect of three-dimensional Cu-based organic framework for $H_2$ and $D_2$. *J. Am. Chem. Soc.* 130, 6367-6372 (2008).
37. J. T. A. Jones, T. Hasell, X. Wu, J. Bacsa, K. E. Jelfs, M. Schmidtmann, S. Y. Chong, D. J. Adams, A. Trewin, F. Schiffmann, F. Cora, B. Slater, A. Steiner, G. M. Day, A. I. Cooper, Modular and predictable assembly of porous organic molecular crystals. *Nature* 474, 367-371 (2011).
38. S. A. FitzGerald, C. J. Pierce, J. L. C. Rowsell, E. D. Bloch, J. A. Mason, Highly selective quantum sieving of $D_2$ from $H_2$ by a metal-organic framework as determined by gas manometry and infrared spectroscopy. *J. Am. Chem. Soc.* 135, 9458-9464 (2013).
39. B. Xiao, P. S. Wheatley, X. Zhao, A. J. Fletcher, S. Fox, A. G. Rossi, I. L. Megson, S. Bordiga, L. Regli, K. M. Thomas, R. E. Morris, High-capacity hydrogen and nitric oxide adsorption and storage in a metal-organic framework. *J. Am. Chem. Soc.* 129, 1203-1209 (2007).
40. J. Teufel, "Experimental investigation of $H_2/D_2$ isotope separation by cryoadsorption in metal-organic frameworks", thesis, Universität Stuttgart (2013).
41. I. Zaiser, "Helium und hydrogen isotope adsorption and separation in metal-organic frameworks", thesis, Universität Stuttgart (2016).
42. H. Oh, S. B. Kalidindi, Y. Um, S. Bureekaew, R. Schmid, R. A. Fischer, M. Hirscher, A cryogenically flexible covalent organic framework for efficient hydrogen isotope separation by quantum sieving. *Angew. Chem. Int. Ed.* 52, 13219-13222 (2013).
43. L. M. Sesé, Feynman-Hibbs potentials and path integrals for quantum Lennard-Jones systems: Theory and Monte Carlo simulations. *Mol. Phys.* 85, 931-947, (1995).
44. S. Yang, L. Chen, D. Holden, R. Wang, Y. Cheng, M. Wells, A. I. Cooper, L. Ding, Understanding the effect of host flexibility on the adsorption of $CH_4$, $CO_2$ and $SF_6$ in porous organic cages. *Kristallogr. Cryst. Mater.* (2019).
45. M. Mastalerz, M. W. Schneider, I. M. Oppel, O. Presly, A salicylbisimine cage compound with high surface area and selective $CO_2/CH_4$ adsorption. *Angew. Chem. Int. Ed.* 50, 1046-1051 (2011).
46. A. I. Cooper, Molecular organic crystals: from barely porous to really porous. *Angew. Chem. Int. Ed.* 51, 7892-7894 (2012).
47. G. Zhang, O. Presly, F. White, I. M. Oppel, M. Mastalerz, A permanent mesoporous organic cage with an exceptionally high surface area. *Angew. Chem. Int. Ed.* 53, 1516-1520 (2014).
48. A. Pulido, L. Chen, T. Kaczorowski, D. Holden, M. A. Little, S. Y. Chong, B. J. Slater, D. P. McMahon, B. Bonillo, C. J. Stackhouse, A. Stephenson, C. M. Kane, R. Clowes, T. Hasell, A. I. Cooper, G. M. Day, Functional materials discovery using energy-structure-function maps. *Nature* 543, 657-664 (2017).
49. L. Krause, R. Herbst-Irmer, G. M. Sheldrick, D. J. Stalke, Comparison of silver and molybdenum microfocus X-ray sources for single-crystal structure determination. *J. Appl. Crystallogr.* 48, 3-10 (2015).
50. A. S. Brewster, D. G. Waterman. J. M. Parkhurst, R. J. Gildea, I. D. Young, L. J. O'Riordan, J. Yano, G. Winter, G. Evans and N. K. Sauter, Improving signal strength in serial crystallography with DIALS geometry refinement. *Acta Crystallogr. Sect. D Struct. Biol.* 74, 877-894 (2018).
51. G. M. Sheldrick, SHELXT—Integrated space-group and crystal-structure determination. *Acta Crystallogr. Sect. A Found. Adv.* 71, 3-8 (2015).
52. G. M. Sheldrick, Crystal structure refinement with SHELXL. *Acta Crystallogr. Sect. C Struct. Chem.* 71, 3-8 (2015).
53. O. V. Dolomanov, L. J. Bourhis, R. J. Gildea, J. A. K. Howard, H. Puschmann, OLEX2: a complete structure solution, refinement and analysis program. *J. Appl. Crystallogr.* 42, 339-341 (2009).
54. A. G. Slater, P. S. Reiss, A. Pulido, M. A. Little, D. L. Holden, L. Chen, S. Y. Chong, B. M. Alston, R. Clowes, M. Haranczyk, M. E. Briggs, T. Hasell, G. M. Day, A. I. Cooper, Computationally-guided synthetic control over pore size in isostructural porous organic cages. *ACS Cent. Sc.* 3, 734-742 (2017).
55. T. F. Willems, C. Rycroft, M. Kazi, J. C. Meza, M. Haranczyk, Algorithms and tools for high-throughput geometry-based analysis of crystalline porous materials. *Microporous and Mesoporous Mater.* 149, 134-141 (2012).
56. W. Smith, T. R. Forester, DL_POLY_2.0: A general-purpose parallel molecular dynamics simulation package. *J. Mol. Graph.* 14, 136-141, (1996).
57. D. Levesque, A. Gicquel, F. L. Darkrim, S. B. Kayiran, Monte Carlo simulations of hydrogen storage in carbon nanotubes. *J. Phys-Condens. Mat.* 14, 9285-9293 (2002).
58. W. L. Jorgensen, D. S. Maxwell, J. TiradoRives, Development and testing of the OPLS all-atom force field on conformational energetics and properties of organic liquids. *J. Am. Chem. Soc.* 118, 11225-11236, (1996).

59. D. Dubbeldam, S. Calero, D. E. Ellis, R. Q. Snurr, RASPA: molecular simulation software for adsorption and diffusion in flexible nanoporous materials. *Mol. Simul.* 42, 81-101 (2016).
60. D. Dubbeldam, E. Beerdsen, S. Calero, B. Smit, Dynamically corrected transition state theory calculations of self-diffusion in anisotropic nanoporous materials. *J. Phys. Chem. B* 110, 3164-3172 (2006).
61. M. Gaus, Q. Cui, M. Elstner, DFTB3: Extension of the Self-Consistent-Charge Density-Functional Tight-Binding Method (SCC-DFTB). *J. Chem. Theory Comput.* 7, 931-948 (2011).
62. L. Zhechkov, T. Heine, S. Patchkovskii, G. Seifert, H. A. Duarte, An efficient a posteriori treatment for dispersion interaction in Density-Functional-Based Tight Binding. *J. Chem. Theory Comput.* 1, 841-847 (2005).
63. M. Gaus, A. Goez, M. Elstner, Parametrization and benchmark of DFTB3 for organic Molecules. *J. Chem. Theory Comput.* 9, 338-354 (2013).
64. J. VandeVondele, J. Hutter, Gaussian basis sets for accurate calculations on molecular systems in gas and condensed phases. *J. Chem. Phys.* 127, 114105 (2007).
65. M. Krack, Pseudopotentials for H to Kr optimized for gradient-corrected exchange-correlation functionals. *Theor. Chem. Acc.* 114, 145-152 (2005).
66. T. Hasell, M. Miklitz, A. Stephenson, M. A. Little, S. Y. Chong, R. Clowes, L. Chen, D. Holden, G. A. Tribello, K. E. Jelfs, A. I. Cooper, Porous organic cages for sulfur hexafluoride separation. *J. Am. Chem. Soc.* 138, 1653-1659 (2016).
67. M. Parrinello, A. Rahman, Study of an F center in molten KCl. *J. Chem. Phys.* 80, 860-867 (1984).
68. D. Chandler, P. G. Wolynes, Exploiting the isomorphism between quantum theory and classical statistical mechanics of polyatomic fluids. *J. Chem. Phys.* 74, 4078-4095 (1981).
69. V. I. Tikhonov, A. A. Volkov, Separation of water into its ortho and para isomers. Science 296, 2363-2363 (2002).
70. D. M. Ceperley, G. Jacucci, Calculation of exchange frequencies in bcc 3He with the path-integral Monte Carlo method. *Phys. Rev. Lett.* 58, 1648-1651 (1987).
71. T. E. Markland, B. J. Berne, Unraveling quantum mechanical effects in water using isotopic fractionation. *Proc. Natl. Acad. Sci.* USA 109, 7988-7991 (2012).
72. C. McBride, E. G. Noya, J. L. Aragones, M. M. Conde, C. Vega, The phase diagram of water from quantum simulations. *Phys. Chem. Chem. Phys.* 14, 10140-10146 (2012).
73. M. Ceriotti, T. E. Markland, Efficient methods and practical guidelines for simulating isotope effects. *J. Chem. Phys.* 138, 014112 (2013).
74. V. Kapil, M. Rossi, O. Marsalek, R. Petraglia, Y. Litman, T. Spura, B. Q. Cheng. A. Cuzzocrea, R. H. Meissner, D. M. Wilkins, B. A. Helfrecht, P. Juda, S. P. Bienvenue, W. Fang, J. Kessler, I. Poltavsky, S. Vandenbrande, J. Wieme, C. Corminboeuf, T. D. Kuhne, D. E. Manolopoulos, T. E. Markland, J. O. Richardson, A. Tkatchenko, G. A. Tribello, V. Van Speybroeck, M. Ceriotti, i-PI 2.0: A universal force engine for advanced molecular simulations. *Comput. Phys. Commun.* 236, 214-223 (2019).
75. M. Ceriotti, D. E. Manolopoulos, Efficient first-principles calculation of the quantum kinetic energy and momentum distribution of nuclei. *Phys. Rev. Lett.* 109, 100604 (2012).
76. B. Aradi, B. Hourahine, T. Frauenheim, DFTB+, a sparse matrix-based implementation of the DFTB method. *J. Phys. Chem. A* 111, 5678-5684 (2007).
77. B. Leimkuhler, C. Matthews, Robust and efficient configurational molecular sampling via Langevin dynamics. *J. Chem. Phys.* 138, 174102 (2013).
78. G. M. Torrie, J. P. Valleau, Nonphysical sampling distributions in Monte Carlo free-energy estimation: Umbrella sampling. *J. Comput. Phys.* 23, 187-199 (1977).
79. G. A. Tribello, M. Bonomi, D. Branduardi, C. Camilloni, G. Bussi, PLUMED 2: New feathers for an old bird. *Comput. Phys. Commun.* 185, 604-613 (2014).
80. A. Grossfield, WHAM: the weighted histogram analysis method, version 2.0.9. Available at membrane.urmc.rochester.edu/content/wham. 15, 2013 (2013).

All patent publications and non-patent publications are indicative of the level of skill of those skilled in the art to which this invention pertains. All these publications are herein incorporated by reference to the same extent as if each individual publication were specifically and individually indicated as being incorporated by reference. In addition, Liu M et al. Barely porous organic cages for hydrogen isotope separation. *Science.* 2019:366(6465):613-620. doi: 10.1126/science.aax7427, is incorporated herein by reference in its entirety.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of extracting one or more target substance(s) from a target mixture comprising one or more target substance(s) and one or more non-target substance(s), the method comprising preferentially sorbing the target substance(s) over the non-target substance(s) by contacting the target mixture with a sorption composition, at a predetermined contacting temperature, to provide a sorbed composition and a treated target mixture;
   wherein:
      the sorption composition comprises a sorption compound, which is a porous organic cage comprising an internal cavity having a cavity size within +/−4 Å of the thermal de Broglie wavelength, at the contacting temperature, of the target substance(s);
      the sorbed composition comprises the sorption composition with the target substance(s), or a mixture relatively enriched in target substance(s) as compared to the target mixture, sorbed therein; and
      the treated target mixture is relatively enriched in the non-target substance(s) as compared to the target mixture;
         wherein the target substance(s) have a shorter thermal de Broglie wavelength than the non-target substance(s).

2. The method as claimed in claim 1, wherein contacting is performed at a contacting temperature between 20K and 80K.

3. The method as claimed in claim 1, further comprising separating the sorbed composition from the treated target mixture.

4. The method as claimed in claim 1, further comprising contacting the treated target mixture with either the same batch of the sorption composition or a different batch of the sorption composition.

5. The method as claimed in claim 1, further comprising recovering the target substance(s), or the mixture relatively enriched in the target substance(s) as compared to the target mixture, from the sorbed composition.

6. The method as claimed in claim 5, further comprising recovered recovering the target substance(s), or mixture relatively enriched in the target substance(s) as compared to the target mixture, and contacting the target substance(s), or the mixture relatively enriched in the target substance(s) as compared to the target mixture with either the same batch of the sorption composition or a different batch of the sorption composition.

7. The method as claimed in claim 1, wherein the internal cavity of the porous organic cage has a cavity size within +/−2 Å of the thermal de Broglie wavelength, at the contacting temperature, of the target substance(s).

8. The method as claimed in claim 1, wherein:
the target mixture comprises, consists essentially of, or consists of two or more selected from the group consisting of $H_2$, $D_2$, $T_2$, HD, HT, and DT;
the target substance(s) is/are selected from the group consisting of $D_2$, $T_2$, HD, HT, and DT; and
the non-target substances(s) is/are selected from the group consisting of $H_2$, $D_2$, $T_2$, HD, HT, and DT, on the proviso that the non-target substance(s) exclude the target substance(s).

9. The method as claimed in claim 7, wherein the target substance(s) comprise $D_2$ and/or $T_2$, and the non-target substance(s) comprise $H_2$.

10. The method as claimed in claim 7, wherein the target substance is $D_2$, and the non-target substance(s) comprise $H_2$.

11. The method as claimed in claim 1, wherein the internal cavity of the porous organic cage is a functionalized internal cavity derived from a pre-functionalized internal cavity, wherein the pre-functionalized internal cavity comprises two or more functionalizable groups, one or more of which functionalizable groups are functionalized in the functionalized internal cavity.

12. The method as claimed in claim 11, wherein the functionalizable groups comprise a reactive heteroatom which is functionalized via alkylation, acylation, acetalization, hemiacetalization, aminalization, and/or hemiaminalization; or the functionalizable groups comprise a reactive carbon atom which is functionalized via esterification, amidation, acetalization, hemiacetalization, aminalization, and/or hemiaminalization.

13. The method as claimed in claim 11, wherein the internal cavity of the porous organic cage is a homo-functionalized internal cavity.

14. The method as claimed in claim 11, wherein the internal cavity of the porous organic cage is a hetero-functionalized internal cavity.

15. The method as claimed in claim 11, wherein the internal cavity of the porous organic cage is a partially functionalized internal cavity.

16. The method as claimed in claim 11, wherein the sorption compound is formed by functionalizing one, some, or all functionalizable groups within an internal cavity of a precursor compound with one or more functionalizing substance(s), wherein the precursor compound is the same as the sorption compound except for functionalization of the internal cavity, and functionalization of the precursor compound comprises one or more of the steps of:
i) Functionalizing one or more functionalizable groups (or one or more sets or pairs of functionalizable groups) with a first functionalizing substance to provide one or more first-functionalized groups;
ii) Functionalizing one or more other functionalizable groups (or one or more other sets or pairs of functionalizable groups) with a second functionalizing substance to provide one or more second-functionalized groups;
iii) Defunctionalizing (or deprotecting) one or more of the first-functionalized groups to provide one or more first-defunctionalized groups, suitably corresponding to regenerated functionalizable group(s);
iv) Refunctionalizing one or more of the first-defunctionalized group(s) with a third functionalizing substance, which is optionally the same as or different to either the first or second functionalizing substance, to provide one or more third-functionalized groups;
v) Defunctionalizing (or deprotecting) one or more of the second-functionalized groups to provide one or more second-defunctionalized groups, suitably corresponding to regenerated functionalizable group(s);
vi) Refunctionalizing one or more of the second-defunctionalized group(s) with a functionalizing substance, which is optionally the same as or different to any of the first, second, or third functionalizing substances, to provide one or more fourth-functionalized groups.

17. The method as claimed in claim 16, wherein functionalization of the precursor compound comprises only step i) of steps i)-vi) to thereby provide a homo-functionalized sorption compound formed from a single functionalizing substance.

18. The method as claimed in claim 16, wherein functionalization of the precursor compound comprises only steps i) and ii) of steps i)-vi) to thereby provide a hetero-functionalized sorption compound formed from two different functionalizing substances.

19. The method as claimed in claim 16, wherein functionalization of the precursor
compound comprises only steps i), ii) and iii) of steps i)-vi) to thereby provide a homo-functionalized sorption compound formed from a single functionalizing substance.

20. The method as claimed in claim 16, wherein functionalization of the precursor compound comprises only steps i), ii), iii), and iv) of steps i)-vi) to thereby provide a hetero-functionalized sorption compound formed from two different functionalizing substances (second and third functionalizing substances).

21. The method as claimed in claim 1, wherein the cavity size of the sorption compound at SATP is between 0.5 to 5 Å.

22. The method as claimed in claim 1, wherein the cavity size of the sorption compound at SATP is between 1 to 2.4 Å.

23. The method as claimed in claim 1, wherein the sorption compound is a functionalized polydiamine cage.

24. The method as claimed in claim 1, wherein the sorption compound comprises one or more tied units of Formula C and zero, one, or more untied units of Formula A, wherein the tied units of Formula C and/or untied units of Formula A are linked together, optionally via an intervening linker;

wherein Formula C is defined by:

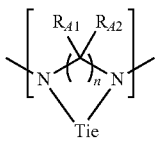
Formula C and Formula A is defined by:

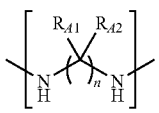
Formula A wherein Tie is a molecular tie as defined by Formula D:

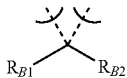
Formula D wherein:
  n is an integer between 1 and 4;
  each $R_{A1}$ and $R_{A2}$ group is independently hydrogen or an optionally substituted substituent group, wherein any pair of $R_{A1}$ and $R_{A2}$ groups are optionally joined together to form a carbocyclic, heterocyclic, aryl, or heteroaryl ring; and
  each $R_{B1}$ and $R_{B2}$ group is independently hydrogen or an optionally substituted substituent group, wherein any pair of $R_{B1}$ and $R_{B2}$ groups are optionally joined together to form a carbocyclic, heterocyclic, aryl, or heteroaryl ring and Formula A is defined by:

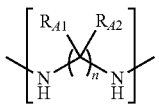
Formula A wherein Tie is a molecular tie as defined by Formula D:

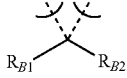
Formula D wherein:
  n is an integer between 1 and 4;
  each $R_{A1}$ and $R_{A2}$ group is independently hydrogen or an optionally substituted substituent group, wherein any pair of $R_{A1}$ and $R_{A2}$ groups are optionally joined together to form a carbocyclic, heterocyclic, aryl, or heteroaryl ring; and
  each $R_{B1}$ and $R_{B2}$ group is independently hydrogen or an optionally substituted substituent group, wherein any pair of $R_{B1}$ and $R_{B2}$ groups are optionally joined together to form a carbocyclic, heterocyclic, aryl, or heteroaryl ring.

25. The method as claimed in claim 24, wherein the sorption compound comprises one or more tied units of Formula $C_1$ and zero, one, or more untied units of Formula $A_1$, wherein
  the tied units of Formula $C_1$ and/or untied units of Formula $A_1$ are linked together via an intervening linker of Formula $A_{1L}$;
  wherein Formula $C_1$ is defined by:

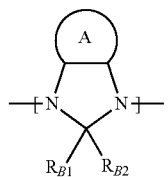
Formula C1 wherein Formula $A_1$ is defined by:

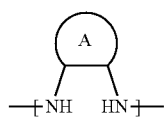
Formula A1 wherein Ring A is a carbocyclic, aryl, heterocyclic, or heteroaryl ring; wherein Formula $A_{1L}$ is defined by:

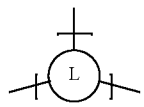
Formula A1L wherein Ring L is a polyvalent hydrocarbon (straight chain or branched), a polyvalent carbocycle, a polyvalent heterocycle, a polyvalent arene, a polyvalent heteroarene, a polyvalent mono-/poly-hydrocarbyl-carbocycle, a polyvalent mono-/poly-hydrocarbyl-heterocycle, a polyvalent mono-/poly-hydrocarbyl-arene, or a polyvalent mono-/poly-hydrocarbyl-heteroarene;
wherein any of the groups of Formula $C_1$, $A_1$, and/or $A_{1L}$ are substituted or unsubstituted.

26. The method as claimed in claim 25, wherein the sorption compound comprises one or more tied units of Formula $C_2$ and zero, one, or more untied units of Formula $A_2$, wherein the tied units of Formula $C_2$ and/or untied units of Formula $A_2$ are linked together via an intervening linker of Formula $A_{2L}$;
  wherein Formula $C_2$ is defined by:

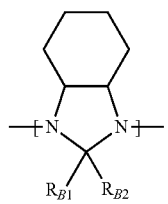
Formula C2 wherein Formula $A_2$ is defined by:

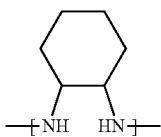
Formula A2 wherein Formula $A_{2L}$ is defined by:

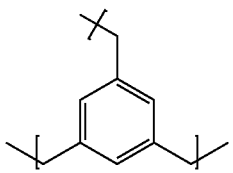
Formula A2L wherein any of the groups of Formula $C_2$, $A_2$, or $A_{2L}$ are substituted or unsubstituted.

27. The method as claimed in claim 26, wherein the sorption compound is defined by the Formula C3:

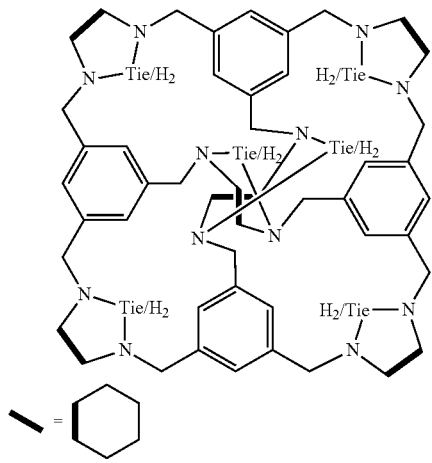
(C3)

wherein Tie/$H_2$ indicates either a diamine group that is tied with Tie or a diamine group that is untied with a single hydrogen borne by each diamine nitrogen, wherein Tie is a molecular tie as defined by Formula D, and wherein the sorption compound comprises at least one Tie.

28. The method as claimed in claim 27, wherein the sorption compound of Formula C3 comprises only a single type of molecular tie, wherein the single molecular tie of Formula D is selected from the group consisting of wherein:
$R_{B1}$ and $R_{B2}$ are both hydrogen (e.g. formaldehyde-tied), such as 6 FT-RCC3 or 5 FT-RCC3;
$R_{B1}$ and $R_{B2}$ are both methyl (e.g. acetone-tied), such as 1AT-RCC3; and
$R_{B1}$ is hydrogen and $R_{B2}$ is methyl (e.g. acetaldehyde-tied), such as 6ET-RCC3.

29. The method as claimed in claim 27, wherein the sorption compound of Formula C3 comprises two or more different types of molecular tie of Formula D, wherein the different molecular ties of Formula D are selected from the group consisting of wherein:

i. a first molecular tie wherein $R_{B1}$ and $R_{B2}$ are both hydrogen (e.g. formaldehyde-tied), and a second molecular tie wherein $R_{B1}$ is hydrogen and $R_{B2}$ is methyl (e.g. acetaldehyde-tied), such as 1ET-5 FT-RCC3;

ii. a first molecular tie wherein $R_{B1}$ and $R_{B2}$ are both hydrogen (e.g. formaldehyde-tied), and a second molecular tie wherein $R_{B1}$ and $R_{B2}$ are both methyl (e.g. acetone-tied), such as 1AT-5 FT-RCC3; and iii. a first molecular tie wherein $R_{B1}$ and $R_{B2}$ are both hydrogen (e.g. formaldehyde-tie), and a second molecular tie wherein $R_{B1}$ is hydrogen and $R_{B2}$ is ethyl (e.g. propionaldehyde-tied), such as 1 PT-5 FT-RCC3.

30. The method as claimed in claim 1, wherein the sorption compound is 6ET-RCC3.

31. The method as claimed in claim 1, wherein the sorption composition comprises a co-crystal, wherein the co-crystal comprises the sorption compound and a co-crystallization compound, wherein the co-crystallization compound comprises an internal cavity whose cavity size is larger than the internal cavity of the sorption compound.

32. The method as claimed in claim 31, wherein individual crystals of the sorption compound are isostructural with individual crystals of the co-crystallization compound.

33. The method as claimed in claim 32, wherein individual crystals of the co-crystal are isostructural with individual crystals of the sorption compound.

34. The method as claimed in claim 33, wherein the co-crystallization compound has a cavity size that is larger than that of the sorption compound by at least 2 Å.

35. The method as claimed in claim 33, wherein both the sorption compound and co-crystallization compound are chiral, both are enantiomerically enriched in a single enantiomer, and the single enantiomer of the sorption compound is the opposite chirality to the that of the co-crystallization compound in that one is an R-enantiomer and the other is an S-enantiomer.

36. The method as claimed in claim 31, wherein the co-crystallization compound comprises one or more units defined by Formula E, where appropriate linked together, optionally via an intervening linker:

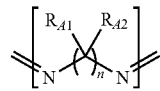
Formula E wherein:
n is an integer between 1 and 4;
each $R_{A1}$ and $R_{A2}$ group is independently hydrogen or an optionally substituted substituent group, wherein any pair of $R_{A1}$ and $R_{A2}$ groups are optionally joined together to form a carbocyclic, heterocyclic, aryl, or heteroaryl ring;
wherein suitably the units of Formula E are linked together via a linker (i.e. are not directly bonded).

37. The method as claimed in claim 36, wherein the co-crystallization compound comprises one or more units defined by Formula $E_1$ linked together via an intervening linker of Formula $A_{1L}$;

wherein units of Formula $E_1$ are defined by:

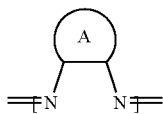
Formula E1 wherein Ring A is a carbocyclic, aryl, heterocyclic, or heteroaryl ring;

wherein Formula $A_{1L}$ is defined by:

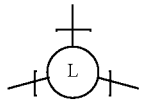
Formula A1L wherein Ring L is a polyvalent hydrocarbon (straight chain or branched), a polyvalent carbocycle, a polyvalent heterocycle, a polyvalent arene, a polyvalent heteroarene, a polyvalent mono-/poly-hydrocarbyl-carbocycle, a polyvalent mono-/poly-hydrocarbyl-heterocycle, a polyvalent mono-/poly-hydrocarbyl-arene, or a polyvalent mono-/poly-hydrocarbyl-heteroarene;

wherein any of the groups of Formula $E_1$ and/or $A_{1L}$ are substituted or unsubstituted.

38. The method as claimed in claim 36, wherein the co-crystallization compound comprises one or more units defined by Formula $E_2$ linked together via an intervening linker of Formula $A_{2L}$;

wherein units of Formula $E_2$ are defined by:

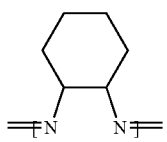
Formula E wherein Formula $A_{2L}$ is defined by:

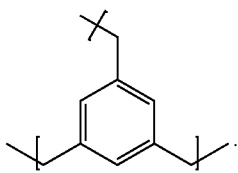
Formula A2L

39. The method as claimed in claim 38, wherein the co-crystallization compound is CC3.

40. The method as claimed in claim 31, wherein the sorption compound is selected from the group consisting of 6 FT-RCC3, 5 FT-RCC3, 6ET-RCC3, 1AT-RCC3, 1ET-5 FT-RCC3, 1AT-5 FT-RCC3, 1 PT-5 FT-RCC3, and the co-crystallization compound is CC3.

41. The method as claimed in claim 40, wherein the sorption compound is 6ET-RCC3 and the co-crystallization compound is CC3.

42. The method as claimed in claim 31, wherein the molar ratio of sorption compound to co-crystallization compound in the co-crystal is between 5:1 and 1:5.

43. The method as claimed in claim 5, wherein:
the target mixture comprises, consists essentially of, or consists of two or more selected form the group consisting of $H_2$, $D_2$, $T_2$, HD, HT, and DT;
the target substance(s) is/are selected from the group consisting of $D_2$, $T_2$, HD, HT, and DT; and
the non-target substances(s) is/are selected from the group consisting of $H_2$, $D_2$, $T_2$, HD, HT, and DT, on the proviso that the non-target substance(s) exclude the target substance(s);
wherein the cavity size of the sorption compound at SATP is between 1 to 2.4 Å; and
wherein the sorption compound is a functionalized polydiamine cage.

44. The method as claimed in claim 43, wherein the sorption composition comprises a co-crystal, wherein the co-crystal comprises the sorption compound and a co-crystallization compound, wherein the co-crystallization compound is a polydiimine cage comprising an internal cavity whose cavity size is larger than the internal cavity of the sorption compound.

45. The method as claimed in claim 44, wherein the sorption compound is 6ET-RCC3 and the co-crystallization compound is CC3.

* * * * *